United States Patent [19]
Jacobs

[11] Patent Number: 5,726,898
[45] Date of Patent: Mar. 10, 1998

[54] METHOD AND APPARATUS FOR STORING AND SELECTIVELY RETRIEVING AND DELIVERING PRODUCT DATA BASED ON EMBEDDED EXPERT JUDGEMENTS

[75] Inventor: Herbert H. Jacobs, LaJolla, Calif.

[73] Assignee: American Greetings Corporation, Cleveland, Ohio

[21] Appl. No.: 299,499

[22] Filed: Sep. 1, 1994

[51] Int. Cl.[6] .................................................. G05B 19/18
[52] U.S. Cl. .................... 364/479.01; 364/468; 364/478; 364/479.02; 364/479.03
[58] Field of Search ................................ 364/468, 478, 364/479, 479.01, 479.02, 479.03; 235/381, 382, 383

[56] References Cited

U.S. PATENT DOCUMENTS

| Re. 33,316 | 8/1990 | Katsuta et al. | 364/521 |
|---|---|---|---|
| 2,089,563 | 8/1937 | Luhrs | 229/8 |
| 3,454,956 | 7/1969 | Icenbice, Jr. et al. | 346/104 |

(List continued on next page.)

FOREIGN PATENT DOCUMENTS

| 1278862 | 5/1986 | Canada . |
|---|---|---|
| 2033966 | 1/1991 | Canada . |
| 2041298 | 4/1991 | Canada . |
| 79302164 | 10/1979 | European Pat. Off. . |

(List continued on next page.)

OTHER PUBLICATIONS

"Compositing Digital Images"; Porter, Thomas; Duff, Tom; *Computer Graphics*; vol. 18, No. 3; Jul. 1984; pp. 253–259.
"Now PC Users Say It With 'Voice Notes'"; William M. Buckley *Wall Street Journal*; pp. B1, B5.
"Touch–Screens For Intuitive Input", M. David Stone, *PC Magazine*, Aug. 1987, pp. 183–192.
"Touch Screens: A Viable Mouse Alternative", *PC Week*, p. 90.
"Man to Machine via Screen", *PC Week*, p. 41.
"Autoclerk" *ABA Journal*, Apr. 1992.
"Gay groups put their cards on the table, so Hallmark lifts ban on using 'lesbian'"; Hodges, Michael, *Detroit News*, Oct. 28, 1991, p. 1C.
"Toys, gift for upcoming holiday shopping lists", Magid, Judy, *Salt Lake Tribune*, Oct. 14, 1991.
"If you care enough to keyboard the best", Bombeck, Erma, *Star–Ledger*, Oct. 17, 1991.
"Software Tools for Writers", Holder, Wayne, *BYTE Publications Inc.*, Jul. 1992, pp. 128–163.
"Pioneering Perspective", Yeazel, Lynn A. *Optical Information Systems*, Feb. 1986, pp. 36, 37.
"Retailers Beginning To Tune in Video Displays", *Advertising Age*, Nov. 1985, p. 66.
"Computers, Fiction, and Poetry", McKean, Kevin *BYTE Publications*, Jul. 1992, pp. 50–53.

(List continued on next page.)

*Primary Examiner*—Reba I. Elmore
*Assistant Examiner*—Sheela S. Rao
*Attorney, Agent, or Firm*—Jones, Day, Reavis & Pogue

[57] ABSTRACT

An improved apparatus and method of storing and selectively retrieving and delivering product data is disclosed. Product data files, product lists, product directories and allowable customer data entry sets are stored in a data storage device. The customer is asked to specify one or more criteria relating to a product need or desire and one or more allowable customer data entry sets are selected that best correspond to these criteria. The customer data entry sets are connected to product directories and the directories are in turn connected to product lists that reference the data files of products having anticipated common uses. The product directories correspond to connected customer data entry sets with different degrees of specificity and the product lists correspond to connected product directories with different degrees of specificity or applicability. The apparatus is thus able to retrieve and display a variety of products in response to any given customer input and is also able to respond to many different kinds of customer entered criteria.

61 Claims, 41 Drawing Sheets

U.S. PATENT DOCUMENTS

| | | | |
|---|---|---|---|
| 3,609,250 | 9/1971 | Morris | 179/100 |
| 3,637,934 | 1/1972 | Brewster | 178/6.6 A |
| 3,669,814 | 6/1972 | Faltin | 161/37 |
| 3,688,276 | 8/1972 | Quinn | 340/172.5 |
| 3,704,362 | 11/1972 | Kolby et al. | 235/151.13 |
| 3,705,384 | 12/1972 | Wahlberg | 340/149 |
| 3,727,038 | 4/1973 | Ritter et al. | 235/151.1 |
| 3,757,037 | 9/1973 | Bialek | 178/6.6 A |
| 3,800,932 | 4/1974 | Dana | 194/10 |
| 3,819,854 | 6/1974 | Kolb | 178/6.7 R |
| 3,828,904 | 8/1974 | Naitou et al. | 194/10 |
| 3,829,833 | 8/1974 | Freeny, Jr. | 340/149 |
| 3,864,708 | 2/1975 | Allen | 354/290 |
| 3,898,930 | 8/1975 | Ikegami et al. | 101/316 |
| 3,911,397 | 10/1975 | Freeny, Jr. | 340/147 |
| 3,924,065 | 12/1975 | Freeny, Jr. | 178/66 |
| 3,932,036 | 1/1976 | Ueda et al. | 355/40 |
| 3,938,190 | 2/1976 | Semmlow et al. | 360/72 |
| 3,943,335 | 3/1976 | Kinker et al. | 235/61.7 B |
| 3,946,220 | 3/1976 | Brobeck et al. | 235/168 |
| 3,949,375 | 4/1976 | Ciarlo | 340/172.5 |
| 3,970,992 | 7/1976 | Boothroyd et al. | 340/172.5 |
| 3,990,710 | 11/1976 | Hughes | 274/1 R |
| 4,007,362 | 2/1977 | Sindermann | 235/151 |
| 4,023,013 | 5/1977 | Kinker | 235/61.7 B |
| 4,034,839 | 7/1977 | Lee | 194/10 |
| 4,041,467 | 8/1977 | Cota et al. | 364/900 |
| 4,058,056 | 11/1977 | Rubin | 101/93.19 |
| 4,069,896 | 1/1978 | Rottman et al. | 186/1 B |
| 4,070,223 | 1/1978 | Stalzer | 156/264 |
| 4,070,698 | 1/1978 | Curtis et al. | 360/12 |
| 4,071,911 | 1/1978 | Mazur | 364/900 |
| 4,073,368 | 2/1978 | Mustapick | 186/1 C |
| 4,085,445 | 4/1978 | Blevins et al. | 364/900 |
| 4,096,933 | 6/1978 | Massa | 194/100 |
| 4,112,421 | 9/1978 | Freeny, Jr. | 343/112 |
| 4,144,656 | 3/1979 | Podkopaev et al. | 35/9 |
| 4,160,271 | 7/1979 | Grayson et al. | 364/400 |
| 4,173,024 | 10/1979 | Miller | 358/115 |
| 4,190,819 | 2/1980 | Burgyan | 340/23 |
| 4,193,114 | 3/1980 | Benini | 364/200 |
| 4,209,588 | 6/1980 | Freeny, Jr. | 343/112 |
| 4,209,787 | 6/1980 | Freeny, Jr. | 343/112 |
| 4,216,286 | 8/1980 | Greene et al. | 430/203 |
| 4,220,991 | 9/1980 | Hamano et al. | 364/405 |
| 4,224,601 | 9/1980 | Davidson | 346/150 |
| 4,232,317 | 11/1980 | Freeny, Jr. | 343/112 |
| 4,232,334 | 11/1980 | Dyson | 358/93 |
| 4,239,380 | 12/1980 | Goldsholl | 355/52 |
| 4,247,759 | 1/1981 | Yuris et al. | 235/381 |
| 4,260,229 | 4/1981 | Bloomstein | 352/50 |
| 4,261,012 | 4/1981 | Maloomian | 358/93 |
| 4,265,371 | 5/1981 | Desai et al. | 222/70 |
| 4,270,182 | 5/1981 | Asija | 364/900 |
| 4,275,449 | 6/1981 | Aish | 364/512 |
| 4,300,040 | 11/1981 | Gould et al. | 235/381 |
| 4,305,131 | 12/1981 | Best | 364/521 |
| 4,308,017 | 12/1981 | Laughon et al. | 434/169 |
| 4,318,121 | 3/1982 | Taite et al. | 358/22 |
| 4,319,336 | 3/1982 | Anderson et al. | 364/900 |
| 4,328,544 | 5/1982 | Baldwin et al. | 364/405 |
| 4,329,710 | 5/1982 | Taylor | 358/81 |
| 4,339,134 | 7/1982 | Macheel | 273/138 |
| 4,354,613 | 10/1982 | Desai et al. | 221/4 |
| 4,358,824 | 11/1982 | Glickman et al. | 364/200 |
| 4,359,631 | 11/1982 | Lockwood et al. | |
| 4,359,634 | 11/1982 | Saito et al. | 250/201 |
| 4,396,307 | 8/1983 | Shah et al. | 400/625 |
| 4,412,292 | 10/1983 | Sedam et al. | 364/479 |
| 4,414,467 | 11/1983 | Gould et al. | 235/381 |
| 4,414,896 | 11/1983 | Fischer | 101/211 |
| 4,417,322 | 11/1983 | Berry et al. | 364/900 |
| 4,417,722 | 11/1983 | Ishii et al. | 266/250 |
| 4,429,385 | 1/1984 | Cichelli et al. | 370/92 |
| 4,431,323 | 2/1984 | Kulow | 400/625 |
| 4,434,467 | 2/1984 | Scott | 364/400 |
| 4,435,772 | 3/1984 | Suzuki et al. | 364/520 |
| 4,438,326 | 3/1984 | Uchida | 235/379 |
| 4,441,160 | 4/1984 | Azcua et al. | 364/900 |
| 4,449,186 | 5/1984 | Kelly et al. | 364/407 |
| 4,458,802 | 7/1984 | Maciver et al. | 194/4 R |
| 4,459,676 | 7/1984 | Oguchi | 364/521 |
| 4,460,957 | 7/1984 | Eggebrecht et al. | 364/200 |
| 4,463,874 | 8/1984 | Friedman et al. | 221/238 |
| 4,467,349 | 8/1984 | Maloomian | 358/93 |
| 4,481,590 | 11/1984 | Otten | 364/479 |
| 4,484,304 | 11/1984 | Anderson et al. | 364/900 |
| 4,486,774 | 12/1984 | Maloomian | 358/93 |
| 4,488,244 | 12/1984 | Freeman | 364/525 |
| 4,489,389 | 12/1984 | Beckwith et al. | 364/522 |
| 4,495,582 | 1/1985 | Dessert et al. | 364/469 |
| 4,498,139 | 2/1985 | Malinovsky | 364/518 |
| 4,517,578 | 5/1985 | Tazaki | 346/140 |
| 4,519,037 | 5/1985 | Brodeur et al. | 364/400 |
| 4,519,522 | 5/1985 | McElwee | 221/13 |
| 4,520,451 | 5/1985 | McLaughlin | 364/900 |
| 4,528,643 | 7/1985 | Freeny, Jr. | 364/900 |
| 4,546,434 | 10/1985 | Gioello | 364/300 |
| 4,553,222 | 11/1985 | Kurland et al. | 364/900 |
| 4,559,598 | 12/1985 | Goldwasser et al. | 364/419 |
| 4,567,359 | 1/1986 | Lockwood | 235/381 |
| 4,575,813 | 3/1986 | Bartlett et al. | 364/900 |
| 4,577,206 | 3/1986 | Hibino | 346/139 |
| 4,591,281 | 5/1986 | Howard et al. | 400/126 |
| 4,591,983 | 5/1986 | Bennett et al. | 364/403 |
| 4,596,924 | 6/1986 | Watanabe | 235/379 |
| 4,598,376 | 7/1986 | Burton et al. | 364/470 |
| 4,598,810 | 7/1986 | Shore et al. | 194/205 |
| 4,599,598 | 7/1986 | Komoda et al. | 340/310 |
| 4,602,299 | 7/1986 | Saito | 360/60 |
| 4,608,662 | 8/1986 | Watanabe et al. | 364/900 |
| 4,610,200 | 9/1986 | Metso | 101/126 |
| 4,616,327 | 10/1986 | Rosewarne et al. | 364/518 |
| 4,623,292 | 11/1986 | Suzuki et al. | 414/114 |
| 4,623,964 | 11/1986 | Getz et al. | 364/401 |
| 4,625,275 | 11/1986 | Smith | 364/401 |
| 4,627,015 | 12/1986 | Stephens | 364/900 |
| 4,644,401 | 2/1987 | Gaskins | 358/183 |
| 4,646,250 | 2/1987 | Childress | 364/518 |
| 4,649,513 | 3/1987 | Martin et al. | 364/900 |
| 4,650,977 | 3/1987 | Couch | 235/379 |
| 4,652,998 | 3/1987 | Koza et al. | 364/412 |
| 4,654,799 | 3/1987 | Ogaki et al. | 364/479 |
| 4,655,026 | 4/1987 | Wigoda | 53/55 |
| 4,664,546 | 5/1987 | Rünzi | 400/624 |
| 4,668,150 | 5/1987 | Blumberg | 414/273 |
| 4,672,554 | 6/1987 | Ogaki | 364/479 |
| 4,674,041 | 6/1987 | Lemon et al. | 364/401 |
| 4,674,055 | 6/1987 | Ogaki et al. | 364/479 |
| 4,677,565 | 6/1987 | Ogaki et al. | 364/479 |
| 4,677,570 | 6/1987 | Taki | 364/518 |
| 4,683,536 | 7/1987 | Yamamoto | 364/408 |
| 4,699,532 | 10/1987 | Smith | 400/104 |
| 4,700,181 | 10/1987 | Maine et al. | 340/747 |
| 4,700,317 | 10/1987 | Watanabe et al. | 364/488 |
| 4,700,318 | 10/1987 | Ockman | 364/518 |
| 4,703,465 | 10/1987 | Parker | 369/30 |
| 4,710,885 | 12/1987 | Litteken | 364/518 |
| 4,712,174 | 12/1987 | Minkler, II | 364/200 |
| 4,714,936 | 12/1987 | Helinski et al. | 346/140 |
| 4,719,885 | 1/1988 | Nagano et al. | 123/179 |
| 4,722,053 | 1/1988 | Dubno et al. | 364/401 |

| | | | |
|---|---|---|---|
| 4,723,212 | 2/1988 | Mindrum et al. | 364/401 |
| 4,726,697 | 2/1988 | Maedge et al. | 400/625 |
| 4,727,589 | 2/1988 | Hirose et al. | 382/56 |
| 4,733,362 | 3/1988 | Haraguchi | 364/479 |
| 4,736,306 | 4/1988 | Christensen et al. | 364/513 |
| 4,740,904 | 4/1988 | Nagle | 364/520 |
| 4,745,560 | 5/1988 | Decker et al. | 364/519 |
| 4,750,122 | 6/1988 | Kaji et al. | 364/419 |
| 4,750,131 | 6/1988 | Martinez | 364/476 |
| 4,750,151 | 6/1988 | Baus | 364/900 |
| 4,764,867 | 8/1988 | Hess | 364/200 |
| 4,764,880 | 8/1988 | Pearl | 364/519 |
| 4,766,548 | 8/1988 | Cedrone et al. | 364/479 |
| 4,766,581 | 8/1988 | Korn et al. | 369/30 |
| 4,771,401 | 9/1988 | Kaufman et al. | 364/900 |
| 4,772,882 | 9/1988 | Mical | 340/709 |
| 4,773,009 | 9/1988 | Kucera et al. | 364/419 |
| 4,775,935 | 10/1988 | Yourick | 364/401 |
| 4,779,080 | 10/1988 | Coughlin et al. | 340/712 |
| 4,786,229 | 11/1988 | Henderson | 414/786 |
| 4,787,050 | 11/1988 | Suzuki | 364/479 |
| 4,789,147 | 12/1988 | Berger et al. | 270/1.1 |
| 4,789,907 | 12/1988 | Fischetti et al. | 360/33.1 |
| 4,794,403 | 12/1988 | Sleber et al. | 346/33 |
| 4,801,375 | 1/1989 | Padilla | 210/100 |
| 4,802,170 | 1/1989 | Trottier | 371/40 |
| 4,811,240 | 3/1989 | Ballou et al. | 364/518 |
| 4,811,247 | 3/1989 | Malady et al. | 364/550 |
| 4,814,592 | 3/1989 | Bradt et al. | 235/381 |
| 4,817,005 | 3/1989 | Kubota et al. | 364/468 |
| 4,817,042 | 3/1989 | Pintsov | 364/478 |
| 4,817,043 | 3/1989 | Brown | 364/518 |
| 4,818,854 | 4/1989 | Davies et al. | 235/381 |
| 4,821,197 | 4/1989 | Kenik et al. | 364/468 |
| 4,822,365 | 4/1989 | Walker et al. | 623/20 |
| 4,833,307 | 5/1989 | Gonzalez-Justiz | 235/375 |
| 4,835,683 | 5/1989 | Phillips et al. | 364/200 |
| 4,839,505 | 6/1989 | Bradt et al. | 235/381 |
| 4,839,829 | 6/1989 | Freedman | 364/519 |
| 4,845,635 | 7/1989 | Rosselli | 364/474.01 |
| 4,845,653 | 7/1989 | Conrad et al. | 364/521 |
| 4,847,473 | 7/1989 | Lee et al. | 235/381 |
| 4,847,761 | 7/1989 | Ferriter et al. | 364/401 |
| 4,852,013 | 7/1989 | Durst, Jr. et al. | 364/478 |
| 4,856,653 | 8/1989 | Ackeret | 206/387 |
| 4,862,376 | 8/1989 | Ferriter et al. | 364/468 |
| 4,864,502 | 9/1989 | Kucera et al. | 364/419 |
| 4,866,661 | 9/1989 | de Prins | 364/900 |
| 4,870,576 | 9/1989 | Tornetta | 364/401 |
| 4,873,643 | 10/1989 | Powell et al. | 364/468 |
| 4,882,675 | 11/1989 | Nichtberger et al. | 364/401 |
| 4,884,199 | 11/1989 | Boothroyd et al. | 364/408 |
| 4,887,217 | 12/1989 | Sherman et al. | 364/468 |
| 4,891,660 | 1/1990 | Biondo, Jr. | 354/412 |
| 4,896,791 | 1/1990 | Smith | 221/7 |
| 4,903,815 | 2/1990 | Hirschfeld et al. | 194/205 |
| 4,916,637 | 4/1990 | Allen et al. | 364/513 |
| 4,918,604 | 4/1990 | Baum | 364/413.01 |
| 4,924,385 | 5/1990 | Dote | 364/300 |
| 4,937,439 | 6/1990 | Wanninger et al. | 235/456 |
| 4,949,257 | 8/1990 | Orbach | 364/401 |
| 4,951,203 | 8/1990 | Halamka | 364/419 |
| 4,954,956 | 9/1990 | Yamakawa et al. | 364/419 |
| 4,954,981 | 9/1990 | Dehner, Jr. et al. | 364/900 |
| 4,961,507 | 10/1990 | Higgins | 221/129 |
| 4,964,043 | 10/1990 | Galvin | 364/401 |
| 4,970,655 | 11/1990 | Winn et al. | 364/479 |
| 4,972,318 | 11/1990 | Brown et al. | 364/403 |
| 4,974,170 | 11/1990 | Bouve et al. | 364/518 |
| 4,982,337 | 1/1991 | Burr et al. | 364/479 |
| 4,982,343 | 1/1991 | Hourvitz et al. | 364/521 |
| 4,982,346 | 1/1991 | Girouard et al. | 364/550 |
| 4,991,108 | 2/1991 | Hamilton | 364/514 |
| 4,992,940 | 2/1991 | Dworkin | 364/401 |
| 4,993,587 | 2/1991 | Abe | 221/21 |
| 4,999,065 | 3/1991 | Wilfert | 156/64 |
| 5,007,084 | 4/1991 | Materna et al. | 380/24 |
| 5,008,810 | 4/1991 | Kessel et al. | 364/200 |
| 5,016,183 | 5/1991 | Shyong | 364/470 |
| 5,017,953 | 5/1991 | Biondo, Jr. | 354/83 |
| 5,018,085 | 5/1991 | Smith, Jr. | 364/526 |
| 5,020,958 | 6/1991 | Tuttobene | 414/281 |
| 5,021,853 | 6/1991 | Webber et al. | 364/407 |
| 5,025,397 | 6/1991 | Suzuki | 364/519 |
| 5,025,399 | 6/1991 | Wendt et al. | 364/519 |
| 5,029,099 | 7/1991 | Goodman | 364/479 |
| 5,032,989 | 7/1991 | Tornetta | 364/401 |
| 5,036,472 | 7/1991 | Buckley et al. | 364/479 |
| 5,038,293 | 8/1991 | Goodman | 364/479 |
| 5,040,132 | 8/1991 | Schuricht et al. | 364/523 |
| 5,047,613 | 9/1991 | Swegen et al. | 235/379 |
| 5,047,959 | 9/1991 | Phillips et al. | 364/521 |
| 5,053,956 | 10/1991 | Donald et al. | 364/401 |
| 5,056,029 | 10/1991 | Cannon | |
| 5,061,098 | 10/1991 | Engelhardt et al. | 400/625 |
| 5,062,147 | 10/1991 | Pickett et al. | 364/900 |
| 5,084,817 | 1/1992 | Kumano et al. | 364/419 |
| 5,088,052 | 2/1992 | Spielman et al. | 395/158 |
| 5,088,586 | 2/1992 | Isobe et al. | 194/205 |
| 5,099,422 | 3/1992 | Foresman et al. | 364/401 |
| 5,109,337 | 4/1992 | Ferriter et al. | 364/401 |
| 5,111,392 | 5/1992 | Malin | 364/401 |
| 5,115,504 | 5/1992 | Belove et al. | 395/600 |
| 5,119,475 | 6/1992 | Smith et al. | 395/156 |
| 5,132,915 | 7/1992 | Goodman | 364/479 |
| 5,146,403 | 9/1992 | Goodman | 364/401 |
| 5,148,370 | 9/1992 | Litt er al. | 364/468 |
| 5,153,825 | 10/1992 | Yauk et al. | 364/401 |
| 5,163,006 | 11/1992 | Deziel | 364/470 |
| 5,172,245 | 12/1992 | Kita et al. | 358/403 |
| 5,187,797 | 2/1993 | Nielsen et al. | 395/800 |
| 5,195,030 | 3/1993 | White | 364/401 |
| 5,200,888 | 4/1993 | Hashimoto | 364/400 |
| 5,206,804 | 4/1993 | Thies et al. | 364/401 |
| 5,208,745 | 5/1993 | Quentin et al. | 364/188 |
| 5,235,519 | 8/1993 | Miura | 364/479 |
| 5,241,671 | 8/1993 | Reed et al. | 395/600 |
| 5,243,174 | 9/1993 | Veeneman et al. | 364/479 |
| 5,442,567 | 8/1995 | Small | 364/479 |
| 5,513,116 | 4/1996 | Buckley et al. | 364/479 |
| 5,546,316 | 8/1996 | Buckley et al. | 364/479.03 |
| 5,559,714 | 9/1996 | Banks et al. | 364/479.03 |
| 5,561,604 | 10/1996 | Buckley et al. | 364/479.05 |

FOREIGN PATENT DOCUMENTS

| | | |
|---|---|---|
| 79104527 | 11/1979 | European Pat. Off. . |
| 83108181 | 8/1983 | European Pat. Off. . |
| 83306220 | 10/1983 | European Pat. Off. . |
| 89819937 | 1/1989 | European Pat. Off. . |
| 90313917 | 12/1990 | European Pat. Off. . |
| 91309669 | 10/1991 | European Pat. Off. . |
| 87 13494 | 9/1987 | France . |
| 89 09224 | 6/1989 | France . |
| 3919726 | 6/1989 | Germany . |
| 57-144078 | 2/1984 | Japan . |
| 59-33573 | 2/1984 | Japan . |
| 59-194263 | 5/1984 | Japan . |
| 1005827 | 5/1963 | United Kingdom . |
| 1388942 | 4/1972 | United Kingdom . |
| 2050106 | 4/1980 | United Kingdom . |
| 2065412 | 10/1980 | United Kingdom . |
| 2092354 | 9/1981 | United Kingdom . |
| 2105075 | 5/1982 | United Kingdom . |
| 2119600 | 4/1983 | United Kingdom . |

| | | |
|---|---|---|
| 2150728 | 11/1984 | United Kingdom . |
| 2177245 | 5/1986 | United Kingdom . |
| 2222341 | 6/1988 | United Kingdom . |
| 2208460 | 7/1988 | United Kingdom . |
| 2 228 125 A | 8/1990 | United Kingdom . |
| 2240897 | 8/1990 | United Kingdom . |
| 2 246 929 A | 12/1992 | United Kingdom . |
| PCT/NO81/ 00028 | 7/1981 | WIPO . |
| PCT/AU82/ 00123 | 4/1982 | WIPO . |
| PCT/US82/ 01153 | 8/1982 | WIPO . |
| PCT/US83/ 00628 | 5/1983 | WIPO . |
| PCT/US90/ 06283 | 10/1989 | WIPO . |
| PCT/US89/ 05364 | 11/1989 | WIPO . |
| PCT/EP90/ 02079 | 6/1991 | WIPO . |
| PCT/FR91/ 00650 | 8/1991 | WIPO . |
| PCT/US92/ 02603 | 10/1992 | WIPO . |

OTHER PUBLICATIONS

"Creative Writing with Computers", Owens, Peter, *Popular Computing*, Jan. 1984, pp. 128–132.

"Interactive Fiction: Six Micro Stories", Liddil, Bob, *BYTE Publications, Inc.* Sep. 1981, p. 436.

"Gosub: Poet: Return Computers and the Poetic Muse", Marcus, Stephen, *Educational Technology*, Aug., 1984 pp. 15–20.

"Comp–U–Store System Could Change Retail Economics", *Direct Marketing*, Jul. 1983, pp. 101–107.

"Setting Up Shop On Computer Screens", Gatty, Bob, *Nation's Business*, Mar. 1984, pp. 57–58.

"EDR puts Auto Insurance Policy 'On Line'", Mooney, Barbara, *Crain's Cleveland Business*, Mar. 30, 1992, p. 23.

"TouchSelect Turns Ordinary Monitors Into Touch–Screens", Zelnick, Nate, *PC Magazine*, Dec. 17, 1991, p. 42.

"Maintenance by Modem: Processing Problems Can Be Solved Remotely"; Kreisher, Keith; *Modern Plastics*; Jan. 1990; p. 44.

"The Touchables"; *Informationweek*; Apr. 13, 1992; p. 44.

"Card Compete In New Outlets"; Toth, Debora; *Graphic Arts Monthly*; Dec. 1991; pp. 48–50.

"How Computerized Cards Make This Shop 'Truly A Treat"; Hohman, Edward J.; *Greetings Magazine*; Jan. 1987; pp. 12–13 and 24.

"Rhyme is Money with The Magical Poet"; *The Computer Poet Corp. Brochure*.

"This Computer Can Rhyme . . . For Three Bucks Each Time"; *Changing Times*; Jan. 1986.

"Cardmarketing . . . Your Way to Powerful Database"; Corliss, Paul W., Jr.; *Dynamic Controls, Inc.*

"These Instant–Win Games Talk Back"; *ADWeek's Promote*; May 1, 19__; p. 4.

"Caspir, Computer Aided Searching and Patent Image Retrieval", pp. 1, 8, 9, 10, 12, 13.

"Point–Of–Sale Terminal System With Clerical Facilities/Functions", G. Allmendinger, A. Bette, K.H. Engler, B. Haeusser and R. Muehlenbrock, *IBM Technical Disclosure Bulletin*, Jan. 1976, pp. 2554, 2555.

"Knowledge–Assisted Document Retrieval: I. The Natural-–Language Interface"; Biswas, Bezdek, Marques, Subramanian; *Journal of The American Society For Information Science*; pp. 83–96; Mar. 1987.

"Knowledge–Assisted Document Retrieval: II. The Retrieval Process"; Biswas, Bezdek, Subramanian, Marques, *Journal of the American Society For Information Science*; pp. 97–110; Mar. 1987.

"$T^3R$: A New Approach to the Design of Document Retrieval Systems"; W.B. Croft and R.H. Thompson; *Journal of the American Society For Information Science*; pp. 389–404; Nov. 1987.

"Integrating Mechanisms for Storage and Retrieval of Land Data"; Andrew Frank; *Surveying and Mapping*, vol. 46, No. 2, pp. 107–121.

"Retrieval of Help Information for Novice users of Interactive Computer Systems"; Andrew M. Cohill; *Human Factors*; Jun. 1985; pp. 335–343.

"Automatic Tex Generation"; R. Marsh; *Br Telecom Technol J* vol. 6 No. 4; Oct. 1988; pp. 84–88.

"Advanced Feedback Methods in Information Retrieval"; G. Salton, E.A. Fox, E. Voorhees; *Journal of the American Society for Information Science*; May 1985, pp. 200–210.

"Producing Geological Illustrations Using PC–Based Computer–Aided Drafting"; K. Cameron, D. Cameron, P. Kelleher; *Computers & Geosciences*, vol. 14, No. 3 pp. 291–297; 1988.

"Adapting of String Indexing Systems For Retrieval Using Proximity Operators"; Timothy C. Craven, *Information Processing & Management*; vol. 24, No. 2, pp. 133–140, 1988.

"A language for simple interactive retrieval from a database system"; Perry Jones and Michael Shave; *Data & Knowledge Engineering* 2, 1987, pp. 303–321.

"Automated Storage and Retrieval of Work Standards"; Richard A. Bihr; *Computers ind. Engng*, vol. 13, Nos. 1–4, pp. 312–316, 1987.

"A Novice User's Interface to Information Retrieval Systems"; R.G. Crawford and H.S. Becker; *Information Processing & Management*, vol. 22, No. 4, pp. 287–298, 1986.

"Novel Filing Systems Applicable To An Automated Office: A State–Of–The–Art Study"; F. Mark Restorick; *Information Processing & Management*; vol. 22, No. 2, pp. 151–172, 1986.

"Thesaurus For End–User Indexing and Retrieval"; Gary W. Strong, M. Carl Drott; *Information Processing & Management*; vol. 22, No. 6, pp. 487–492, 1986.

"OAKDEC, A Program For Studying The Effects on Users of a Procedural Expert System for Database Searching"; Charles T. Meadow, *Information Processing & Management*, vol. 24, No. 4, pp. 449–457, 1988.

"WYSIWIS Revised: Early Experience with Multiuser Interfaces"; M. Stefik, D.G. Bobrow, G. Foster, S. Lanning, and D. Tatar; *ACM Transactions of Office Information Systems*, vol. 5, No. 2, Apr. 1987 pp. 147–167.

"Criteria For the Evaluation of Text Storage and Retrieval Software"; Paul Nieuwenhuysen, *the Electronic Library*, Jun. 1988, vol. 6, No. 3; pp. 160–166.

"A Visual User Interface for Map Information Retrieval Based on Semantic Significance"; M. Tanaka and T. Ichikawa; *IEEE Transactions On Software Engineering*, vol. 14, No. 5, pp. 666–670, May 1988.

"Interactive Document Display And Its Use In Information Retrieval; J.D. Bovey and P.J. Brown"; *Journal of Documentation*, vol. 43, No. 2, Jun. 1987, pp. 125–137.

"Image Retrieval Systems Based on Object Features"; Akio Yamamoto and Mikio Takagi, *IEEE Montech* 1987, pp. 131–134.

"Retrieval Techniques"; Nicholas J. Belkin, W. Bruce Croft; *Annual Review of Information Science and Technology* vol. 22, 1987, pp. 108–145.

"Video–Graphic Query Facility For Database Retrieval"; Nancy H. McDonald, *Visual Computer*, 1986; pp. 72–77.

"Targeted Marketing", Paul Corliss, *Foodmarketing*; vol. 1, No. 1, Jan./Feb. 1989.

"Melpas–1 Ticket–Issuing Apparatus" by Ken 'Ichi Murato, Tadahiro Okura, Eliji Suzuki & Masataka Kobayashi; *Mitsubishi Denki Giho*. vol. 55, No. 4 pp. 35–39 (1981).

"Point–Of–Sale Terminal System With Clerical Facilities/ Functions"; by G. Allmendinger, A. Bette, J.H. Engler, B. Haeusser and R. Muehlenbrock; *IBM Technical Disclosure Bulletin*; vol. 18, No. 8, Jan. 1976; pp. 2554–2555.

"Filing and Retrieval of Unstructured Information: Some Systems Considerations"; J. Bansler, et al.; *Espirit '84* Brochure; pp. 295–313.

"The Interactive Display Design Tool: An Application Program for Human Factors Part Task Simulation Development"; Mark W. Smith, et al. 1899 *IEEE*; pp. 856–859.

"A Frame–based Interface for Question–Answering Systems"; Toshihisa Takagi, et al. 1985 *IEEE*; pp. 388–393.

"The Use of Adaptive Mechanism For Selection of Search Strategies in Document Retrieval Systems"; W. Bruce Croft, et al.; Department of Computer and Information Science, University of Massachusetts, pp. 95–110.

"An Interactive Database End User Facility For the Definition and Manipulation of Forms"; A.H.F. Laender, et al.; School of Computing Studies and accountancy, University of East Anglia, Norwich, NR 4 7TJ, England; pp. 40–54.

"CAD Generation of Accident Diagrams For Local Agencies"; Willard Lyman, et al.; *Microcomputer Within Transportation* Brochure; pp. 657–664.

"Which Way to Go With Interactive Video"; 1987 Interac Corporation Brochure.

"Interactive Video Merchandising"; By Video Inc. Brochure, May 1988.

"Vision 1000 The Total Promotion Delivery Vehicle"; Advanced Promotion Technologies—Brochure.

"Food Chain Employees Scanning Technology In Instant Win/Prize Drawing Promotion"; Incentives in Action Brochure.

"Direct Marketing Goes Electronic", Larry Riggs, *Sales & Marketing Management*, vol. 134, No. 1, Jan. 14, 1985, pp. 59–60.

Videodisc: Product Search System Launched for Architects and Interior Designers, *Videodisc and Optical Disk*, vol. 5, No. 4, Jul. 1985, pp. 244–247.

Current Spring 1987 Sale Catalog.

Current Valentine 1987 Catalog.

Photo enlargement via vending machine; Kodak Create–A–Print 35mm enlargement center; *Machine Design*, vol. 60; No. 9; p. 12.

Current Christmas 1987 Catalog.

Current Birthday 1987 Catalog.

Microsoft Press; Computer Dictionary; 2nd ed. 1993.

TOUCH SCREEN TO CHOOSE ONE OF THE FOLLOWING
MENU OPTIONS FOR YOUR GREETING CARD

LANGUAGE:

| ENGLISH | SPANISH | FRENCH |

| NEXT SCREEN | SEE CARDS |

*Fig. 5*

YOU HAVE CHOSEN: ENGLISH
NOW TOUCH SCREEN TO CHOOSE A MENU OF CARDS
DESIGNED FOR YOUR INTENDED PURPOSE

PURPOSE:

| BIRTHDAY GREETING | GET WELL | WEDDING ANNIVERSARY | HOLIDAY GREETING |

PREVIEW OF CHOICES ON NEXT SCREEN
IF BOX ABOVE IS SELECTED

| RELATIONSHIP OF RECIPIENT | TONE OF GREETING | INTENDED RECIPIENT | WHICH HOLIDAY |

| NEXT SCREEN | PREVIOUS SCREEN | SEE CARDS |

*Fig. 6*

YOU HAVE CHOSEN: ENGLISH-BIRTHDAY
NOW TOUCH SCREEN TO CHOOSE THE
RELATIONSHIP OF RECIPIENT TO YOU

RELATIONSHIP:

PREVIEW OF CHOICES ON NEXT SCREEN
IF BOX ABOVE IS SELECTED

| STYLE OF | STYLE OF | WHICH | WHICH | NO FURTHER |
| MESSAGE | MESSAGE | RELATIVE | RELATIVE | CHOICES |

| NEXT SCREEN | PREVIOUS SCREEN | SEE CARDS |

*Fig. 7*

YOU HAVE CHOSEN: ENGLISH-BIRTHDAY-CLOSE FRIEND
NOW TOUCH SCREEN TO CHOOSE THE STYLE OF MESSAGE

STYLE:

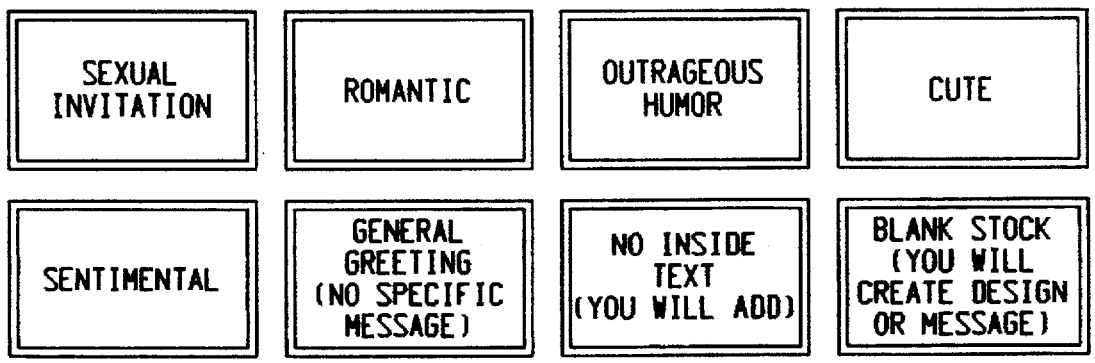

THIS IS THE LAST MENU SCREEN. YOU MAY EITHER VIEW
PREVIOUS SCREENS OR MAKE ONE OR MORE MENU SELECTIONS
AND THEN VIEW A SELECTION OF CARDS THAT REPRESENTS
A MIXTURE OF YOUR CHOICES.

*Fig. 8*

SCROLL TYPE MENU

| LANGUAGE: | PURPOSE: | MESSAGE STYLE: | TEXT STYLE: | PLEASE MAKE NEXT CHOICE IN THIS COLUMN → RELATIONSHIP: |
|---|---|---|---|---|
| ENGLISH | BIRTHDAY GREETING | SENTIMENTAL | POETRY | RELATIVE |
| FRENCH | GET WELL | CUTE | PROSE | FRIEND |
| SPANISH | WEDDING ANNIVERSARY | HUMOROUS | BLANK INSIDE | LOVER |
| | HOLIDAY GREETING | | | CO-WORKER |
| | | | | (CHOOSE ONE OR MORE FROM THIS COLUMN) |

SO FAR, YOU HAVE CHOSEN:

ENGLISH - BIRTHDAY GREETING - CUTE - POETRY

DO YOU WISH TO SEE A SELECTION OF CARDS NOW OR CHOOSE FROM ADDITIONAL MENUS?

| DISPLAY CARD SELECTION NOW | | SHOW MORE SUB-MENUS |

DO YOU WISH TO SEE A MIXTURE OF GENERAL AND SPECIFIC CARDS?

| GENERAL ONLY | SPECIFIC ONLY | MIXTURE OF GENERAL AND SPECIFIC |

*Fig. 9*

PRODUCT LIST 0010

| CONNECTED DIRECTORIES | USE DESCRIPTIONS |
|---|---|
| PRIMARY ABBB<br>ABBA<br>ABAA | BIRTHDAY - CUTE - POETRY<br>BIRTHDAY - CUTE<br>BIRTHDAY |

PRODUCTS CLASSED BY SPECIFICITY

SPECIFIC (MEETS THREE USE DESCRIPTIONS)

| USE DESCRIPTIONS | PRODUCT CODES |
|---|---|
| BIRTHDAY - CUTE POETRY | A109<br>B172 |
| BIRTHDAY - CUTE FRIEND - POETRY | A108 |
| BIRTHDAY - CUTE RELATIVE - POETRY | A406 |

MODERATELY SPECIFIC (MEETS TWO USE DESCRIPTIONS)

| USE DESCRIPTIONS | PRODUCT CODES |
|---|---|
| BIRTHDAY - CUTE | A124, B345<br>B411 |
| BIRTHDAY - CUTE THINKING OF YOU | A135, A137 |
| BIRTHDAY - LOVE POETRY | A246, B311 |

GENERAL (MEETS ONE USE DESCRIPTION)

| USE DESCRIPTIONS | PRODUCT CODES |
|---|---|
| BIRTHDAY | A100, A107<br>A116 |
| LOVE - POETRY | A135, B410<br>B516 |
| THINKING OF YOU CUTE | A143, B062 |

*Fig. 10A*

PRODUCT LIST 0011

| CONNECTED DIRECTORIES | USE DESCRIPTIONS |
|---|---|
| PRIMARY ACAA<br>ACAB | FRIENDSHIP - ROMANTIC - CUTE<br>FRIENDSHIP - ROMANTIC - HUMOROUS |

PRODUCTS CLASSED BY MODIFIABILITY

NOT MODIFIABLE

| USE DESCRIPTIONS | PRODUCT CODES |
|---|---|
| FRIENDSHIP - ROMANTIC HUMOROUS | A155<br>A159 |
| THINKING OF YOU CUTE | B062 |

MODIFIABLE BY CUSTOMER (FILL IN THE BLANKS)

| USE DESCRIPTIONS | PRODUCT CODES |
|---|---|
| FRIENDSHIP - ROMANTIC ANYONE TO ANYONE | A253 |
| ANY OCCASION ROMANTIC - HUMOROUS | C141<br>D061 |

MODIFIABLE BY CUSTOMER (DELETE AND REPLACE)

| USE DESCRIPTIONS | PRODUCT CODES |
|---|---|
| FRIENDSHIP - ROMANTIC POETRY MALE TO FEMALE | A255 |
| BIRTHDAY - CUTE | B041 |

MODIFIABLE BY COMPUTER (DELETE INSIDE TEXT)

| USE DESCRIPTIONS | PRODUCT CODES |
|---|---|
| FRIENDSHIP - ROMANTIC POETRY (INSIDE) | B050<br>B013 |

*Fig. 10B*

PRODUCT LIST 0012

| CONNECTED DIRECTORIES | USE DESCRIPTIONS |
|---|---|
| PRIMARY ADBB | VALENTINE - ROMANTIC - POETRY |

COMPLETE PRODUCTS STORED SEPARATELY FROM ASSEMBLED PRODUCTS

| COMPLETE PRODUCTS | |
|---|---|
| USE DESCRIPTIONS | PRODUCT CODES |
| VALENTINE ROMANTIC - POETRY | B103 |
| VALENTINE - CUTE | C134 |

| ASSEMBLED PRODUCTS | | |
|---|---|---|
| USE DESCRIPTIONS | COMPONENT CODES | ASSEMBLY PROGRAMS |
| GRAPHICS: LOVE TEXT: ROMANTIC POETRY | G033 X041 | G33X90 |
| TITLE: BIRTHDAY ANYONE GRAPHICS: BIRTHDAY TEXT: HUMOROUS | T006 G012 X053 | T67G12X13 |

*Fig. 10C*

PRODUCT LIST 0013

| CONNECTED DIRECTORIES | USE DESCRIPTIONS |
|---|---|
| A) PRIMARY ABCC | BIRTHDAY - FRIEND - HUMOROUS |
| B) ABCA | BIRTHDAY - FRIEND - CUTE |
| C) ABDC | BIRTHDAY - ANY RELATIVE - HUMOROUS |

| PRODUCT CODE | OTHER LISTS | USE DESCRIPTIONS | MOD. PROG. | USE DESC. COV'G. | BASE PRIORITY RATINGS | MODIFIED PRIORITY RATINGS |
|---|---|---|---|---|---|---|
| | | COMPLETE PRODUCTS | | | | |
| A121 | NONE | BIRTHDAY-FRIEND HUMOROUS | NONE | A3 B2 C2 | A3.0 B2.6 C2.5 | A3.1 B2.9 C2.5 |
| A223 | 0023 | BIRTHDAY-FRIEND HUMOROUS | NONE | A3 B2 C2 | A3.5 B2.8 C2.8 | A3.2 B2.4 C2.6 |
| A234 | 0023 0072 | BIRTHDAY-FRIEND HUMOROUS | NONE | A3 B2 C2 | A2.6 B2.0 C2.3 | A2.6 B2.0 C2.3 |
| B156 | 0035 | FRIEND - HUMOROUS | NONE | A2 B1 C1 | A1.6 B1.1 C0.9 | A1.7 B1.2 C1.0 |
| B157 | 0022 | BIRTHDAY BROTHER - CUTE | CDT | A1 B2 C1 | A3.0 B7.3 C3.5 | A2.7 B6.7 C3.1 |
| C054 | 0061 | FATHER'S DAY HUMOROUS | CDT CDP | A1 B0 C1 | A1.8 B0.5 C2.0 | A1.9 B0.6 C2.1 |
| C112 | 0035 0037 | ANY OCCASION ANYONE - CUTE | NONE | A0 B1 C0 | A1.3 B1.6 C0.8 | A1.5 B1.7 C0.9 |
| C200 | NONE | NUMBERED BIRTHDAY HUMOROUS | FIB | A2 B1 C2 | A4.6 B1.9 C2.2 | A4.9 B2.1 C2.3 |
| | | ASSEMBLED PRODUCTS | | | | |
| T012 X022 G014 | 0032 0035 0065 | TITLE: BIRTHDAY ANYONE TEXT: HUMOROUS GRAPH.: BIRTHDAY | T6G5X | A2 B1 C2 | A5.4 B2.4 C3.8 | A5.5 B2.4 C3.7 |
| P122 P246 | 0039 0067 | PAGE 1: BIRTHDAY FRIEND PAGE 2: CUTE | T1G3X | A2 B2 C1 | A2.6 B2.8 C1.5 | A2.8 B2.9 C1.6 |

*Fig. 10D*

SUITABILITY CODING SYSTEM

| GENERAL FACTOR | SPECIFIC FACTOR | FACTOR SUITABILITY | CODE |
|---|---|---|---|
| (A) LOCATION | (A) COLLEGE TOWN | (1) HIGHLY SUITABLE<br>(2) MODER. SUITABLE<br>(4) MOD. UNSUITABLE<br>(5) HIGHLY UNSUIT. | AA1<br>AA2<br>AA4<br>AA5 |
| | (B) CANADA | (1) HIGHLY SUITABLE<br>(3) NEUTRAL<br>(5) HIGHLY UNSUIT.<br>(7) PRECLUDED | AB1<br>AB3<br>AB5<br>AB7 |
| | (C) TOURIST AREA | (1) HIGHLY SUITABLE<br>(3) NEUTRAL<br>(5) HIGHLY UNSUIT. | AC1<br>AC3<br>AC5 |
| (B) TYPES OF CUSTOMERS | (A) RETIRED | (1) HIGHLY SUITABLE<br>(3) NEUTRAL<br>(5) HIGHLY UNSUIT. | BA1<br>BA3<br>BA5 |
| | (B) TEEN AGE | (1) HIGHLY SUITABLE<br>(3) NEUTRAL<br>(5) HIGHLY UNSUIT. | BB1<br>BB3<br>BB5 |
| | (C) OFFICE WORKERS | (1) HIGHLY SUITABLE<br>(3) NEUTRAL | BC1<br>BC3 |
| (C) SPECIAL TIME PERIODS | (A) FOOTBALL (AUG.-JAN.) | (1) HIGHLY SUITABLE<br>(3) NEUTRAL | CA1<br>CA3 |
| | (B) SUMMERTIME (JUNE-SEPT.) | (1) HIGHLY SUITABLE<br>(2) MODER. SUITABLE<br>(3) NEUTRAL | CB1<br>CB2<br>CB3 |
| | (C) NOON BREAK | (1) HIGHLY SUITABLE<br>(3) NEUTRAL | CC1<br>CC3 |
| (F) DESIGN FRESHNESS | (A) 1993 AND +<br>(B) 1992 AND - | (1) HIGHLY SUITABLE<br>(3) NEUTRAL | FA1<br>FA3 |
| (P) OWNER/OPER. PREFERENCES | (A) SEXUAL THEME | (1) HIGHLY SUITABLE<br>(3) NEUTRAL<br>(7) PRECLUDED | PA1<br>PA3<br>PA7 |
| | (B) DRINKING THEME | (3) NEUTRAL<br>(7) PRECLUDED | PB3<br>PB7 |

*Fig. 11*

MASTER SUITABILITY CODE LIST

| PRODUCT CODE | PRODUCT LISTS ON WHICH PRODUCT CODE APPEARS | | SUITABILITY CODES |
|---|---|---|---|
| A104 | 0001 | BIRTHDAY - MOTHER - CUTE | AA2.AB1.AC3. AD3.BA1.BB1. FA1 |
| | 0002 | BIRTHDAY - MOTHER | |
| | 0005 | YOUR SPECIAL DAY | |
| B366 | 0023 | FRIENDSHIP - ROMANTIC - SEXUAL INNUENDO | AA1.AB3.BA5. BC1.PA3 |
| | 0025 | FRIENDSHIP - HUMOROUS - SEXUAL INNUENDO | |
| | 0033 | THINKING OF YOU - SEXUAL INNUENDO | |
| B215 | 0028 | FRIENDSHIP - HOW MUCH YOU MEAN | AB1.AD5.BA1 |
| | 0041 | THOUGHTS OF LOVE - FEMALE TO FEMALE | AB1.AC3.AD5. BA3.BC1 |
| C105 | 0051 | FOOTBALL - QUARTERBACKS - GREETINGS | AB7.AC3.BB1. CA1.FB5 |
| A301 | 0073 | GRADUATION - CONGRATULATIONS - MALE | AA1.AB3.AC3. AD5.CB1.DA1 |
| | 0037 | CONGRATULATIONS - TO MALE | AB3.AD5.BC1 |
| B191 | 0084 | FATHER'S DAY - FROM GRANDCHILD - CUTE | AA5.AB1.AC2. AD5.BA5.BB1. CA3.CB1.FA1 |
| | 0082 | FATHER'S DAY - LOVE | |
| A162 | 0046 | LOVE AND KISSES - HUMOROUS | AA1.AD5.BA5. BC3 |
| | 0014 | BIRTHDAY - LOVE - HUMOROUS | |

Fig. 12

EXPERT QUERY FORM FOR ENTERING SUITABILITY CODE DATA

| SUITABILITY FACTOR | FACTOR PORTION OF SUITABILITY CODE | ENTER RATING PORTION OF SUITABILITY CODE |
|---|---|---|
| PRODUCT CODE 0001 | | |
| LOCATION | | |
|     COLLEGE TOWN | AA | 2 |
|     UNITED STATES | AU | 1 |
|     UNITED KINGDOM | AZ | 5 |
|     SUBURBAN | AS | 3 |
|     TOURIST AREA | AC | 5 |
| CUSTOMERS | | |
|     RETIRED | BA | 5 |
|     TEEN AGE | BB | 1 |
|     OFFICE WORKERS | BC | 1 |
| TIME PERIODS | | |
|     NOON BREAK | CC | 3 |
|     SPRING | CS | 1 |
| PRODUCT CODE 0091 | | |
| LOCATION | | |
|     COLLEGE TOWN | AA | 5 |
|     NORTHEASTERN UNITED STATES | AN | 1 |
|     FLORIDA | AF | 2 |
| CUSTOMERS | | |
|     MIDDLE INCOME | BM | 1 |
|     FACTORY WORKERS | BF | 4 |
|     AIRPORT TRAVELERS | BT | 2 |
| TIME PERIODS | | |
|     SUNDAY | CR | 1 |

ENTER FACTORS RELATING TO OWNER OPERATOR PREFERENCES:

| | FACTOR | FACTOR PORTION OF CODE |
|---|---|---|
| PRODUCT CODE 0023 | SEXUAL THEME | PA |
| | 1993 AND LATER | FA |
| PRODUCT CODE 0025 | DRINKING THEME | PB |
| | 1992 AND EARLIER | FB |

*Fig. 13*

OWNER/OPERATOR:

CHOOSE THE SUITABILITY OF PRODUCTS WITH SEXUAL THEMES:

(PA1) HIGHLY SUITABLE       (PA4) MODERATELY UNSUITABLE (PA2) MODERATELY SUITABLE   (PA5) HIGHLY UNSUITABLE (PA3) NEUTRAL               (PA6) PROHIBIT

CHOOSE THE SUITABILITY OF PRODUCTS WITH DRINKING THEMES:

(PB3) NEUTRAL               (PB7) PROHIBIT

CHOOSE YOUR PREFERENCE FOR PRODUCT FRESHNESS:

(FA1) PREFER 1993 AND LATER PRODUCTS (FA3) NEUTRAL ON WHETHER PRODUCTS ARE 1993 OR LATER

*Fig. 14A*

OWNER/OPERATOR:

CHOOSE THE DESIRED PERCENTAGE OF PRODUCTS
HAVING THE FOLLOWING CHARACTERISTICS:

ENTER PERCENTAGE,
DIVISIBLE BY 10:
(PERCENTAGES SHOULD TOTAL
100% IN EACH CATEGORY)

SPECIFICITY OF DESIGN:
MAXIMUM SPECIFICITY (4 MATCHING USE DESCRIPTIONS): _____
MODERATE SPECIFICITY (3 MATCHING USE DESCRIPTIONS): _____
LITTLE SPECIFICITY (2 MATCHING USE DESCRIPTIONS): _____
GENERAL _____
WRITE YOUR OWN _____

CAPABILITY FOR CUSTOMER MODIFICATION:
FILL IN THE BLANKS _____
DELETE WORDS/PHRASES/PAGES _____
NOT MODIFIABLE _____

CAPABILITY FOR COMPUTER MODIFICATION:
NOT MODIFIABLE _____
DELETE WORDS/PHRASES/PAGES _____
ALTER WORDS/PHRASES/PAGES _____

PRODUCT ASSEMBLY:
PRE-ASSEMBLED PRODUCT _____
COMPUTER ASSEMBLE FROM COMPONENTS _____

NUMBER OF PRODUCTS DISPLAYED TO CUSTOMER:
MAXIMUM NUMBER _____

*Fig. 14B*

OWNER/OPERATOR:

INDICATE THE LOCATION OF YOUR MACHINE:

NORTHERN UNITED STATES

SOUTHERN UNITED STATES

FLORIDA

UNITED KINGDOM

CANADA

SUBURBAN

COLLEGE TOWN

TOURIST AREA

INDICATE THE TYPE OF CUSTOMERS
MOST OFTEN USING THIS MACHINE:

RETIRED

TEEN AGE

YOUNG ADULTS

OFFICE WORKERS

FACTORY WORKERS

*Fig. 15*

METHOD AND APPARATUS FOR STORING AND SELECTIVELY RETRIEVING AND DELIVERING PRODUCT DATA BASED ON EMBEDDED EXPERT JUDGEMENTS

FIELD OF THE INVENTION

This invention relates to machines and methods that store, retrieve and deliver data. More particularly, the invention relates to machines and methods that store product images, video data, audio recordings or other data in digital or analog form and retrieve portions of such data in response to data entries by a customer. These machines and methods also display the retrieved data portions to the customer and allow the customer to select and, in some cases, modify data relating to the product he desires. Then the data may be delivered to the customer in the form of a printed product, a sound recording or a video image or the customer may be allowed to place an order for the data or a related product. Examples of such machines and methods are those that produce greeting cards, other social expression products, photographs, motion pictures, television programs, musical recordings, gift products, literary works and reference data.

BACKGROUND OF THE INVENTION

In a conventional retail, catalogue or library environment, customers are able to browse quickly and conveniently through large physical displays of products, in the course of which they inspect images, read words, listen to music and/or engage in other reviewing activities, until they find the specific product most suitable for their needs, interests or tastes. Under these conventional circumstances, customers can and do exercise their discriminating judgments and mental processes to make selections.

Recently, machines have been introduced that replace these large physical product displays by storing data relating to the products in magnetic or optical storage devices. The customer can then retrieve and review portions of the data on a video screen and audio system, by giving instructions on a keyboard or touchscreen that is connected by a programmed computer to the storage devices holding the data.

In simple situations involving such machines, the retrieval of the data is easily managed by conventional methods. For example, that is the case when inputting or selecting a title, an object image or a few descriptive words can communicate to a machine all of the information required to specify the data file or files that a customer wants to retrieve and display. Product characteristics are identified by allowable combinations of customer entered data. The computer can be programmed to retrieve the file or files that the user specifies, either by accessing known locations in a data storage device or by searching a data base to find the files whose identities match the descriptive words input by the customer. An example of a machine and method that accesses data from known storage locations is shown in U.S. Pat. No. 3,757,037 to Norman Bialek. An example of a machine and method that searches a data base to find files whose identities match descriptive words is shown in U.S. Pat. No. 5,056,029 to Thomas G. Cannon.

However, these machines and methods are not satisfactory in certain circumstances. This is the case, for example, where it is not desirable to restrict the identities of product data files to fixed combinations or specific sets of allowable customer entry data. Many buyers of products and users of information cannot easily give the exact word or words necessary for retrieving data either from known storage locations or by data base searching. The suitability of products, especially those that have rich aesthetic, intellectual or entertainment values, often cannot be described by single combinations of descriptive words. Thus, it may be necessary to provide the capability for several different forms or contents of customer data entry to access and retrieve a given product data file. Sometimes, a customer will be able to specify only a few criteria for products that he wants to view, while those products are identified by many descriptive words. Sometimes, a customer's specific criteria should be considered as suggestive only and a wide range of product files should be shown to him, some of which have very few, if any, of the exact criteria specified by the customer. Conversely, some data files may apply to and ought to be retrievable in response to many different sets of customer purposes, interests, needs or tastes. In addition, these files may have varying degrees of suitability for a particular set of customer criteria, rather than being designated as either suitable or not suitable. In such cases, the customer might prefer to see files of such varying suitability in the order of their anticipated suitabilities, from the highest to the lowest. Also, different customers may prefer to see different numbers of products having a range of suitabilities. Furthermore, the relative anticipated suitability of a data file for a particular intended purpose may vary with the type of customers generally using the machine, the geographic location and environment of the machine, the time of year, the wishes of the machine owner or operator and other factors. Relative suitabilities may even vary with individual customers. In addition, the relative suitability of a data file may be a property that should be fine tuned based on previous customer selections.

All of the aforementioned circumstances and needs can best be served by a system which embodies one or more kinds of expert judgment data for the purpose of selectively retrieving an optimally appropriate set of product data in response to any allowable customer data entry set.

SUMMARY OF THE INVENTION

The apparatus and method of this invention are designed to meet the forgoing data retrieval needs. They allow a customer to enter data relating to his product interests that is not restricted to and need not be matched to the data sets that identify product files. Product files may be retrieved in response to a wide variety of sets of customer data entries.

Accordingly, an object of this invention is to provide an improved method and apparatus for storing, retrieving and delivering product data that enables data relating to general purpose and multipurpose products to be used to serve a variety of customer needs.

Another object is to provide an improved method and apparatus for storing, retrieving and delivering product data that allows one set of customer entered criteria to access data relating to a variety of different products of varying applicability to the criteria, from a general applicability to a more specific applicability.

Another object is to provide an improved method and apparatus for storing, retrieving and delivering product data that allows data relating to a product designed for a specific purpose to be retrieved in response to customer entered criteria relating to another purpose but presented in a modified form that more closely fits the other purpose.

Another object is to provide an improved method and apparatus for storing, retrieving and delivering product data that allows a product designed for a specific purpose to be retrieved in response to customer entered criteria relating to another purpose and also allows the customer to modify the product to more closely fit the other purpose;

Another object is to provide an improved method and apparatus for storing, retrieving and delivering product data that displays the data for a plurality of products based on a designated or internally generated priority order that is related to customer entered criteria, with or without the superposition of a randomizing process.

Another object is to provide an improved method and apparatus for storing, retrieving and delivering product data that displays data relating to a plurality of products, a specific percentage of which are only generally related to customer entered criteria.

Another object is to provide an improved method and apparatus for storing, retrieving and delivering product data that allows data relating to separate components of products to be retrieved and assembled in various combinations for display in response to customer entered criteria.

Another object is to provide an improved method and apparatus for storing, retrieving and delivering product data that allows the display of data relating to a plurality of products to be altered to accommodate different individual users or customers, different market conditions or characteristics, different time periods and different owner/operator preferences. Specifically, the display may be modified by changing the sequence in which the products are displayed, by changing the likelihood of certain products being displayed or not displayed and by prohibiting the display of certain products.

These objects of the invention are accomplished by a method and apparatus in which (a) product data relating to a plurality of products are stored in a data storage device; (b) customer data entry sets are stored in a data storage device, each customer data entry set indicating possible criteria for a product desired by a customer; (c) a plurality of product lists are stored in a data storage device, each product list referencing sets of product data relating to products having common applications; (d) at least one product list is connected to a plurality of customer data entry sets; (e) a customer is requested to indicate criteria relating to a desired product; (f) the criteria are received from the customer; (g) the customer data entry set or sets are selected that best correspond to the criteria received by the customer; (h) the product lists connected to the selected customer data entry set or sets are retrieved; (i) the sets of data relating to the products referenced on the retrieved product lists are retrieved and displayed; (j) the customer is requested to select one of the products whose set of data is displayed; (k) the customer's product selection is received; and (l) the selected product or set of data relating to the selected product is delivered to the customer.

One of the options that may be included in the apparatus and method of the invention is a program that allows a customer to enter data that modifies the selected product or data set by adding, deleting or substituting words or graphical elements of the product or data set.

Another option that may be included in the apparatus and method of the invention is the storage of priority ratings for each product indicative of expert judgments of the application suitability of the product.

Still another option that may be included in the apparatus and method of the invention is a program that allows users, customers, owner/operators or others to enter data that cause the priority ratings stored for the product to be modified, thereby enabling the system to accommodate individual needs or specific market circumstances.

The method and apparatus of this invention therefore enables a customer to enter a combination of words expressing his product criteria and in response receive a display of a variety of products that are likely to be of interest to him whether explicitly specified or not. In addition, data relating to an individual product is capable of being retrieved in response to a variety of customer needs expressed by many different possible sets of data that might be entered by a customer. That allows a relatively small library of product data files to serve a wide variety of customer needs and interests and also allows one customer's specified criteria to cause the retrieval and display of data relating to a wide range of products that meet the criteria with varying degrees of specificity.

These and other objects, advantages and features of the invention will be more apparent from the following detailed description and attached drawings.

BRIEF DESCRIPTION OF THE DRAWINGS

FIGS. 5, 6, 7, 8 and 9 show sample menu screens that may be presented on the video display screen of the apparatus of FIGS. 1A and 1B;

FIGS. 10A, 10B, 10C and 10D show sample product lists that may be stored in the data storage device of the apparatus of FIGS. 1A and 1B;

FIG. 11 shows a sample suitability coding system that may be used in storing data in the data storage device of the apparatus of FIGS. 1A and 1B;

FIG. 12 shows a sample master suitability code list that may be stored in the data storage device of the apparatus of FIGS. 1A and 1B;

FIG. 13 shows a sample list of data to be supplied by experts for entry in the data storage device of the apparatus of FIGS. 1A and 1B;

FIGS. 14A, 14B and 15 show sample owner/operator query screens for display on the video screen of the apparatus of FIG. 1A and 1B.

DESCRIPTION OF A PREFERRED EMBODIMENT

A. The Basic Parts of the System

Figure 1A:
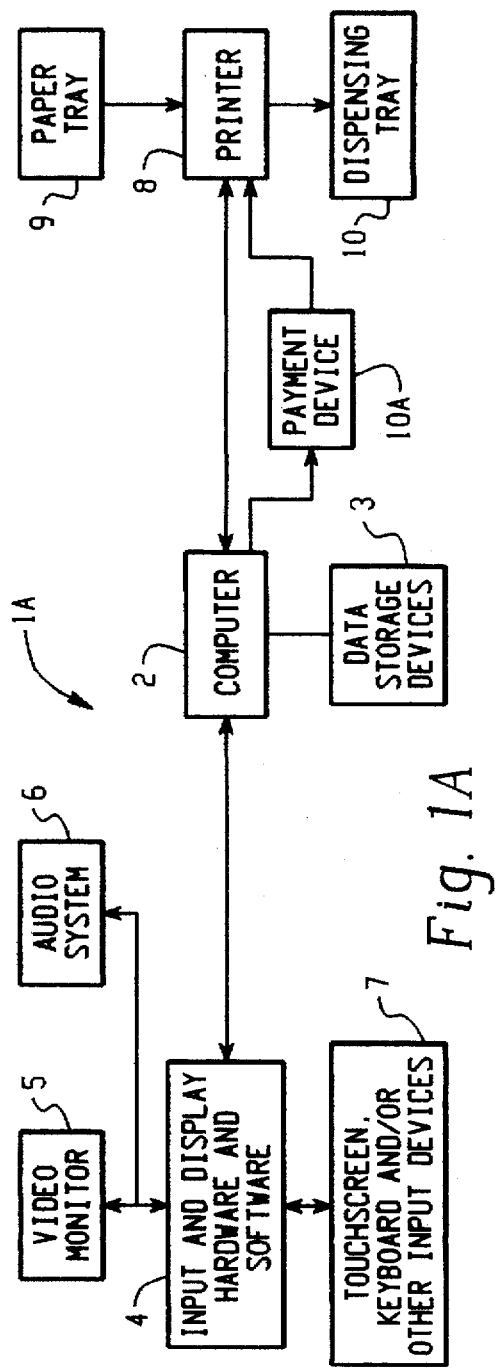
FIGS. 1A and 1B are block diagrams of apparatuses for storing and retrieving product data relating to social expression cards, showing several embodiments of the present invention.

The apparatus 1A shown in FIG. 1A is designed for the on-site storage, retrieval and delivery of social expression cards in a retail store. A single apparatus 1A performs all these functions at one location. This is the apparatus that will be shown and described in detail for the purpose of illustrating one embodiment of the present invention. It includes a programmed computer 2 and data storage device 3 connected to the computer 2. The apparatus 1A also includes input and display hardware and software 4 connected to the computer 2. The input and display hardware and software 4 are in turn connected to a video monitor 5, and audio system 6 and one or more customer data input devices 7, such as a touchscreen or keyboard. In addition, the apparatus 1A includes a printer 8 and an optional payment device 10A connected between the computer 2 and printer 8. Acting on instructions from the customer or computer and with data received from the computer 2, the printer 8 takes paper from a paper tray 9, prints a social expression card and delivers it to the customer in a dispensing tray 10. Conventionally, all of these components of the apparatus 1A are housed in a single kiosk, located in a retail store or shopping mall concourse.

Figure 1B:
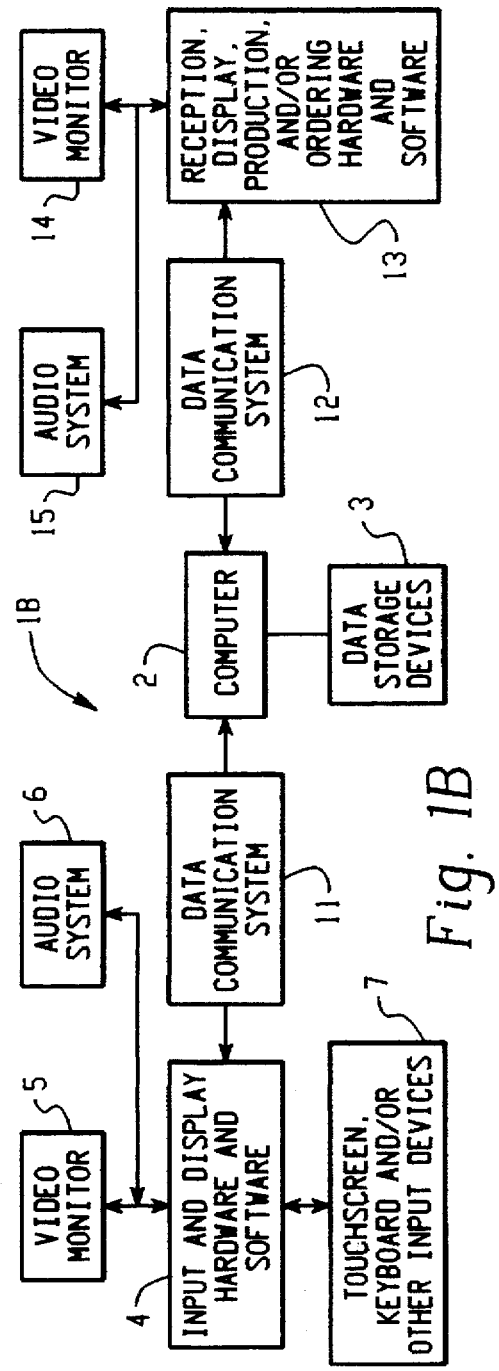

However, the present invention may also be embodied in an apparatus 1B, shown in FIG. 1B. The apparatus 1B is designed for storing and retrieving data relating not only to greeting cards but to a wide variety of other products, including still pictures, motion pictures, television programs, musical recordings, gift products, literary works and compilations of reference data. Also, the apparatus 1B is not restricted to the on-site storage, retrieval and delivery of these products. Accordingly, it includes a data communications system 11 that is connected between the computer 2 and input and display hardware and software 4, so that the hardware and software 4 and connected video monitor 5, audio system 6 and data input devices 7 may be placed at a location remote from the computer 2 and a data storage device 3. In addition, another data communications system 12 connects the computer 2 to one of a variety of remote reception, display, production and product ordering devices 13. An example of one such device would be the home computer and attached printer of a customer or a recipient to whom the customer wishes to send a product or related data, with the video monitor 14 and audio system 15 being the corresponding parts of the home computer of the customer or recipient. Thus, the home computer might receive a data file of a product selected by the customer through an input device 7 located at a retail store. After selecting a product data file at the retail store, the customer could have the file sent to the home computer for storage on an associated data storage device and/or printing on an associated printer. Alternatively, the input and display hardware and software 4 and input devices 7 could also be parts of the home computer and the video monitors 5 and 14 as well as the audio systems 6 and 14 could be one and the same parts of the home computer. The customer could then send data relating to the kind of product he desires to a remote computer 2 and data storage device 3, which would in turn retrieve data files responsive to those desires and send them back to the customer's computer. The customer would then select the product he wants and, depending on the type of product, either have the product printed on his or some recipient's printer, order the product by E-mail or other transmission means, or if the product is a still or motion picture, have it displayed on his or another recipient's television screen. He could also have the product file stored on a read/write CD-ROM disc or other media for recording pictures and/or sound.

The apparatus 1A, designed for the on-site storage, retrieval and delivery of social expression cards, will now be described in detail. The video monitor 5 is preferably a CTX 5468A Super VGA color monitor with a 0.28 dot pitch. Preferably the data input device 7 is a touchscreen that covers the monitor 5. The touchscreen 7 is a transparent, pressure sensitive plate capable of sensing a location where it is touched by a customer. One touchscreen that may be utilized with the present invention is a model E-274 from Elographics Company of Oak Ridge, Tenn.

Preferably, the printer 8 is a Hewlett-Packard 7550B (plus) plotter that is capable of detecting its paper loading status and automatically reloading paper to prepare for the next operation without receiving control instructions from the computer 13. This plotter has a one megabyte RAM upgrade with 70 ns chips and a "B" size card stock loading tray. The printer 8 should also have a four layer plotter control board, an Intel based 12 kHz 8031 micro controller with a programmable EPROM, a 26 pin DC input/output, a 7400 based chip set digital logic, three toroids and two wire sets.

An optional part of the apparatus 1A is a payment device 10A that is designed to receive money from customers in payment for printed cards. The payment device 10A is connected to the computer 2, which instructs the device 10A on the amount of money to collect. The payment device 10A is also connected to the printer 8 and prevents the printer from operating until it has received the amount of money specified by the computer 2. The payment device 10A may include a coin acceptor that has a Model C-120 electronic validator with a standard (S10 compatible) body, available from Coin Controls Inc., 1859 Howard Street, Elk Grove Village, Ill. 60007. The device 10A may also include Mars VFM4 electronic bill acceptor with an upstacker body, available from Mars Electronics International, 1301 Wilson Drive, West Chester, Pa. 19380. In addition, device 10A may have a vending controller board for accepting credit cards, including a thermal printer, a cutter mechanism and a magnetic stripe reader, per Standard Industries specification dated May 23, 1993, available from Standard Industries, Kontrolle Division, 14250 Gannet Street, La Mirada, Calif. 90638.

The audio system 6 allows the computer 2 to send verbal operating instructions to the customer. The computer 2 may also be equipped to send messages through the speakers to potential customers, encouraging them to use the machine. The audio system 6 preferably includes two speakers, each with a 3 to 4 watt output and equipped with their own individual power supply and a one amp transformer.

The computer 2 displays card designs, card design components and card design criteria on the monitor 5, inviting a customer to make selections. The customer makes selections by pressing the locations of the touchscreen 7 that cover the portions of the monitor 5 that display the desired designs, components and criteria. The touchscreen 7 then sends those selections to the computer 2.

The computer 2 preferably has mini-tower chassis with dual fans, a 486/33 mhz DX Intel chip upgradable processing system, a 16 megabyte random access memory (RAM) (70 ns), a sound blaster compatible sound board with midi capacity, a Sony internal CD-ROM (CDU-535-01), a Sony bus adapter OPA-461 with a custom "pre-fetch cache" that includes dealer integration of a component level circuit bypass jumper, a Sony custom pre-fetch cache driver, an ATI Mach 32 video accelerator card with a one megabyte Vram, an Elographics touchscreen board, a non bootable 1.44 megabyte Teac or Sony floppy disk drive, a 128 k cache, a 200 watt power supply, three parallel printer ports and two serial printer ports. The computer 2 is preferably loaded with Microsoft DOS 5.0 software and Fastlynx 2.0 transfer software.

The data storage device 3 connected to the computer 2 may include any combination of replaceable, remote, or built-in digital or analog data storage systems. The digital data storage systems may include magnetic disks or tapes, magnetic or electromagnetic storage media, or optical storage media and these storage media may be capable of temporary and/or permanent data storage.

Figure 2:
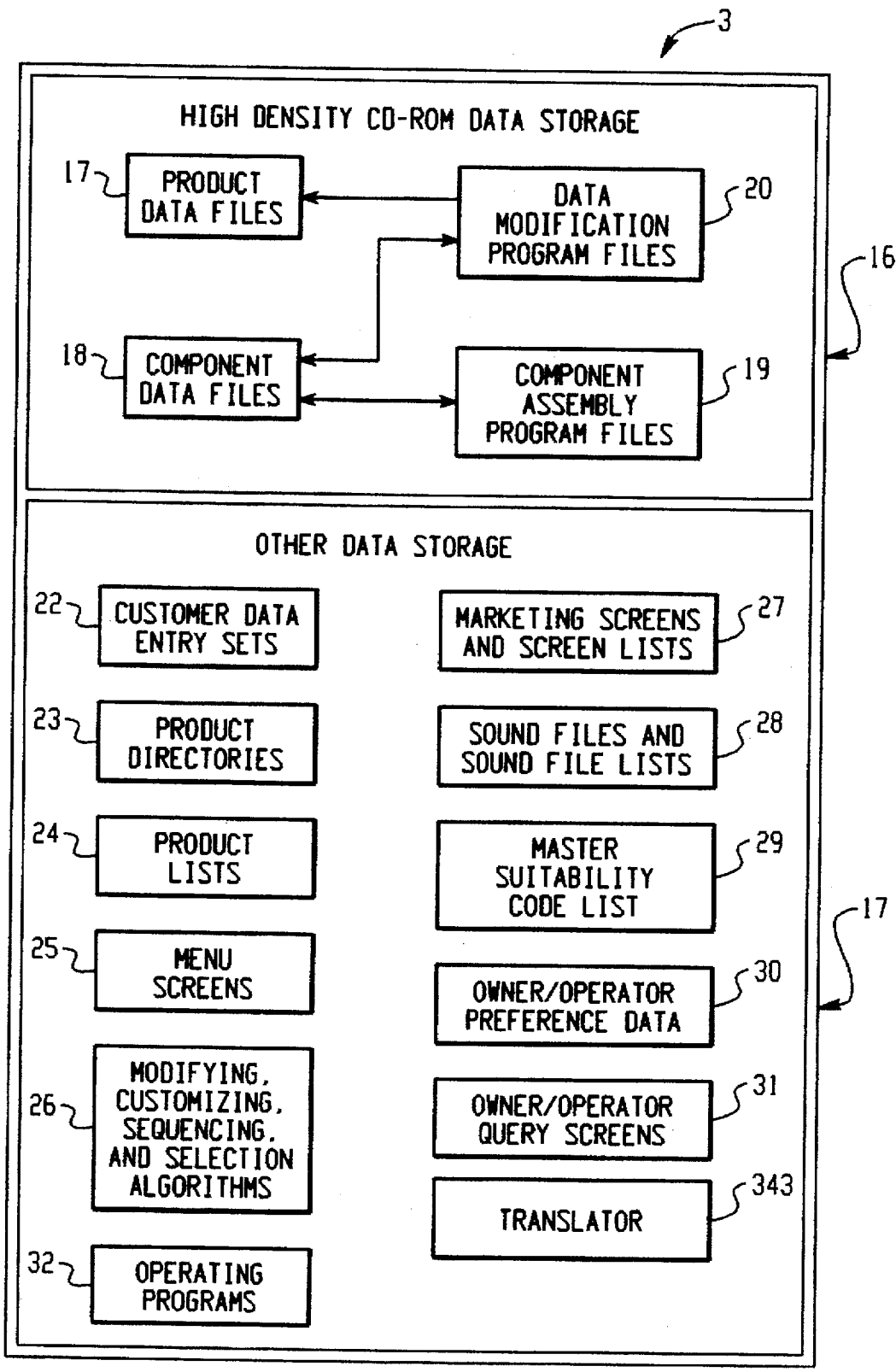
FIG. 2 is a block diagram of a data storage device that is part of the apparatus of FIGS. 1A and 1B.

As shown in the schematic diagram of FIG. 2, the data storage device 3 includes a high density storage unit 16, in which are stored product data files 17 and product component data files 18, together with product codes that identify the data files 17 and 18. In the preferred embodiment, the product codes consist of simple alphanumeric character strings. However, they may be titles, names or any other identifying symbols.

The storage device 16 preferably comprises optical disc devices that use CD-ROM or other high density storage means. The files 17 and 18 stored in these devices include all the information necessary to display and, preferably, print social expression products or components. The files for each product or product component may be duplicated, with one compact version designed for the display of the product on a video monitor and the other designed for printing the product. In addition, the files 17 for displaying complete products may be stored separately from the files 18 for displaying product components, and the printing files may be likewise separated. The CD-ROM optical discs may also contain assembly program files 19 for assembling various component designs to form complete products. The optical discs may further contain data modification program files 20 that enable the customer and/or the computer to modify a selected product data file 17 or component data file 18 prior to display or printing. If the storage device 16 comprises CD-ROM optical disc devices, the product data files 17 and 18 may be changed periodically simply by substituting new discs for old discs. If the CD-ROM memory is of the read-only type, no product data file and or its product code can be changed except by replacing the disc on which it is stored.

The data storage device 3 also includes another data storage unit 21. Some or all of the data files in the unit 21 may be stored on the same CD-ROM discs that contain the product data, on other CD-ROM discs, or on other types of data storage devices, preferably of the high density type. Some of the data files in the unit 21 may be stored in read/write memory (such as hard drives) to enable appropriate additions, deletions or modifications of data. This applies, for example, to product lists containing priority rating data. These various data files include customer data entry sets 22, product directories 23, product lists 24, menu screens 25, modifying, customizing, sequencing and selection algorithms 26, marketing screens and screen lists 27, sound files and sound file lists 28, a master suitability code list 29 an owner/operator profile data list 30, owner/operator query screens 31 and a translator 343. In addition, these data files include the operating program modules 32, shown in detail in the flow diagrams of FIGS. 16 to 34.

B. The Entry of Customer Data and Determination of Products to be Displayed

Figure 3:
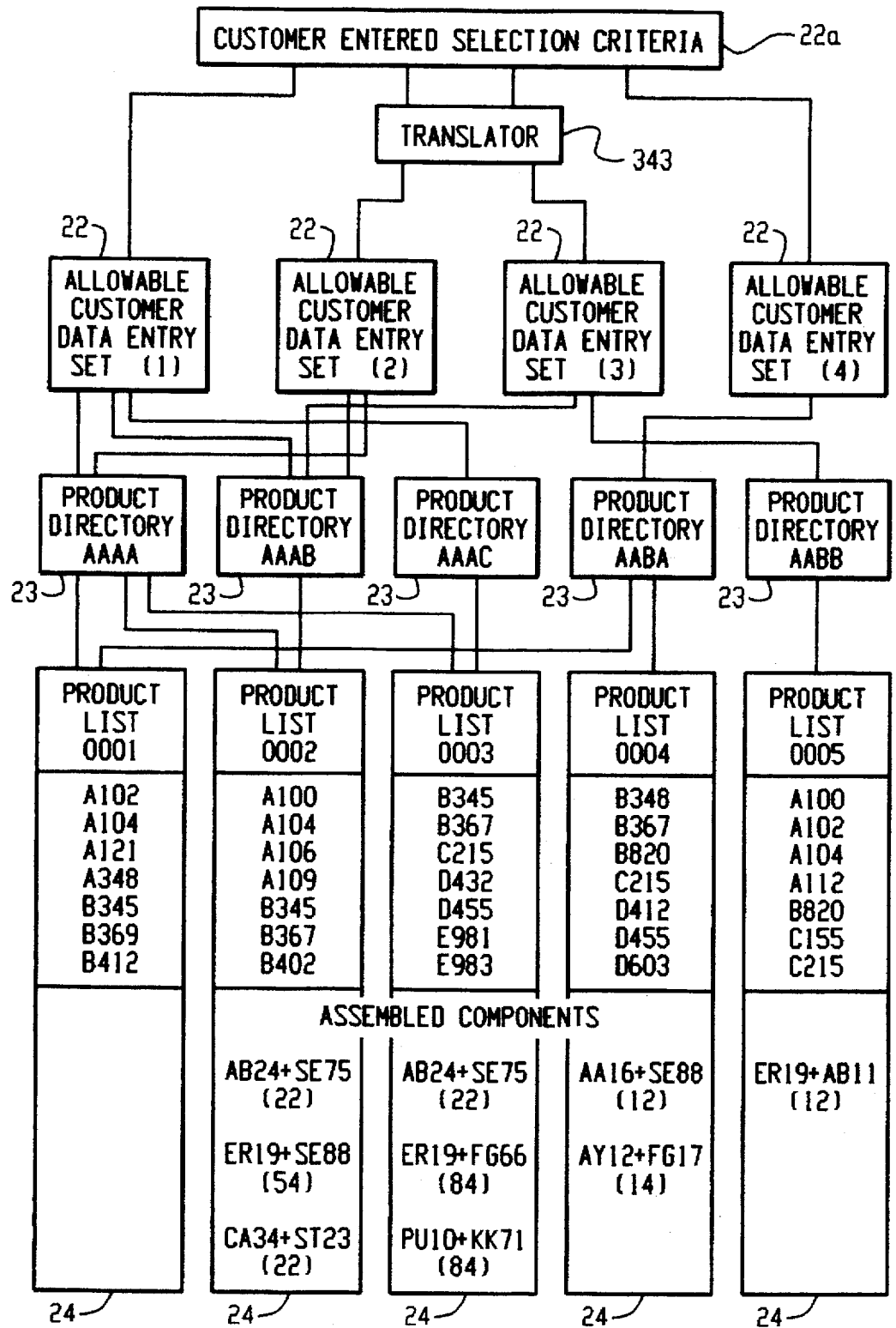
FIGS. 3 and 4 are block diagrams showing connections between various data files stored in the data storage device of the apparatus of FIGS. 1A and 1B.
Figure 4:
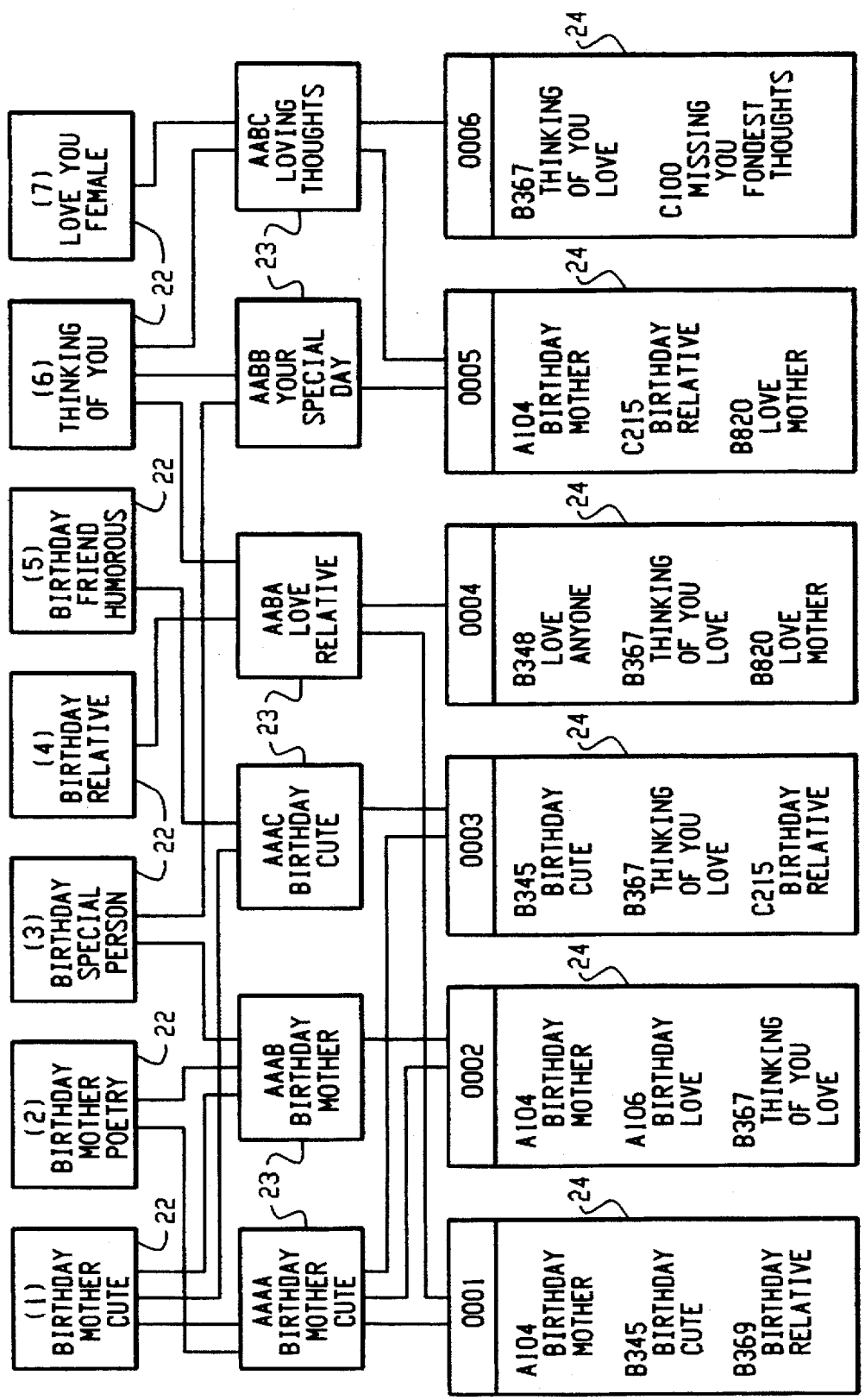

As illustrated in FIGS. 3 and 4, social expression product images are retrieved in response to one or more customer data entry sets 22 that are determined by product criteria 22a chosen by the customer. In response to a set of customer entered selection criteria 22a, a product selection module 300 (FIGS. 16 and 28 to 33) retrieves one or more of a number of customer data entry sets 22 and the product directories 23 (FIGS. 2, 3 and 4) associated with those data entry sets. Examples of various customer data entry sets 22 and product directories 23 and how they might be associated are shown in FIGS. 3 and 4. Each product directory 23 is identified by an alphanumeric character string and is specifically designed to retrieve products meeting a certain combination of criteria, such as, for example, "Birthday," "Mother," "Cute" and "Poetry," or perhaps a more general combination such as "Birthday" and "Mother."

Each product directory 23 is in turn associated with one or more product lists 24 (FIG. 2, 3 and 4). As FIGS. 3 and 4 show, each product list 24 is identified by an alphanumeric character string and contains the product codes for those products that meet to some minimally acceptable degree, as determined by expert judgment, the specific use descriptions of one of the product directories 23. However, in addition to its primary product directory 23, each product list may also be retrievable by other product directories such as those that have criteria combinations that are met only generally or only partially by the products on the list. Thus, the products whose codes are on a given product list correspond, at least to some degree, to the criteria represented by all of the product directories that are capable of retrieving the list and, in turn, these products also meet, at least to some degree, the criteria represented by all of the customer data entry sets that are capable of retrieving the mentioned product directories. Individual products are, therefore, potentially retrievable in response to any of a plurality of customer data entry sets and, conversely, any of a plurality of data entry sets may lead to the retrieval of a single product.

The individual products eligible for retrieval in response to a given customer data entry set 22 may be changed at any time simply by modifying either the identities of the product directories 23 associated with that data entry set, the identities of the product lists 24 associated with a product directory with which the customer data entry set is associated, or the identities of the products on a product list 24 with which an associated product directory is in turn associated.

Once a product has been chosen for retrieval because its product code appears on a product list that is associated, through the product directories, to a customer data entry set, the product may be retrieved immediately because its identity and location are known. No database search is needed.

A customer selection module 320 (FIG. 30) contains programming instructions for displaying various menus and sub-menu screens 25 on the monitor 5. Each menu screen 25 consists of key words or symbols indicative of various criteria or properties that the customer may wish his product to possess. The customer is asked to choose one or more of the words or symbols by pressing the area of the touchscreen 7 that overlays the desired words or symbols. After the customer makes his selection by pressing the touchscreen 7, the customer selection module 320 (FIG. 30) retrieves and displays either another menu containing a different category of words or symbols or a sub-menu containing words or symbols in an allowable subcategory that forms part of the broader category of the words or symbols of the first menu.

Preferably, the menu screens 25 are organized to enable the customer to gain an overview of the various product categories and subdivisions of categories stored in the product data files 17 and 18 and then quickly review those category subdivisions that have the greatest potential interest. The menu screens 25 should therefore be organized to display the most general product categories first, that is, those represented by a single criterion or characteristic, and then successively more specific categories, that is, those represented by larger and larger combinations of criteria or characteristics. In addition, the customer selection module 320 allows the customer to move backwards through the menus in order to view those that have been previously displayed. This feature helps the customer in his effort to learn all the different categories and subcategories of products available for his choice and how they are organized.

Examples of product categories and subcategories that might be displayed on the menus are various languages in which the products are written, product price ranges and physical properties such as the size or type of paper. A menu may also display sending occasions such as "Birthday," "Anniversary" "Graduation," "Valentine's Day," "Easter" and other holidays. Another menu may display text references to a sender-receiver relationship, such as "Father," "Mother" and "Son," and still another menu may display various text styles, such as "Humorous," "Sexual Innuendo," and "Sentimental." Another menu might display literary styles, such as "Poetry" and "Prose" and another menu, types of designs such as "Flowers," "Sailboats" and "Christmas Tree." An example of a typical series of menus is shown in FIGS. 5 through 8, inclusive.

As FIGS. 5 through 8 show, each menu also contains a message that prompts the customer to select one of the categories contained on the menu. After selecting one of these categories by touching the touchscreen 7 in the appropriate place, the customer is given two display options. One option is to view the next menu, the content of which may or may not be dependent on the category he has just chosen. The other option is to view a selection of products from the product list or lists 24 that are associated, through product directories 23, with the customer data entry set or sets 22 that correspond to the menu selection or selections that he has previously made. The customer selection module 320 (FIG. 30) determines which product lists 24 are accessed in response to the customer's menu selections. After each menu selection, the customer is given the option of viewing the next menu screen, reviewing previous menu screens in order to change menu selections or viewing a selection of products on the product lists retrieved by the product list retrieval module 340. If the customer elects to view the next menu screen, the customer selection module 320 accomplishes that function. If, on the other hand, the customer elects to view a selection of products based on the menu selections he has already made, then a product list retrieval module 340 (FIGS. 31 and 32) and a product retrieval and presentation module 400 (FIG. 32) causes selected products to be retrieved and displayed according to a procedure described below.

If the customer elects to view the next menu after all the available menus have been displayed, then the customer selection module 320 ignores that command and the product list retrieval module 340 and product retrieval and presentation module 400 take over and retrieve and display products based on the customer's previous menu selections. However, the customer selection module 320 may allow the customer, after the last menu is displayed, to scroll back through the menus and make additional selections, thereby accessing additional product directories 23 and product lists 24 and increasing the number of products eligible for display. Alternatively, the customer selection program may allow the customer to enter multiple selections from available options on the final menu of subcategories in a hierarchical sequence of menu screens.

The inventory of available products and components contained in the files 17 and 18 may be modified, expanded or condensed at any time by replacing one or more optical CD-ROM discs in the high density storage device 16. However, whenever there are any changes to this inventory or to the product codes for the products or components, one or more of the menu screens 25, the product lists 24 and the product directories 23 may also have to be changed. Likewise, any changes in any of the menu screens 25, lists 24 and directories 23 may require changes in another associated file, list, directory or customer data entry set. A module 106 for maintaining product directories and product lists (FIGS. 18 and 19), a module 128 for maintaining products (FIGS. 20 and 21) and a module 180 for maintaining customer data entry sets (FIGS. 24 and 25), enables a system operator to make these changes.

The menu screens 25 may be constructed to present either a series of menu screens, such as those shown in FIGS. 5 through 8 or a continuous scroll display of product categories and subcategories, such as shown in FIG. 9. Alternatively, a combination of separate menu screens and scroll displays may be presented. In all cases, the menus and scrolls may be controlled by any of a number of available data entry devices, such as touchscreen buttons, a mouse and cursor, a keyboard or even a voice command receiver. Also, the selection of product categories and subcategories on the menu may be controlled by any of these data entry devices. Whatever type of control is used, the customer selection module 320 (FIG. 30) retrieves and displays the selected menus and operates the scrolling screen displays.

The apparatus 1A may be constructed to allow its owner or operator to limit the customer's ability to view various menus and/or products. This may be accomplished by providing an additional menu or menus, retrievable by a command code entered through an appropriate data entry device. When such menus are displayed on the video monitor 5, they prompt the owner/operator to choose various alternative sequences for the menus presented to the customer. Until changed again by the owner/operator, these alternative sequences are a permanent part of the operation of the apparatus 1A.

Another way of obtaining from the customer the information necessary to determine which products to show him is to display lists of key words and prompt the customer to select from these lists the key words that best describe or relate to the kind of product he wants to purchase. Alternatively, the computer 2 may show the customer lists of catalogue titles or alphanumeric symbols, indicating various categories of products, and prompt the customer to select the titles or symbols that best describe the kind of product he wants to purchase.

Thus, the customer may enter his product criteria either by word selections from menu screens or by word or symbol selections from catalogues or lists. In cases in which the customer makes word or symbol selections that are all included among the words or symbols of only one of the stored customer data entry sets 22, that customer data entry set is used by the product list retrieval program 340 (FIG. 31) to identify the appropriate products eligible for display to the customer. When the customer's word or symbol selections are all included among the words or symbols of a plurality of customer data entry sets 22, then all of those customer data entry sets are used by the product list retrieval program 340 to identify the appropriate products eligible for display to the customer.

However, in those cases where the criterion words selected by the customer do not coincide with those of a customer data entry set 22, or the customer selects alphanumeric character strings or other symbols not used in the customer data entry sets 22, then a customer data set translator 343 (FIG. 31) is used to determine which customer data entry set or sets 22 best correspond to the words and/or symbols selected by the customer. One way in which the translator 343 might operate with customer entered criterion words is to search for the customer entry data set or sets having the most number of such criterion words. Another possibility is to drop the last criterion word selected by the customer and search for a customer entry data set or sets that coincide with the remaining words. If there is no such customer entry data set, then successive criterion words would be dropped from the end of the list and the search repeated until such a customer entry data set is found. For cases in which the customer enters an alphanumeric character string or other symbol, the translator 343 would list all the possible character strings and/or symbols that a customer can select and identify each of them with the customer data entry set or sets that best correspond to the product category signified by the character string or symbol.

C. The Development and Storage of the Product Lists

Each product list 24 includes the alphanumeric indicia that identify those product files 17 and product component files 18 that meet, within some degree of minimum suitability as determined by an expert's judgment, the product criteria represented by certain customer data entry sets 22. Thus, each product list 24 is a data file of alphanumeric product indicia and each list 24 is itself identified by its own unique alphanumeric character string.

One important feature of the product lists 24 is that the product code for each product file 17 and each product component file 18 may appear on many different product lists 24. Another important feature is that each product list 24 contains the product codes of a variety of products that correspond to, with different degrees of applicability or specificity, the criteria represented by the customer data entry sets that are associated with the list. Of course, it is desirable that the products identified on each list be displayed in an order that is related to the degree to which they correspond to the customer criteria, and perhaps some of the least well suited products should not be displayed at all. To serve those purposes, the product lists 24 also contain, in addition to the product indicia, one or more suitability indicators that indicate how well each product on the list suits the customer criteria associated with the product list.

There are several types of suitability indicators that can be used to distinguish the products identified on the list 24. One indicator might relate to the number of criteria that a product satisfies, or in other words, the degree to which the use descriptions of the product meet the specific criteria for which the product list is designed. This indicator can thus be called a use description coverage indicator. Another might relate to whether the product can be modified to meet more of the criteria and if so, the way in which it can be modified and whether the customer would modify it or the computer would modify it automatically. Another indicator might relate to whether the product is a complete product from the product file 17 or a product formed by assembling components from the file 18. In the case of an assembled product, there would also be stored with the product codes of the components to be assembled an indicia referencing the assembly program required for combining the components. Examples of product lists using the degree of specificity indicators, modification indicators and component assembly indicators are shown respectively in FIGS. 10A, 10B and 10C.

An example of a more sophisticated product list 24 is shown in FIG. 10D. In addition to identifying the product directories 23 associated with the list (block 24a), the product codes for each product and product component on the list (column 24b) and the product use descriptions (column 24d), all of which are contained in the lists of FIGS. 10A, 10B and 10C, the product list of FIG. 10D identifies all the other product lists on which each product or product component appears (column 24c), indicators of the degree of specificity or use description coverage for each product (column 24f) (also shown on the list of FIG. 10A), indicators that tell the computer to make certain modifications to the product data to make the design suitable for display, such as "CDT" (Computer Delete Text), "CDP" (Computer Delete Poetry) and "FIB" (leave a blank space for customer fillin) (column 24e) and base priority ratings (column 24g) and modified priority ratings (column 24h) that relate to expert judgments of the suitability, appeal and/or freshness of each product on the list, as it relates to the customer criteria for which the list was designed. If a product list 24 is associated with two or more directories, as in the case of Product List 0013 of FIG. 10D, then it may be desirable to assign a different product rating to each product, dependent on the directory through which the product list is retrieved. These individual priority ratings for each of the directories A, B and C, identified at the top of the list, are shown in the base and modified priority rating columns 24g and 24h. Likewise, the use description coverages (column 24f) for each product will vary according to the directory through which the list is retrieved.

D. Customizing the Selection of Products

An optional feature that may be incorporated in the apparatus 1A is the changing of the priority ratings, shown in the far right-hand column of FIG. 10D, to reflect the needs and interests of particular customer groups, particular owner/operators and particular times, locations and other circumstances surrounding the sale of the products. The need for this customizing capability arises from the fact that it may be impossible to design a single, fixed system that adequately or optimally serves the needs of all kinds of customers and owner/operators in all kinds of locations and under many circumstances.

For customizing purposes, the priority ratings are changed by the use of suitability codes assigned to each product on each product list 24. Each suitability code is preferably an alphanumeric combination that has two letters, indicating a specific customer group, location, time period, owner/operator preference or other circumstance, and a number that indicates whether a product is highly suitable, moderately suitable, neutral, highly unsuitable or precluded for use in that circumstance. All the possible suitability codes that might be used on all the products stored in the apparatus 1A are called a "suitability code data set." An example of such a suitability code data set is shown in FIG. 11.

FIG. 12 shows an example of a master suitability code list 29, which lists the product codes of all the products and product components stored in files 17 and 18, the product lists 24 on which the product or product component appears, and the suitability codes assigned to each product and product component on each product list. The master suitability code list 29 is stored in the data storage device 3 (FIG. 2) and may be constructed using two sets of data. One data set is created by creative or market experts who understand the products and their relative suitabilities in various market circumstances. The other set is stored in the apparatus 1A at each market location by the local owner or operator, who understands local circumstances and their effect on the product preferences of local customers.

The first data set would normally be produced by creative or market experts at the time the products are created and first stored on the optical CD-ROM discs. This data set includes the suitability codes relating, for example, to the way the desirabilities of products are affected by such circumstances as location, special clientele, the time of day that the products are usually purchased, the current time of year and the length of time the product has been on the market. Such suitability codes are determined primarily by making judgments that if condition "AC" exists, then product "abc" has a relative suitability of 3 on a scale of 0 to 10. An example of such a data set is found in the top half of the sample query form of FIG. 13, on which the suitability codes in the far right-hand column are entered by creative or market experts. This suitability code data is then entered on the master suitability code list 29 stored in the data storage device 3.

The first data set also includes data formed by expert judgments relating to whether the product has certain characteristics that may affect the preferences of local owners or operators of the apparatus. An example of such data is found in the bottom half of the sample query form of FIG. 13, on which the product characteristic codes in the far right-hand column are entered by creative or market experts.

Both kinds of expert data in the first set are entered on those occasions when new product files 24 are being stored in the apparatus 1A or when they are being periodically revised.

Figure 32:
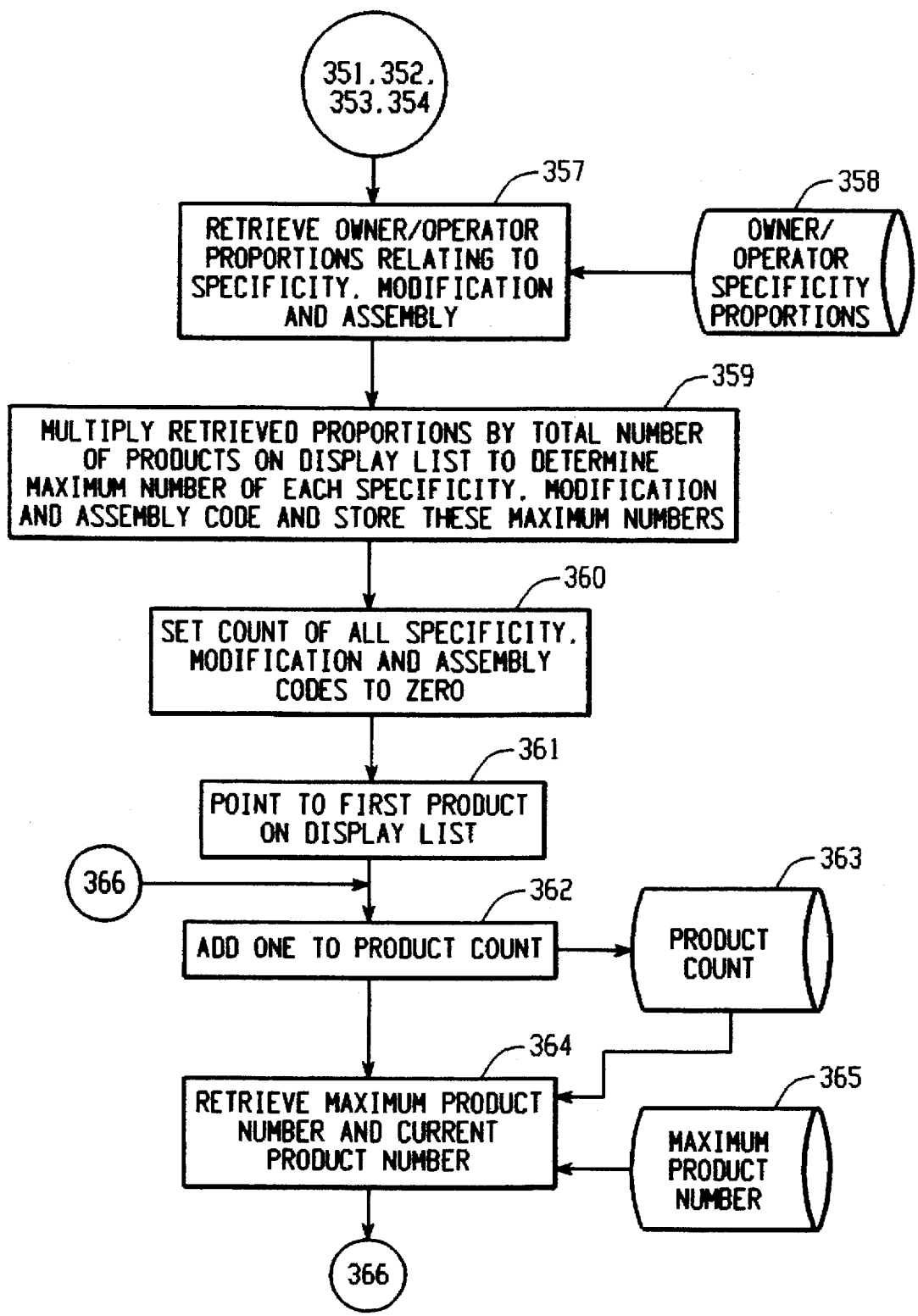

The second data set is entered by the owners or operators of each apparatus 1A who have knowledge of local circumstances and understand their own preferences regarding the kinds of themes, styles and other properties that products produced by their apparatus should possess or not possess. The owners or operators enter the data for this set by responding to one or more query screens 31 that are stored in the data storage device 3 (FIG. 2) and are displayed on the monitor 5 in response to a special code entered on the computer 2 by an owner or operator. Each query screen 31 displays certain product characteristics and asks the owner or operator to select for each characteristic either a degree of suitability or preference for the characteristic or the proportion of products having that characteristic that he desires to have displayed to his customers. An example of such query screens are the screens shown in FIGS. 14A and 14B. The product characteristics on the query screen of FIG. 14A should correspond to the product characteristics entered for various products by creative or marketing experts, such as those shown on the bottom half of the sample query form of FIG. 13. For each product characteristic for which the owner or operator selects a degree of suitability or preference in response to the query screen of FIG. 14A, a suitability code is generated that is applied to all products that were determined by a creative or marketing expert to have that characteristic. For each product characteristic on the query screen of FIG. 14B, for which the owner or operator selects a desired proportion for products having that characteristic, that proportion is stored in the owner/operator proportions memory unit 358 (FIG. 32), to be used in controlling the number of products with that characteristic that are displayed to the customer. On the query screen of FIG. 14B, the owner/operator may also limit the total number of products to be displayed to the customer and that number is stored in memory unit 365 (FIG. 32).

Another query screen shown in FIGS. 15 is designed to elicit from each owner or operator special circumstances relating to his location and type of clientele. All products judged on the query form of FIG. 13 to be suited for the same locations and/or clientele as those input by the owner or operator in response to the query screen of FIG. 15 are assigned the appropriate suitability code on the master suitability code list 29.

Figure 37:
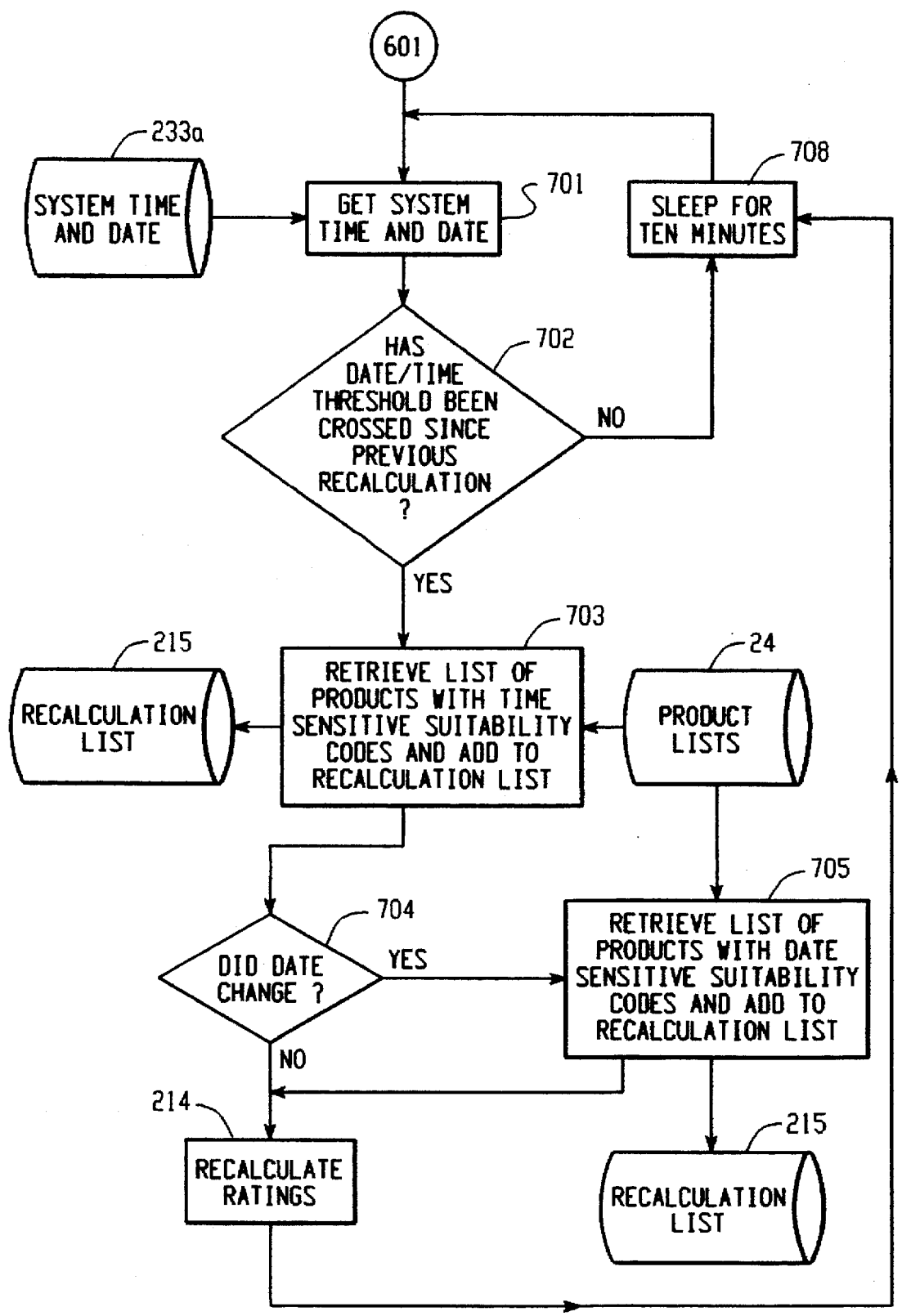

All of the other suitability codes that are assigned to various products by use of query forms and screens such as shown in FIGS. 13, 14 and 15 are transferred to the master suitability code list 29 stored in the data storage device 3. The stored suitability codes are then used to modify the priority ratings of the products, in a process controlled by the recalculate ratings module 214 (FIG. 37), shown in detail in FIG. 27. As an alternative to the master suitability code list, the suitability codes may be stored directly with each product listed on each of the product lists 24. However, a master suitability code list may be the most efficient way of storing these codes, because many products are stored on a plurality of product lists 24, whereas each product is listed only once on the master suitability code list 29.

The following is an example of a customizing algorithm that may be employed in step 224 of the recalculate ratings module 214 (FIG. 27) to modify the base priority ratings of the products listed on the product lists 24:

Step 1. Translate each suitability code on the master suitability code list 38 into a priority rating multiplier, according to the following table:

| Last Number of Suitability Code | Priority Rating Multiplier |
| --- | --- |
| 1 | 1.2 |
| 2 | 1.1 |
| 3 | 1.0 |
| 4 | 0.9 |
| 5 | 0.8 |
| 6 | 0.7 |
| 7 | 0.6 |

Step 2. For each product on the master suitability code list 38 that has one or more suitability codes relating to location, clientele or other local circumstance, convert all such suitability codes to priority rating multipliers, using the table of step 1. For those products that have more than one such suitability code and thus more than one priority rating multiplier, form a combined location/clientele/circumstance multiplier by taking the product of all the individual priority rating multipliers.

Step 3. For each product that has one or more suitability codes relating to a time of day, month, season or year, compare the time on the internal clock of the computer 13 to determine whether one or more appropriate times applies. Using the table of step 1, convert all suitability codes for such appropriate times to individual priority rating multipliers and take the product of those multipliers to determine a combined time multiplier.

Step 4. For each product that has one or more suitability codes relating to owner/operator preference characteristics, using the table of step 1, convert all such suitability codes to individual priority rating multipliers and take the product of those multipliers to determine a combined preference multiplier.

Step 5. Form a single multiplier by taking the product of all the multipliers calculated in steps 2 through 4. Multiply that single multiplier by each base priority rating on each product list 24 containing the product to determine a modified priority rating.

The above algorithm is, of course, an example of only one of many possible algorithms that can be used to convert the suitability codes of each product to modified priority ratings on the product lists 24.

The end product of this customizing process is a set of modified priority ratings associated with the various product items contained on the various product lists. These modified priority ratings will influence computer decisions concerning the eligibility and sequencing of products for display in accordance with methods and means described below.

E. The Selection, Retrieval and Display of Products

A product list retrieval module 340 (FIGS. 31 and 32) and a product retrieval and presentation module 400 (FIG. 34), cause the selection, retrieval and display of certain products, all from the product lists 24, that were identified as a result of the customer's previously entered menu choices.

The product list retrieval module 340 establishes the order of retrieval and display of the products on the called-up product lists 24. The module 340 begins to operate when a customer makes a menu choice that causes the computer 2 to access one or more identified product lists 24. When more than one product list 24 is identified in response to the identification of one or more product directories 23, resulting from the customer's menu choices, then all products on those product lists are combined for the purpose of establishing their order of retrieval and display. Duplicate products are removed in step 350 the module 340 (FIG. 31), with each duplicate having the lower priority rating being chosen for removal.

The steps 351 to 354 of product list retrieval module 340 determine the order in which the products on the retrieved lists will be presented to the customer. The questions in steps 351 and 352 may be answered by expert judgments by people such as the system operator, the local owner/operator and the customer, in order to determine the sequence of product presentation. The following are examples of various possible sequences:

Example 1. Products are sequenced in the order in which they are listed in the product lists 24 without regard to their priority ratings (by answering "no" in both steps 351 and 352).

Example 2. Products are sequenced in the order of their modified priority ratings, as assigned and modified as set forth in Section D above (by answering "no" in step 351 and "yes" in step 352). All priority ratings must be positive numbers. When more than one modified priority rating is stored with a product code on a list 24, then the modified priority rating associated with the directory through which the list was retrieved is the one used (see FIG. 10D). Products having exactly the same modified priority ratings are sequenced in a random order with respect to one another.

Example 3. All products are sequenced in a random order (by answering "yes" in step 351).

Example 4. Products are sequenced by a priority-weighted random process. For the first and each successive position in the random selection order, each product receives a probability of being selected that is weighted in proportion to its modified priority rating. (This sequencing process is not included in the product list retrieval module 340 shown in FIG. 31).

Example 5. Products are sequenced in the order of their modified priority ratings, but those ratings are further modified following each customer use that caused the computer to call up the product list in which the product appears. For example, each time a product list is called up, the base priority ratings of the product on the list selected by the customer is increased by 5 percent and the base priority ratings of all the products on the list displayed to the customer but not chosen are decreased by 5 percent. (See steps 418 and 419 of FIG. 34).

Figure 33:
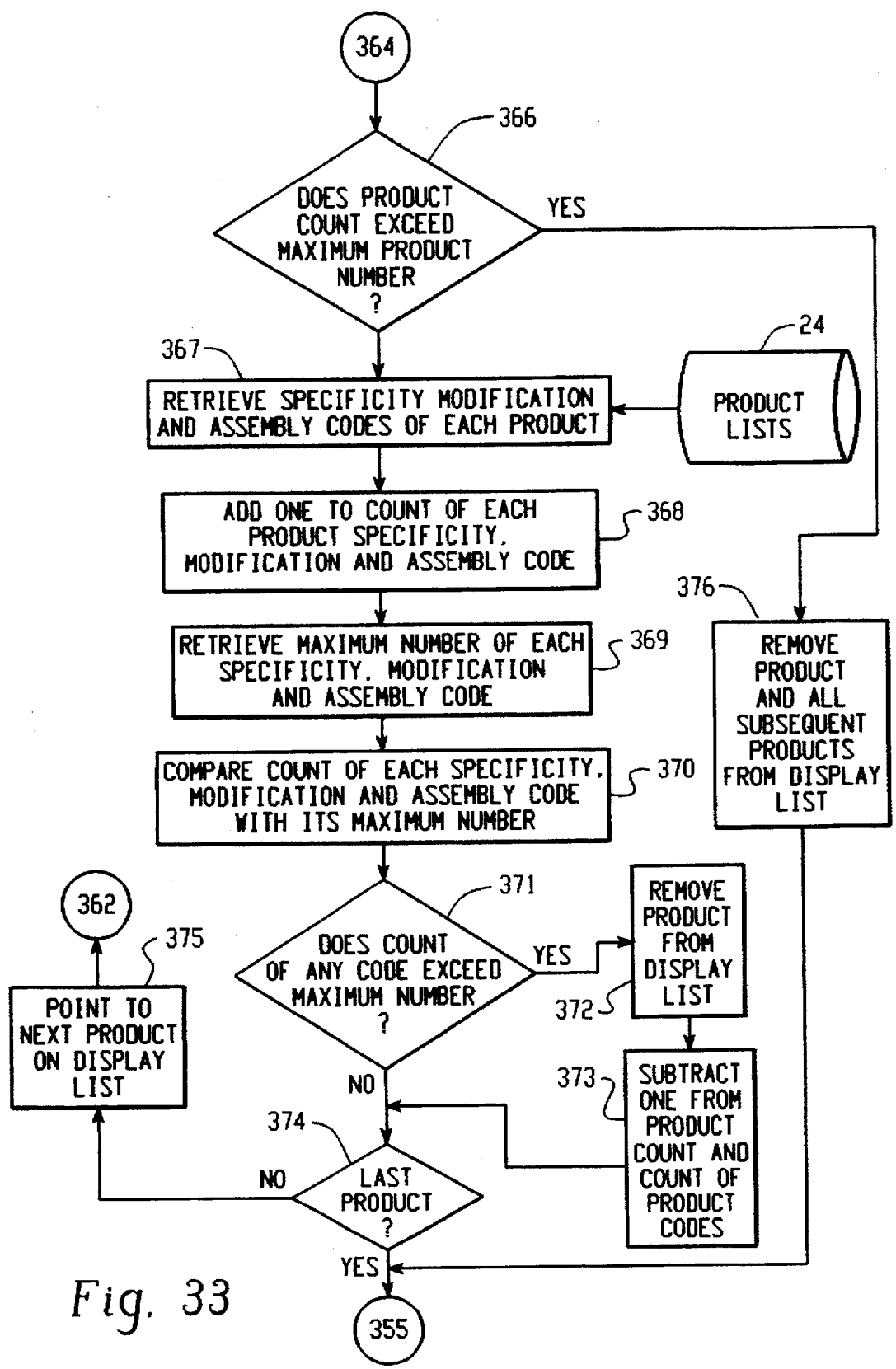

The product list retrieval module 340 (FIG. 31) has a module 356, set forth in detail in FIGS. 32 and 33, that applies owner/operator proportions to the list of products to be displayed to the customer. These owner/operator proportions are generated answers that the owner/operator makes to questions such as those shown in the query screen of FIG. 14B. The product list retrieval module 340 thus limits the total number of products having certain characteristics to the proportions selected by the owner/operator.

As an optional feature, the product list retrieval module 340 may be constructed to display fewer products during busy times of the day or year in order to reduce the waiting time for other customers waiting to use the apparatus. This may be done by changing the maximum product number in memory unit 365 (FIG. 32) in response to an answer to an owner/operator query, shown at the bottom of the query screen of FIG. 14B.

The product retrieval and presentation module 400 (FIG. 34) includes an optional feature that limits the initial display of products to the first "x" number of products on the list (step 404). After the customer has viewed this group of products, he presses a "next" button (step 405) in order to see the next group of "x" number of products. The module 400 also allows the customer to view two or more products at the same time (steps 401 and 402). One or more of the products may be simultaneously displayed and held on the screen as a miniature which the customer can enlarge to fill the screen by touching the portion of the touchscreen 12 over the miniature. Thus, the customer may readily recall products displayed earlier. The presentation module 400 also allows the customer to scroll forward or backward through the groups of products (step 406). In alternative embodiment not illustrated, the module 400 may hold up the display of products meeting criteria other than those designated on a special product list, until all other products have been displayed.

The presentation module 400 locates, retrieves and displays product and product component data that is stored in the files 17 and 18, preferably located on optical CD-ROM discs. Because the selected products are identified in both the product files 24 and their storage files 17 and 18 by matching alphanumeric indicia, these products may be retrieved directly without recourse to database search methods. The product and product component display data received from the files 16 and 17 may be held in temporary storage in the data storage device 3 while awaiting display.

Retrieved product components are assembled by component assembly programs 19 (FIG. 2). Such assembly programs are identified on the product lists 24 that list component combinations (see FIG. 10D).

Figure 34A:
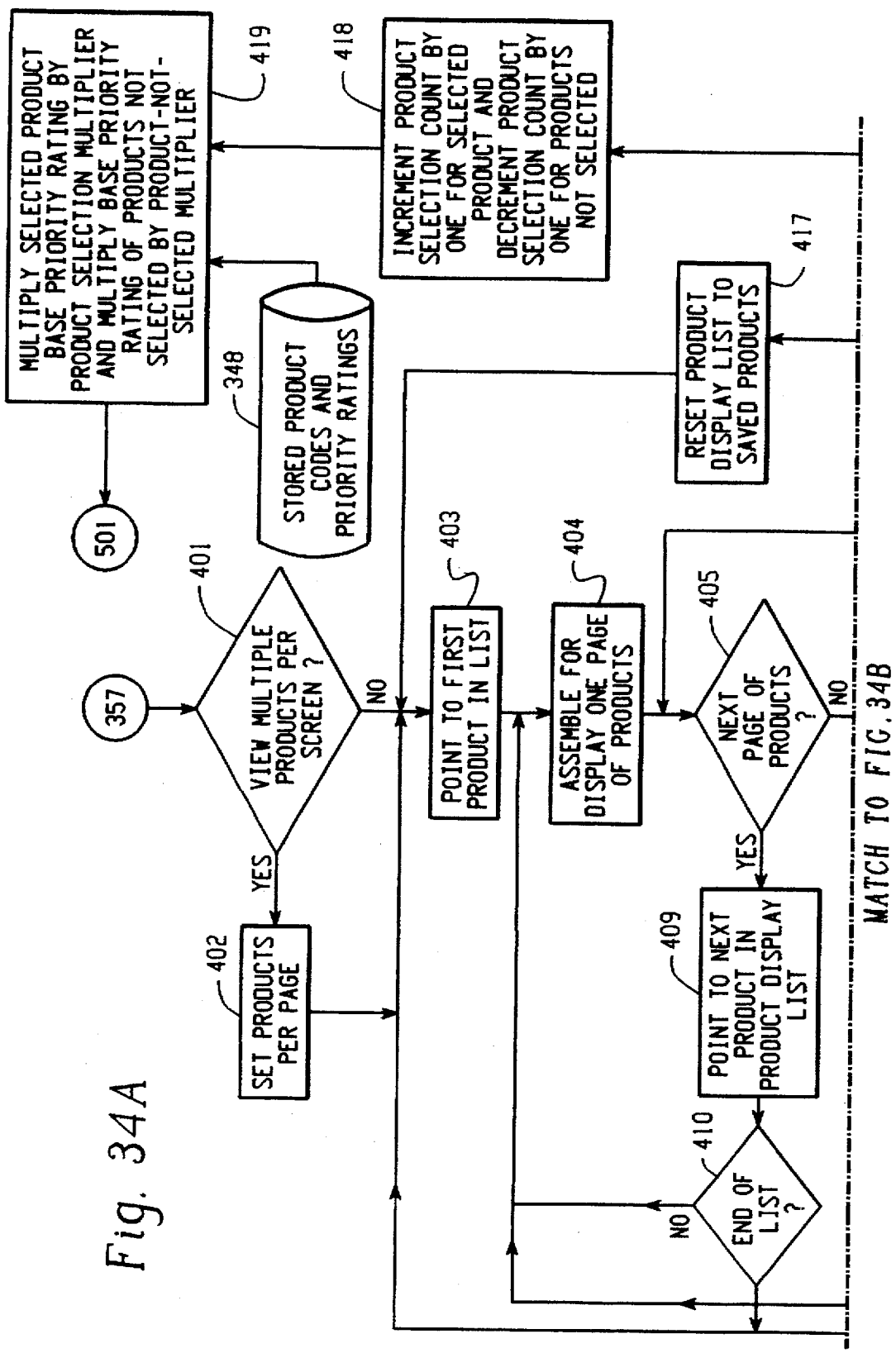
Figure 34B:
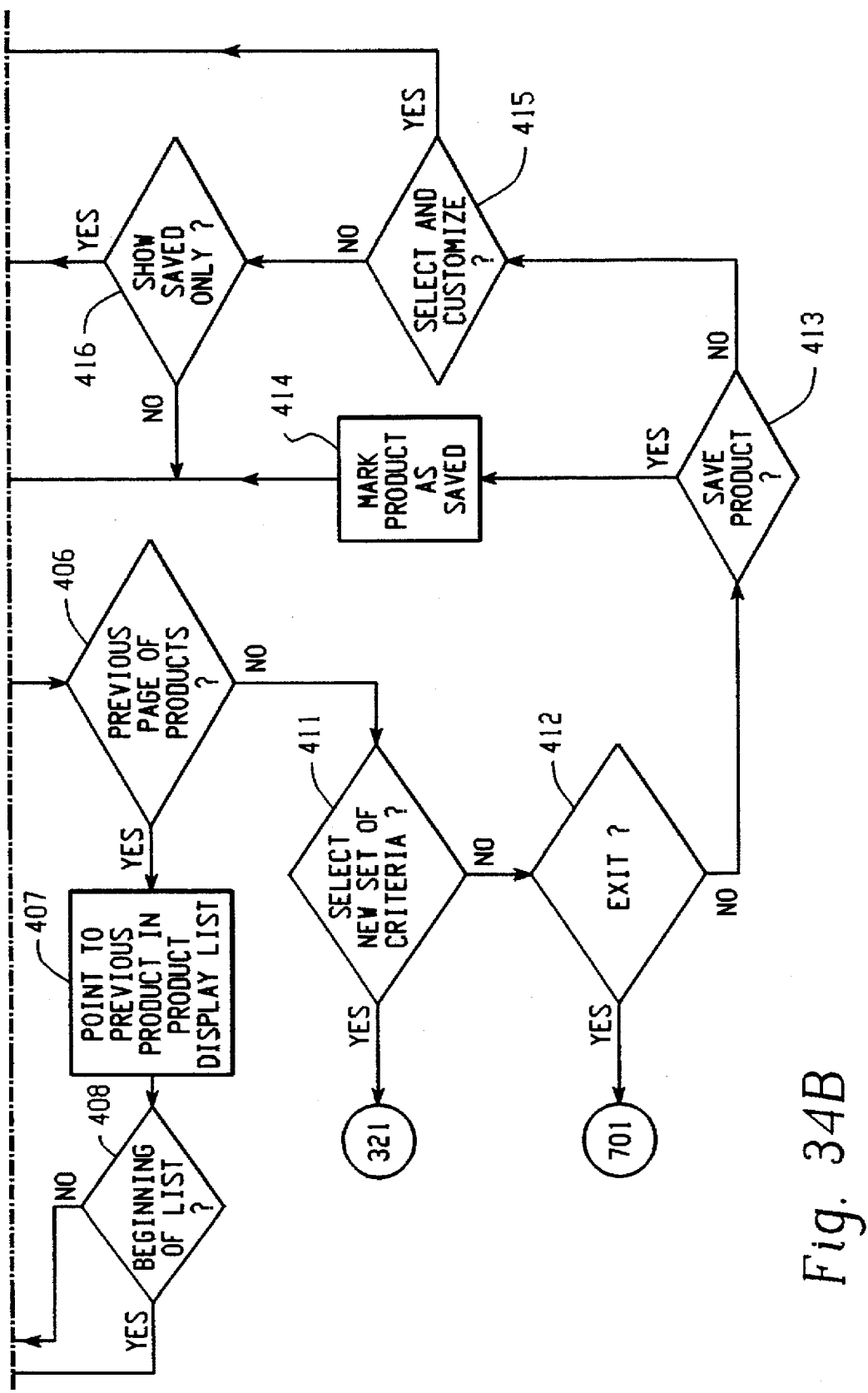

While the customer is reviewing the display of products selected by the computer 2 in response to his menu choices and other data input selections, he is given the option of selecting any one of these products for the purpose of personalization and purchase (step 415, FIG. 34).

After selecting the product he wants to purchase, the customer may use a data entry device 7 (FIG. 1A) to customize and personalize the product. On some products, blank spaces are designated in which the customer may fill in his own words. On other products, the customer may delete portions of the text or the graphic design, leaving either blank spaces or replaced with customer entered indicia. Some products will be automatically modified or have material deleted pursuant to instructions stored on the product list, such as those contained in column 24e of the product list 0013 of FIG. 10D. On all products, the customer may enter textual or graphic indicia in available or designated blank spaces. By storing product designs that can be modified in these various ways, the apparatus 1A allows a customer to select a product that does not meet all of his criteria and then overcome that deficiency by modifying the product. For instance, a customer looking for a birthday card for his mother-in-law or sister may decide that the most suitable card is one that meets all of his criteria, except that it says, "Happy Birthday, Mother." If the card allows the customer to substitute "Mother-in-Law" or "Sister" for "Mother," then he can select such a card and then modify it to suit his specific needs.

In the present embodiment showing an on site card vending apparatus 1A, when the customer has completed his modification of his chosen product and has indicated that the final product is satisfactory, the computer downloads all the product data for transmission to the printer 8 (FIG. 1A). The customer is then instructed to pay for his product by means of the payment device 10A. After the payment device 10A receives payment, the device or the customer gives the signal to the printer 8, the printer takes a sheet of paper from the tray 9, prints the card according instructions provided by the downloaded data, and deposits the card in the dispensing tray 10.

F. Overview of the System Operation

Figure 16:
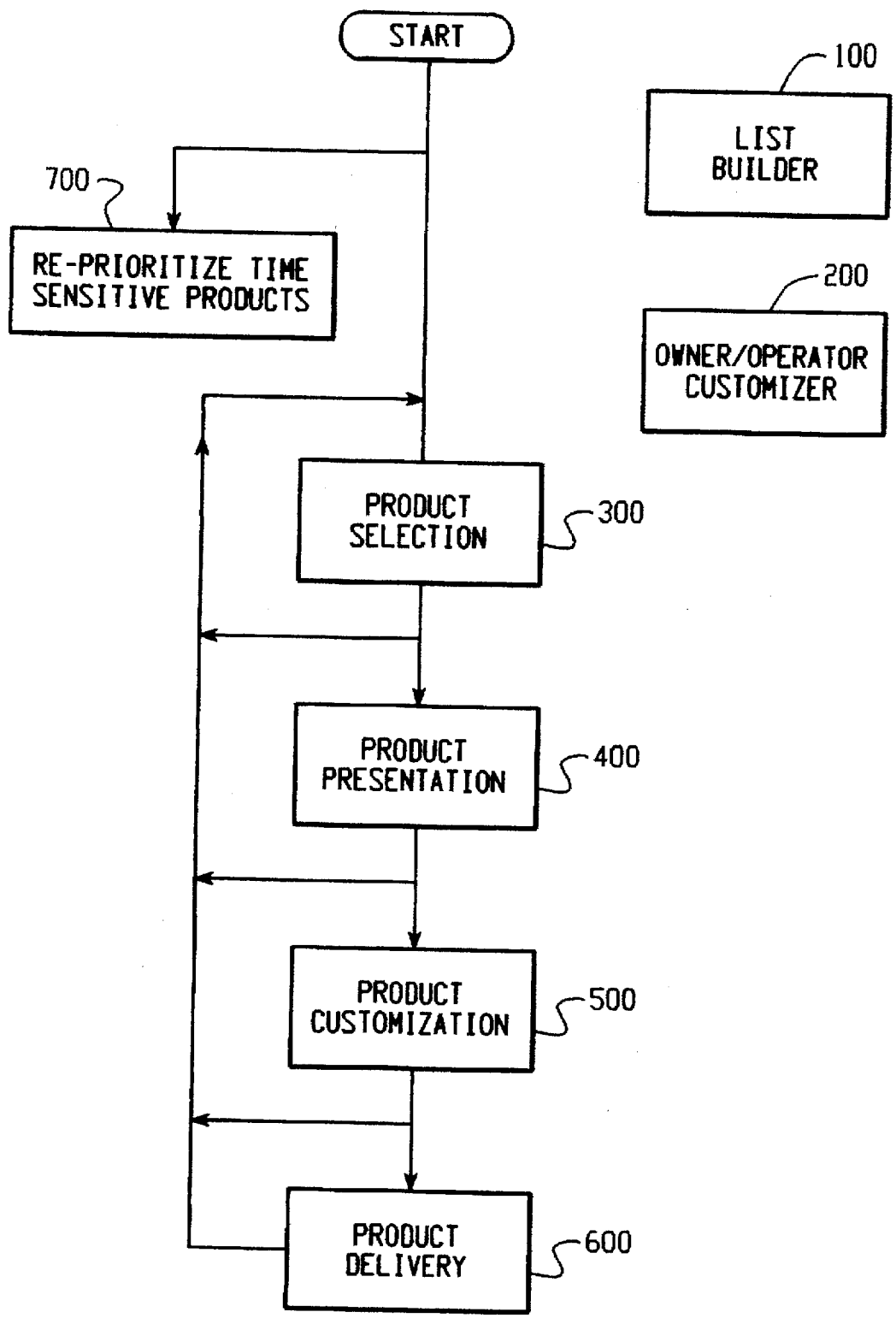
FIGS. 16 to 37 are flow diagrams showing the operation of the apparatus of FIG. 1.

The operation of the apparatus 1A and the programming of the computer 2 is shown in the flow diagrams of FIGS. 16 to 37. FIG. 16 shows the major parts of the system and how they are related to one another. The list builder module 100 and the local owner/operator customizer module 200 are shown as independent units, because they are not part of the operation of the system when it is being used by a customer. Rather, these blocks represent steps that maintain and update the files stored in the system, which are performed at various intervals when the system is not in use by customers.

Figure 17:
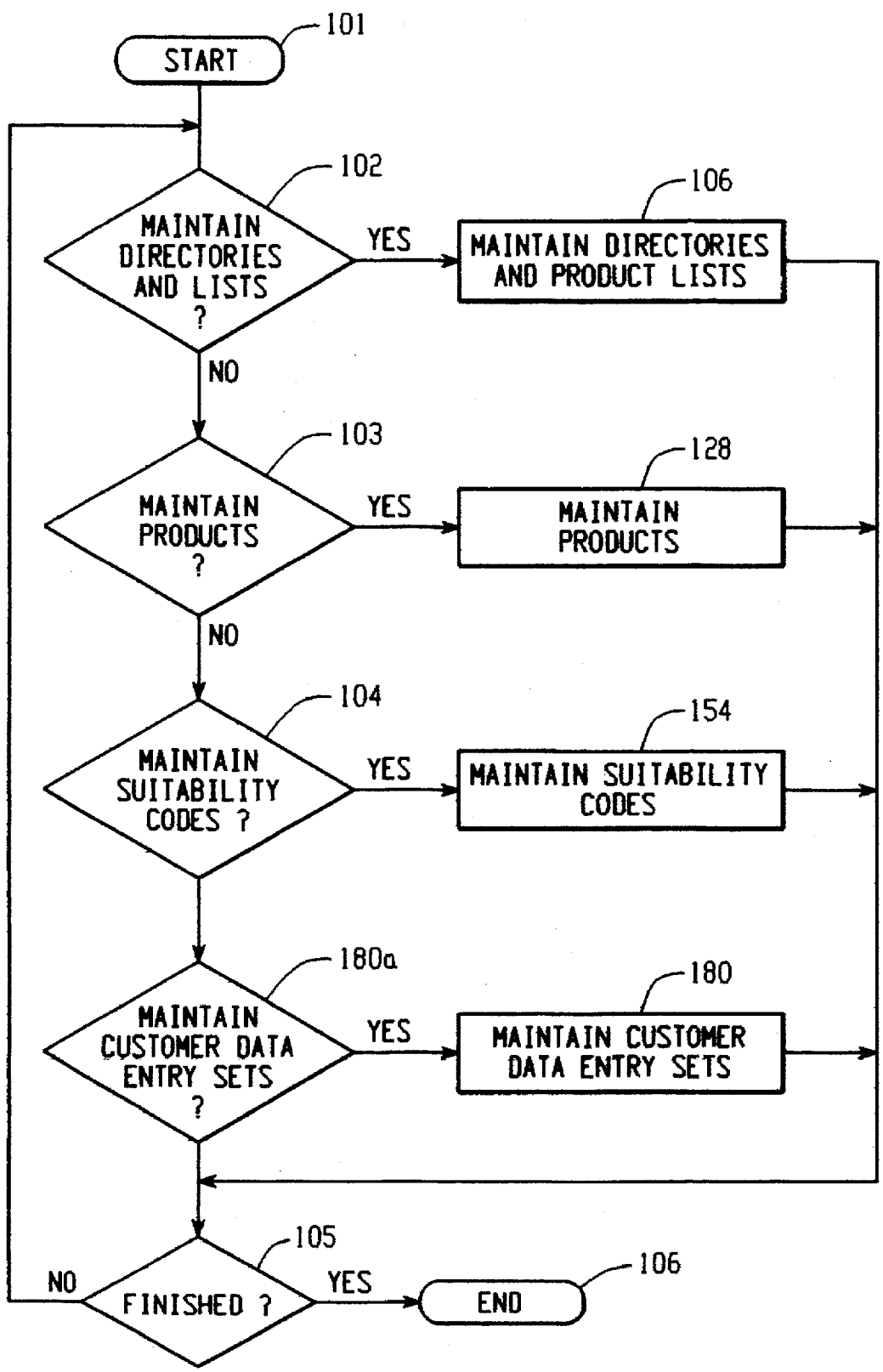
Figure 18:
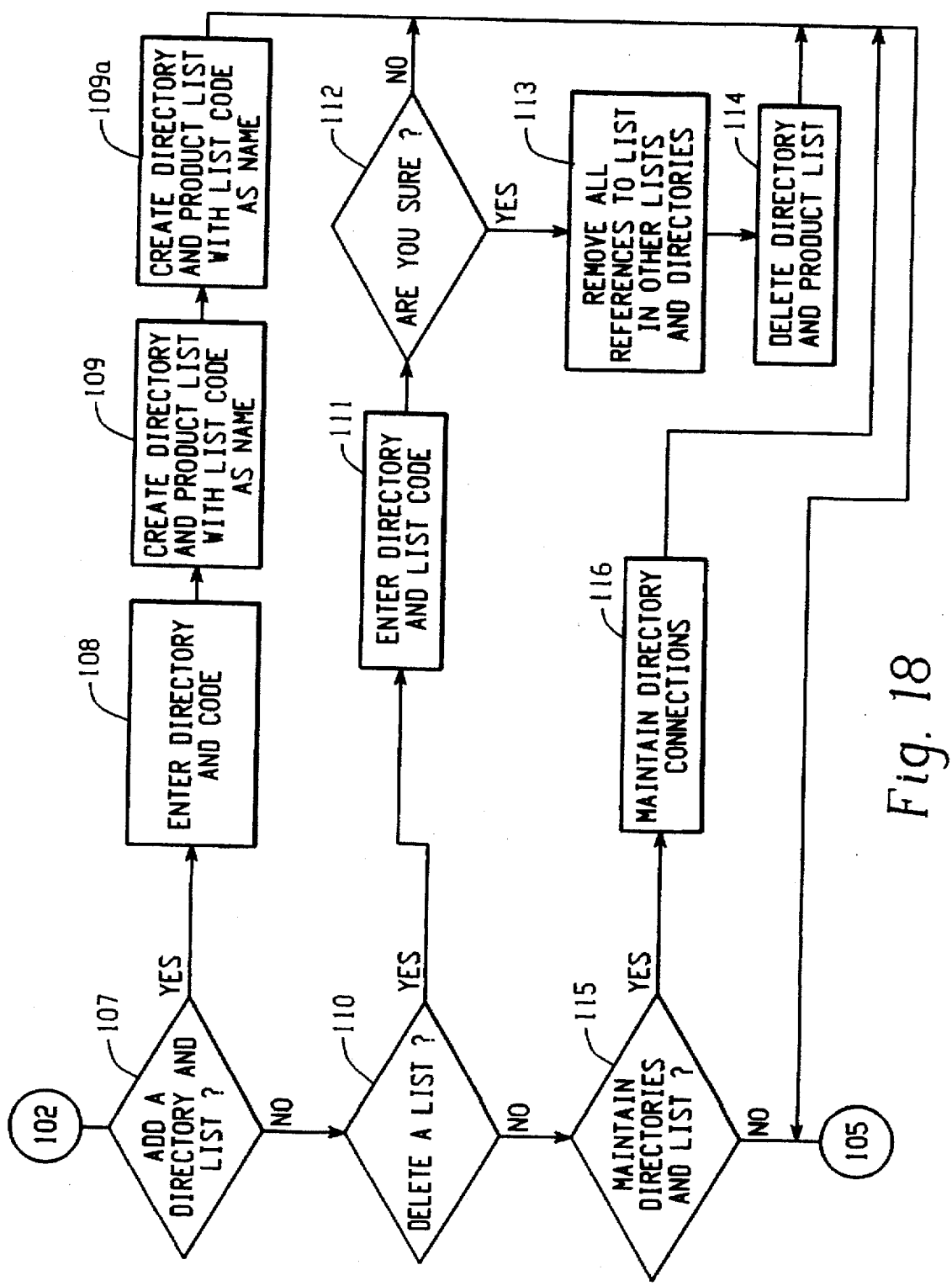
Figure 19:
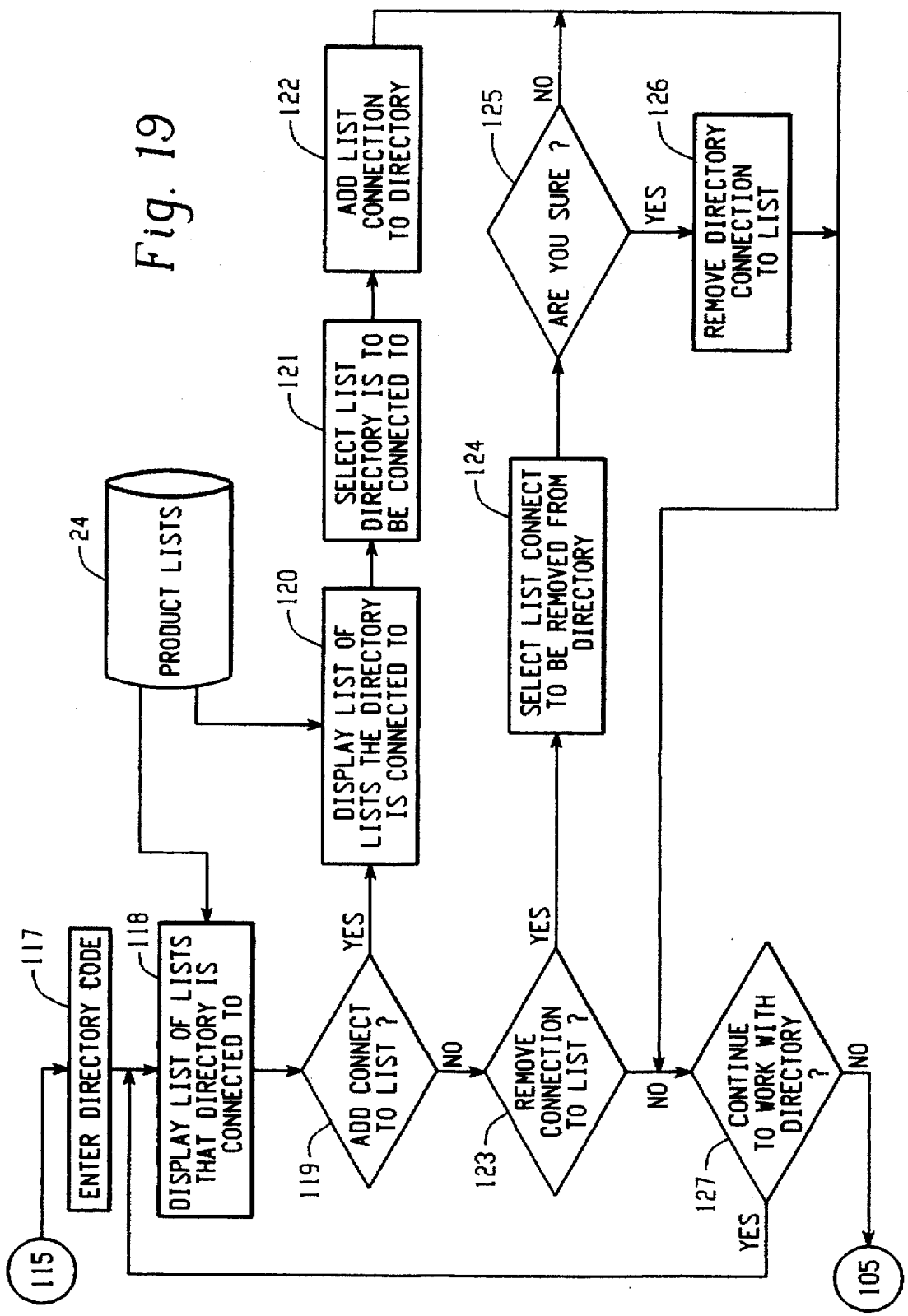
Figure 20:
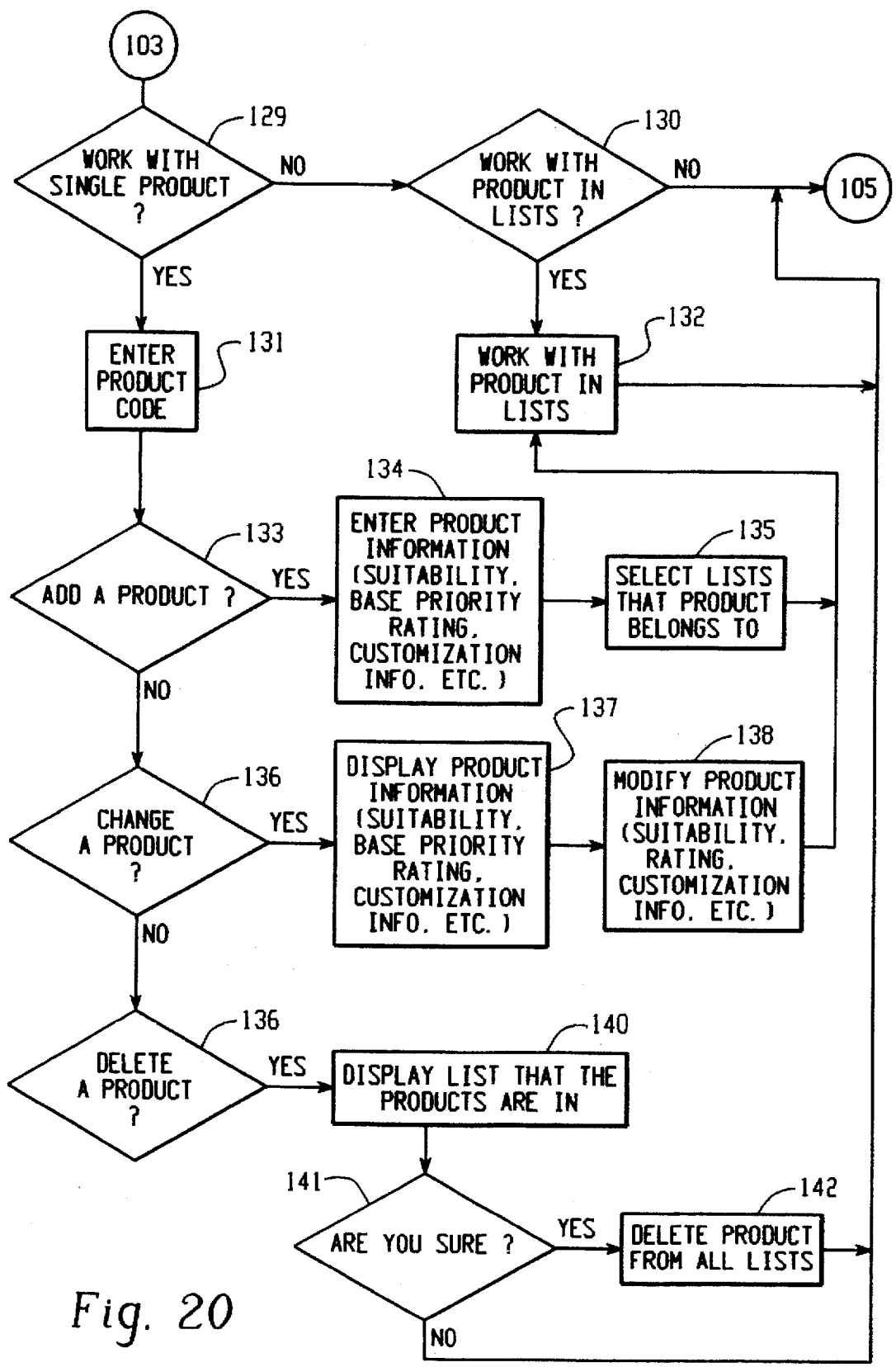
Figure 21:
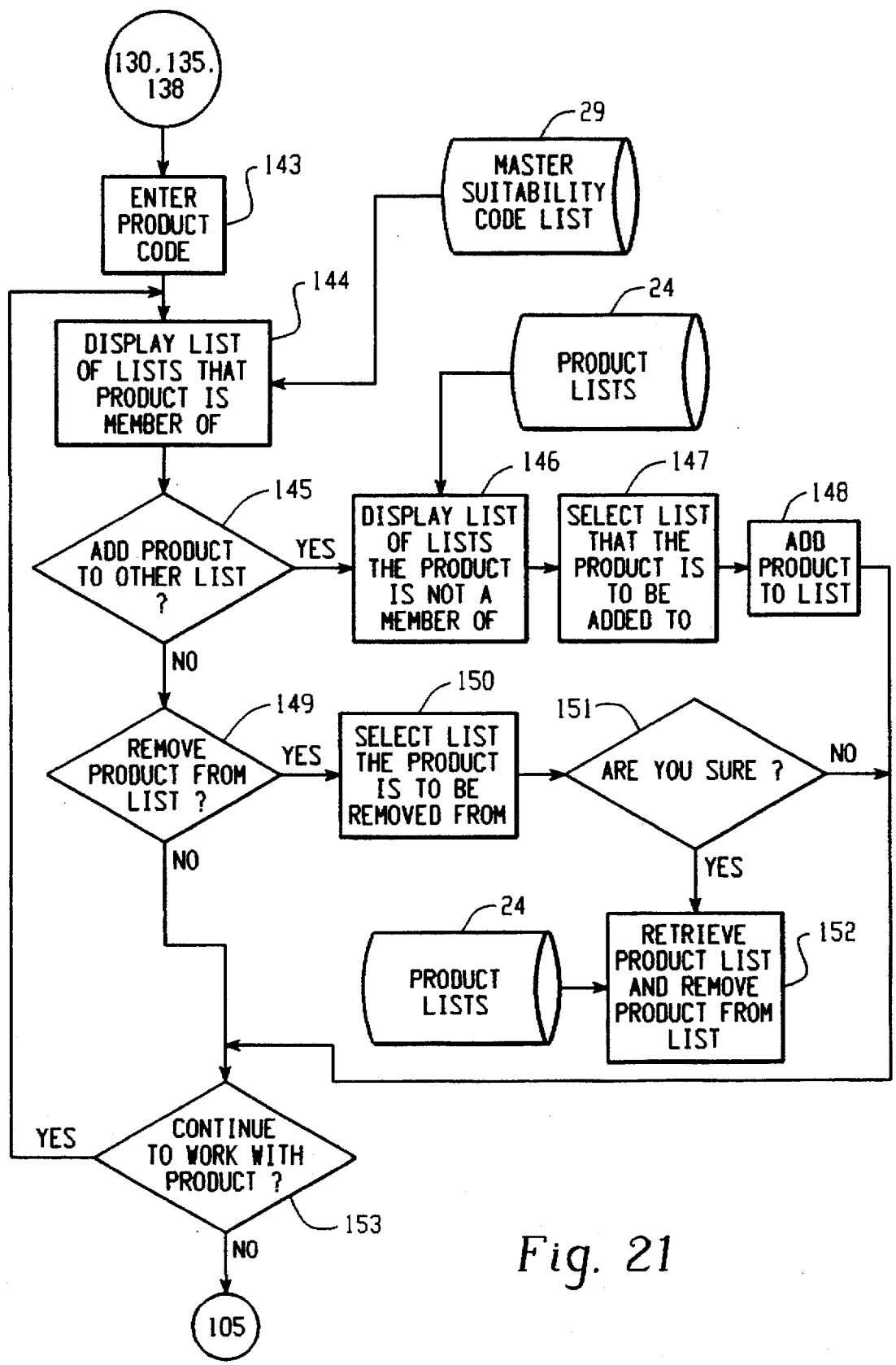
Figure 22:
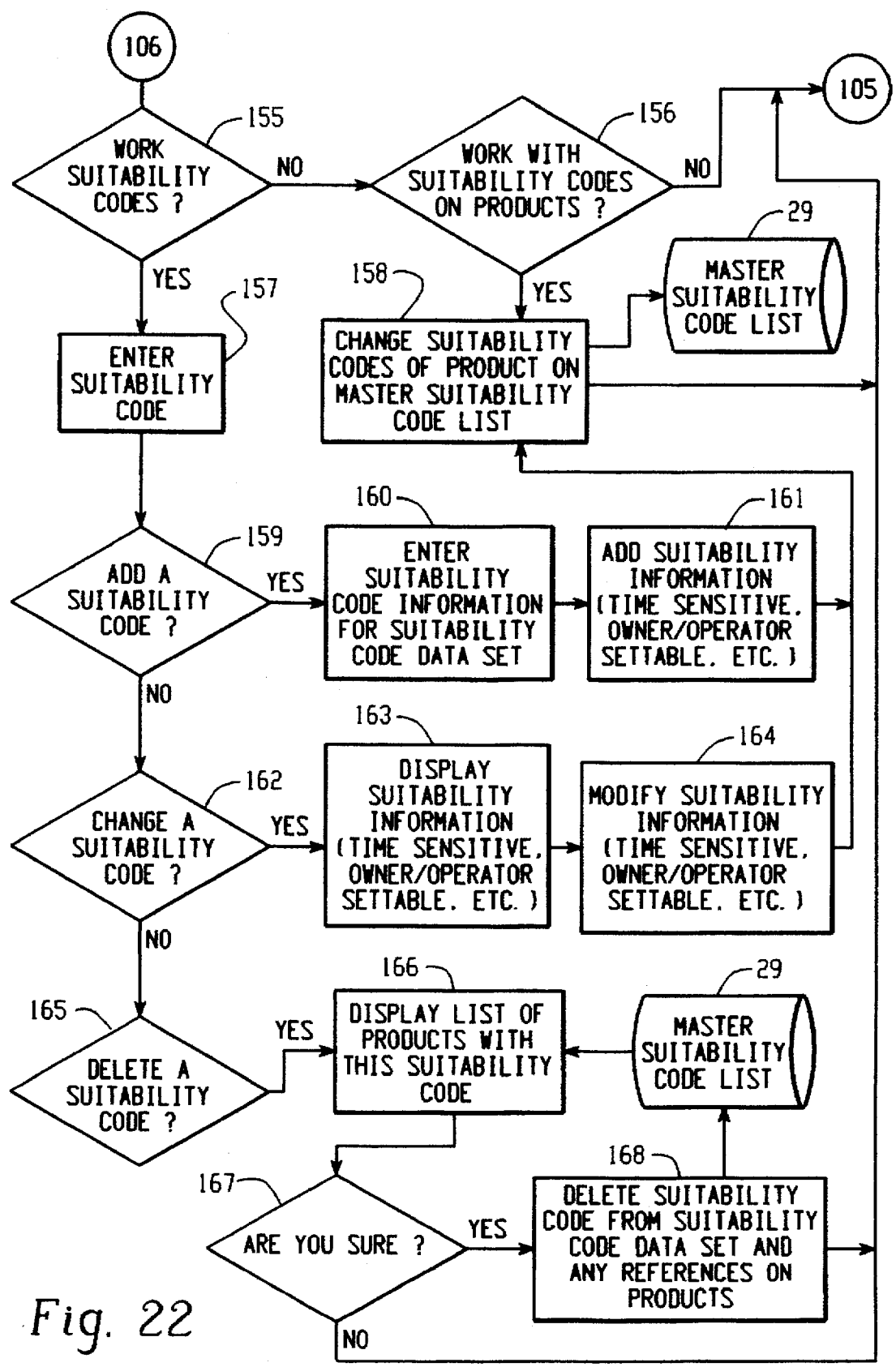
Figure 23:
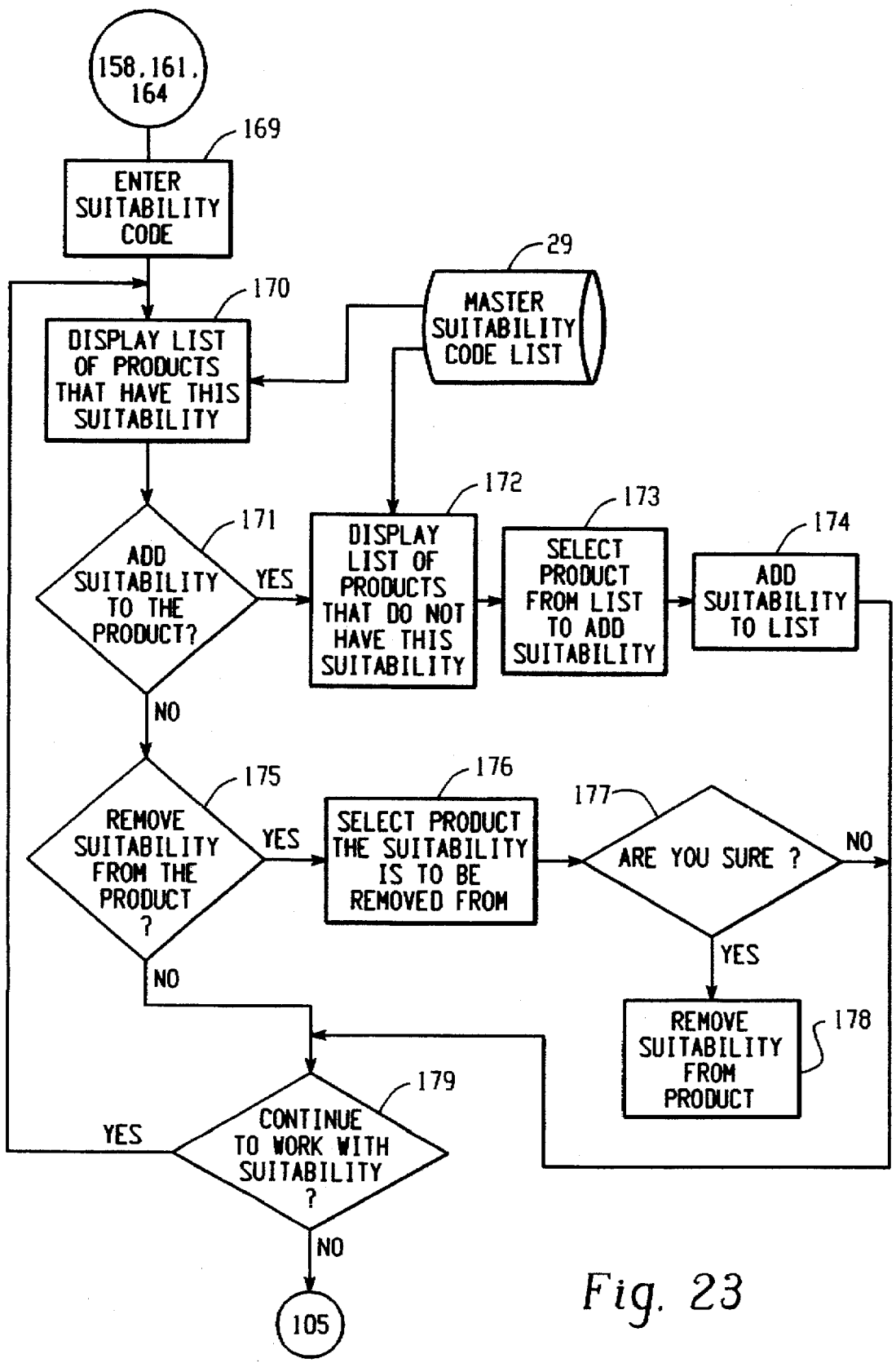
Figure 24:
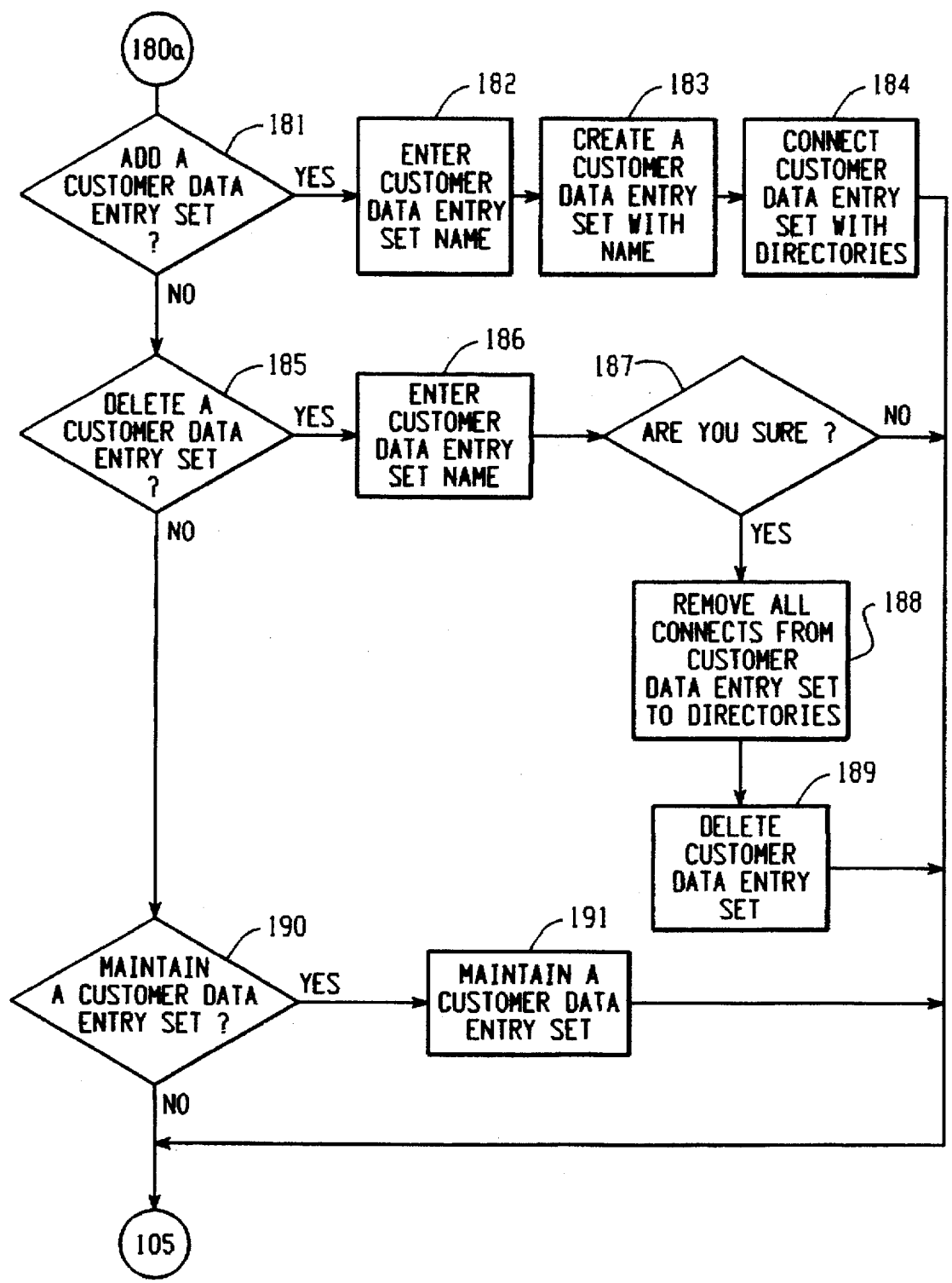
Figure 25:
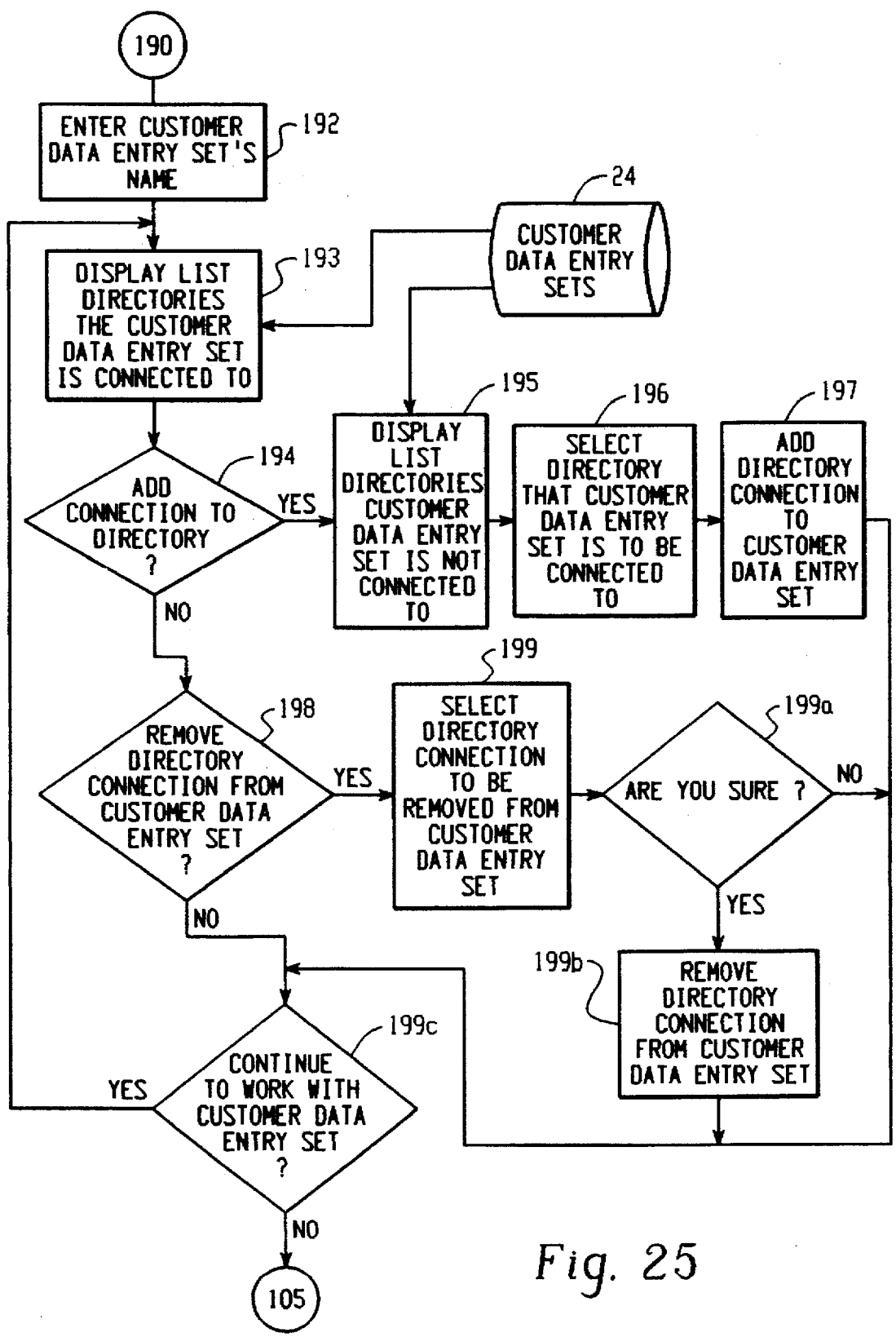

The list builder module 100 (FIG. 16) includes the steps that enable the operators of the system to add, delete and change the connections between various system components, including the product lists 24, the product directories 23, the customer data entry sets 22, and to change the suitability codes on the master suitability code list 29 (FIG. 12). The details of the list builder module 100 are shown in FIGS. 17 through 25. As FIG. 17 shows, the module 100 has four main parts, one part for creating new product directories 23, product lists 24 and connections between the directories 23 and lists 24 (module 106, shown in detail in steps 107 through 127 of FIGS. 18 and 19), another part for adding and deleting the product codes (and associated data) of various products to and from the product lists (module 128, shown in detail in steps 129 through 153 of FIGS. 20 and 21), another part for changing the suitability codes stored on the master suitability code list 29 (module 154, shown in detail in steps 155 through 179 of FIGS. 22 and 23) and another part creating new customer data entry sets 22 and connections between the customer data entry sets 22 and product directories 23.

Figure 26:
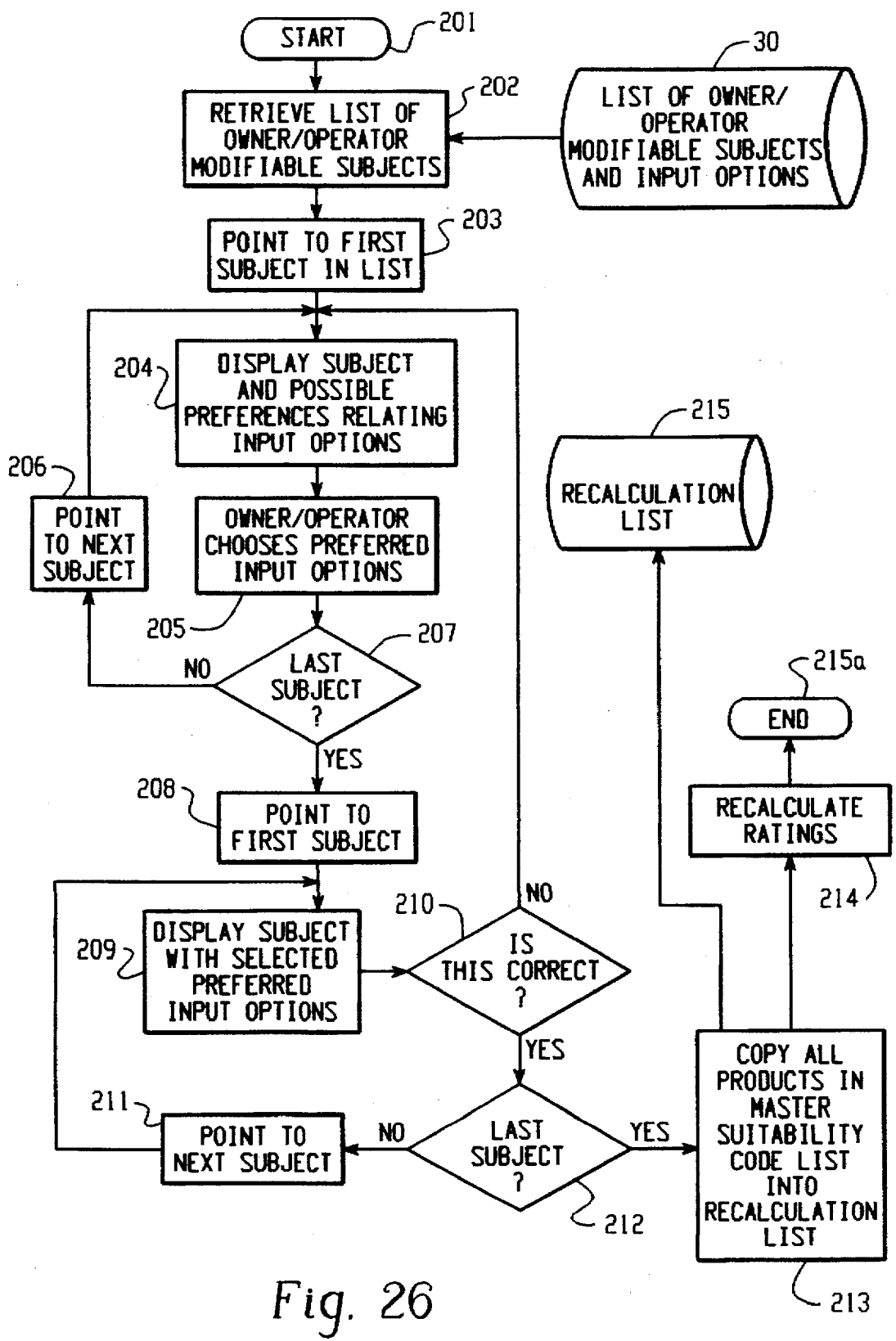

The local owner/operator customizer module 200 (FIG. 16) is shown in detail in FIG. 26. Steps 201 to 215a of FIG. 26 show how the computer 2 is programmed to allow the local owner/operator to enter his preferences for the types of products that will be displayed to customers (for example, the query screen of FIG. 14A) and to indicate the type of location of his machine and the types of customers he serves (for example, the query screen of FIG. 15). These preferences and types of location and customers are then used to change the suitability codes of the products and to recalculate their modified priority ratings (step 214), as shown in detail in FIG. 27.

Figure 27A:
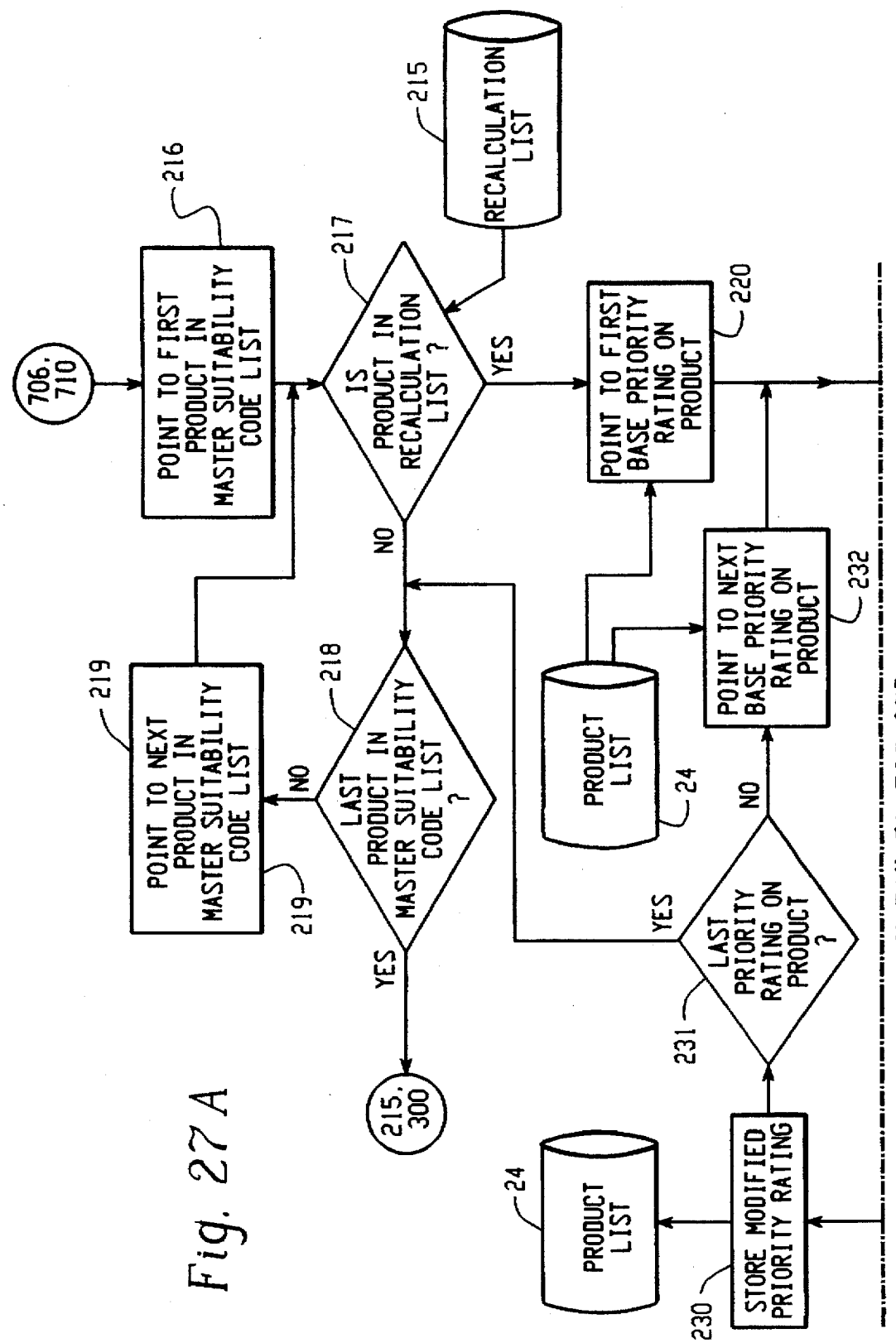
Figure 27B:
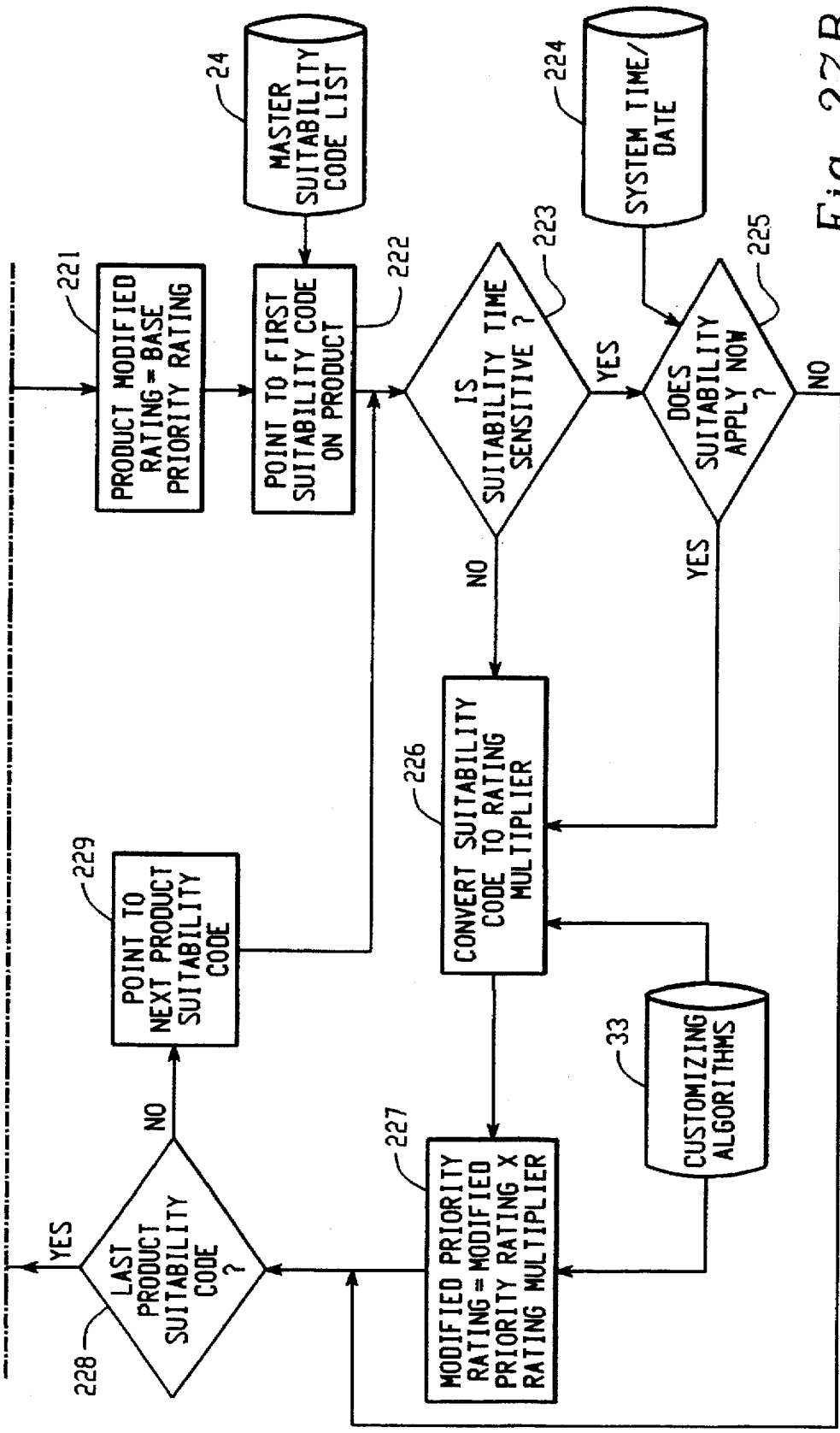

In the recalculation of the modified priority ratings, shown in FIG. 27, the module 214 takes the first base priority rating of the product on the first product list on which the product appears (step 220) and sets the modified rating equal to that base priority rating (step 221). Then, the first suitability code for that product on its first product list is obtained from the master suitability code list 29 (step 222). If the suitability code is a time sensitive code that is not applicable, it is removed from the calculation (step 225). Otherwise, step 226 converts the code to a rating operator, shown in FIG. 27 as a multiplier, by means of an algorithm such as described in Steps 1 through 5 above. That operator or multiplier is then applied to the modified priority rating (step 227), which in the case of the product's first suitability code is equal to the base priority rating (step 221). That process is repeated for each subsequent suitability code (step 229) until step 228 shows that there are no more suitability codes for that product on its first product list. The last modified rating calculated in step 227 is then stored on the product list as the modified priority rating for that product and associated directory (step 230). Then, if there are base priority ratings for the product associated with other product directories, for instance, the base priority ratings listed in column 24g in FIG. 10D (step 229) or if there are base priority ratings for the product associated with other product lists (see FIG. 12), the process is repeated to determine the corresponding modified priority ratings. That process is begun by obtaining the next base priority rating (step 232) and setting the modified priority rating equal to that base priority rating (step 221). When all the modified priority ratings for the product have been recalculated, the module 214 obtains the first base priority rating for next product (step 220) and recalculates all the modified priority ratings for that product and then for all the other products on the master suitability code list 24.

Figure 28:
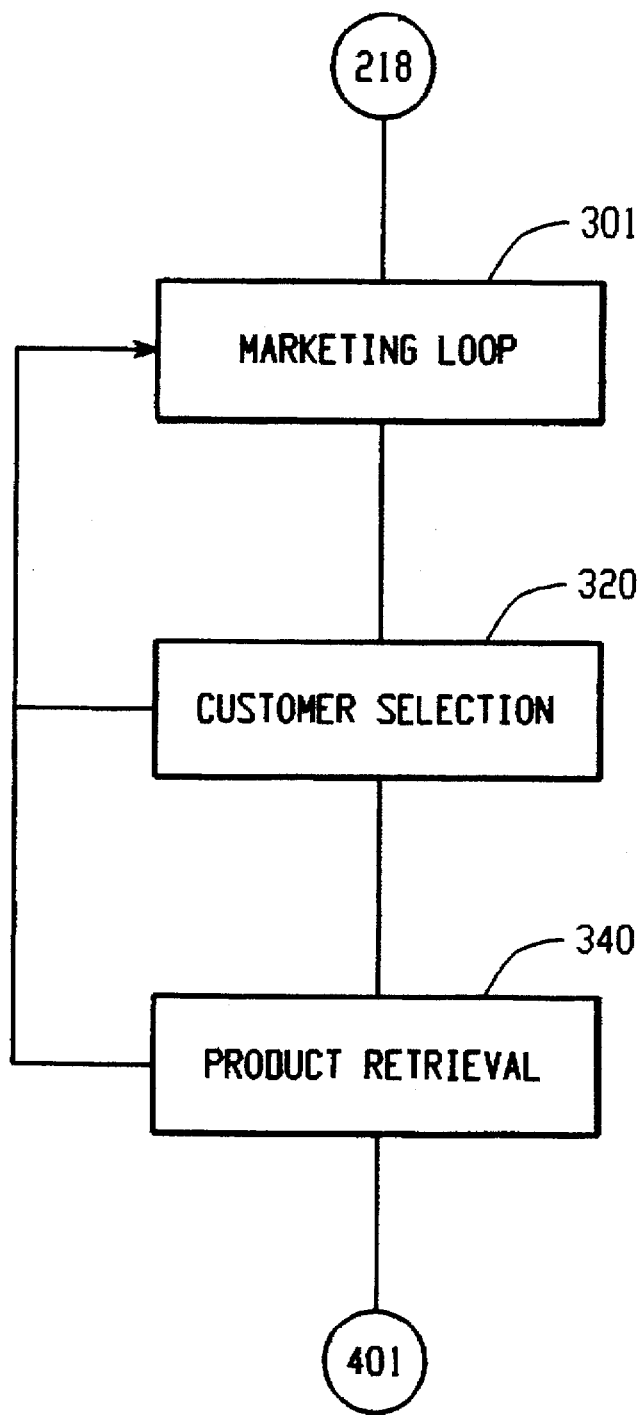
Figure 29:
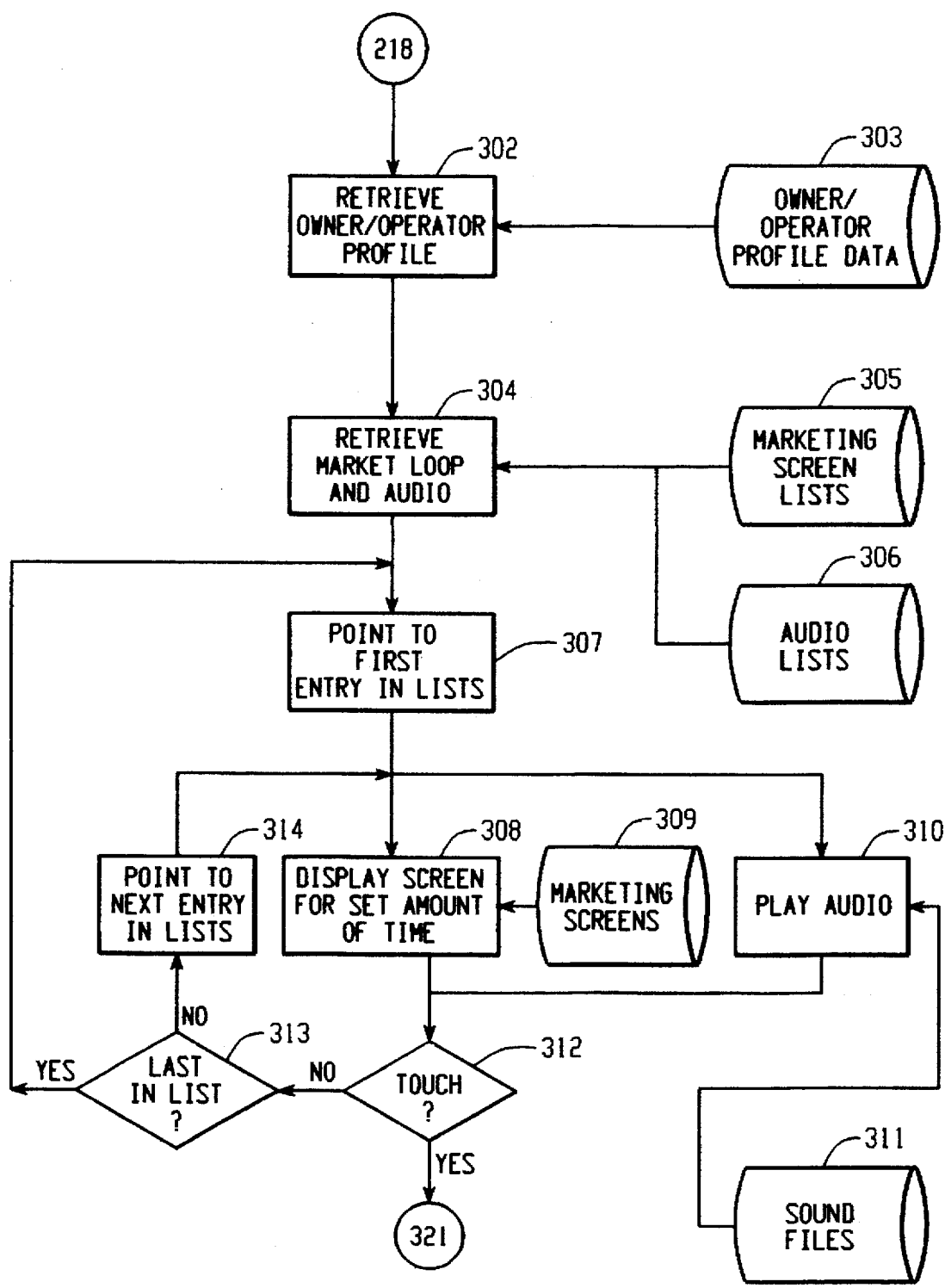
Figure 30:
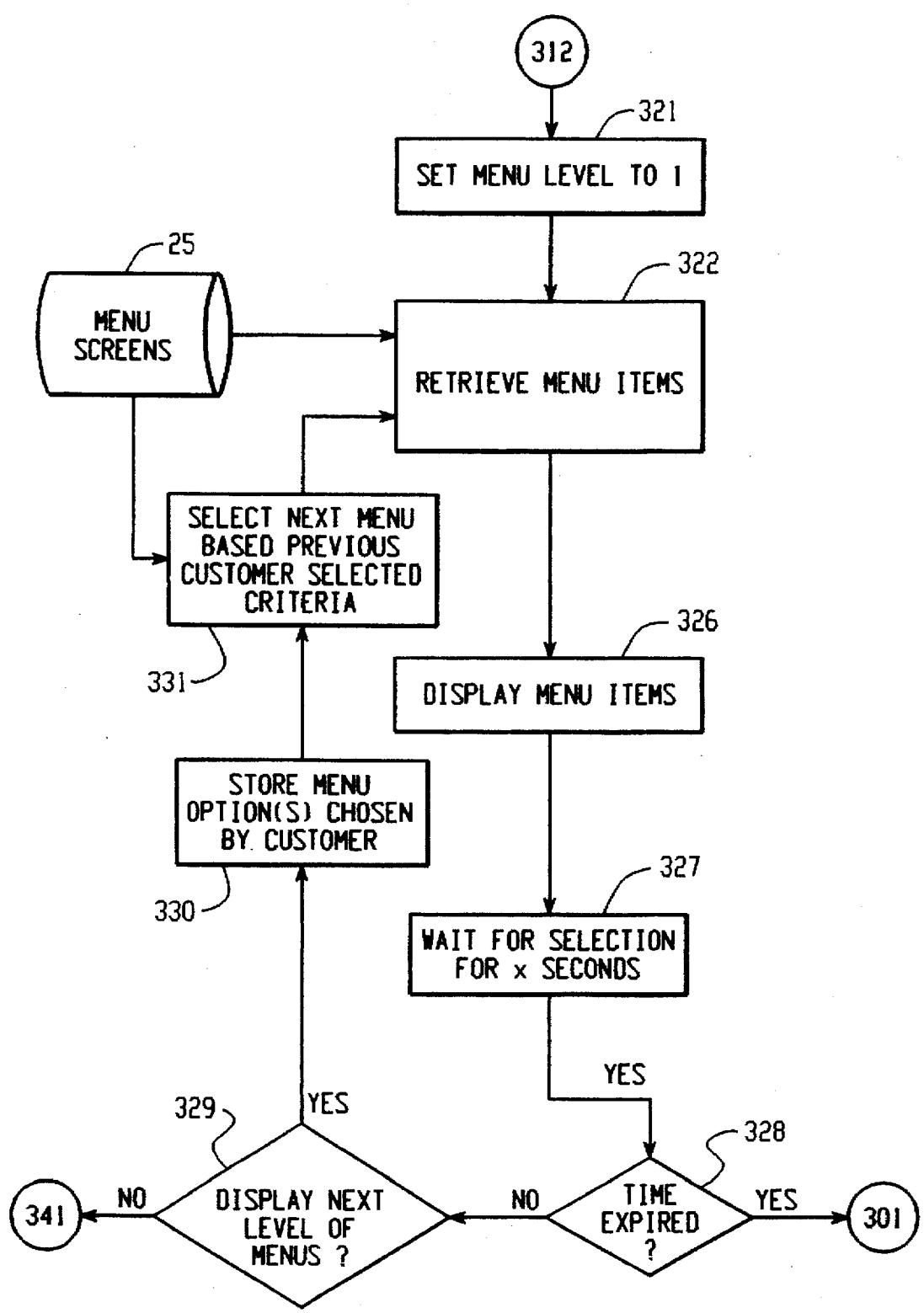
Figure 31:
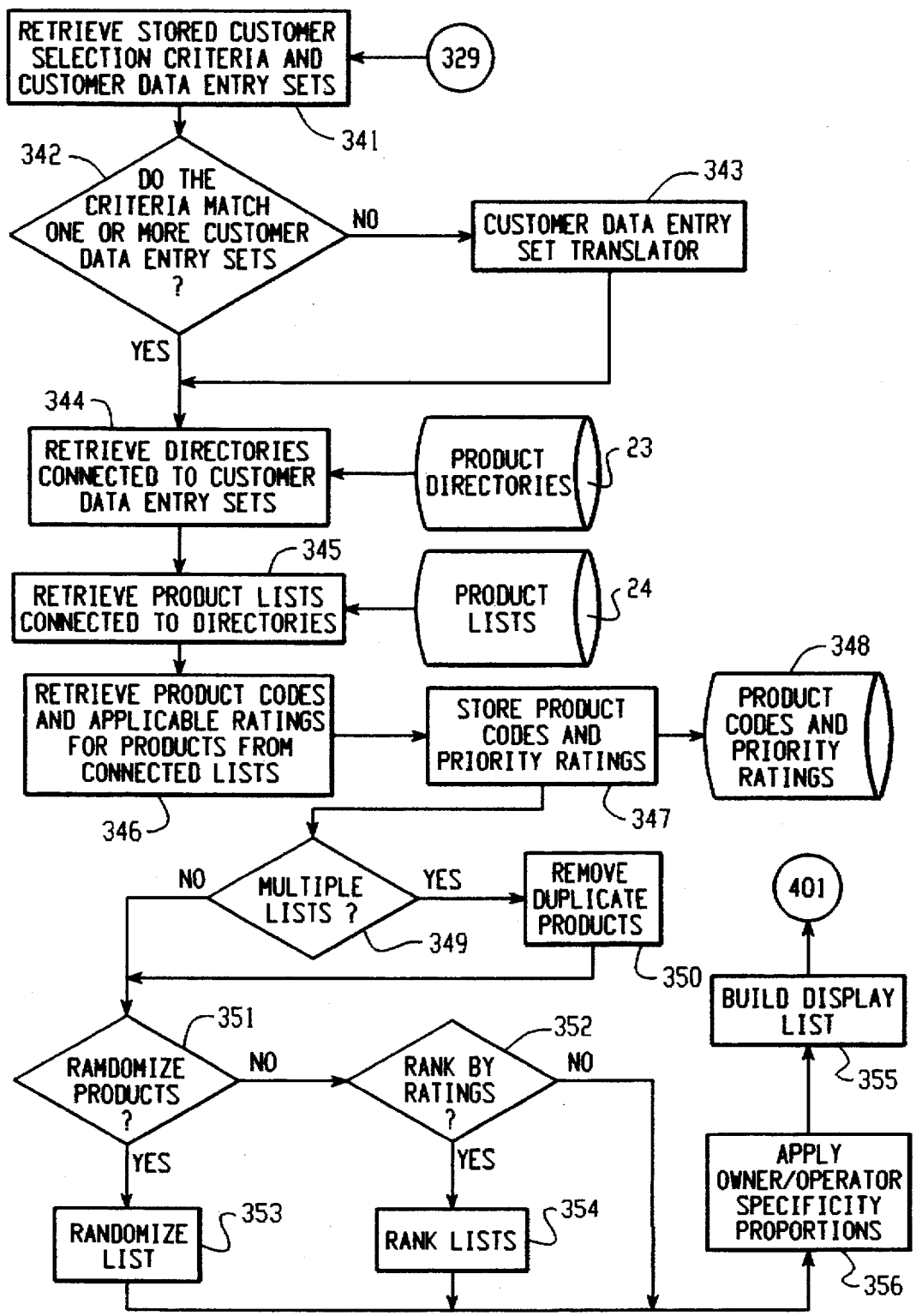

The product selection module 300 (FIG. 16) is divided into three main parts, shown in FIG. 28, namely a marketing loop 301, a customer selection module 320 and a product list retrieval module 340. The marketing loop 301, which includes steps 302 to 312 (FIG. 24), shows how the computer 2 is programmed to display the pictures and sound the audio for attracting customers to the kiosk 10 and showing them the kinds of products that they can purchase. The customer selection module 320 (FIG. 30) includes steps 321 to 331 that display the criteria menu screens 25, such as those shown in FIGS. 5 through 8, and receive the criteria chosen by the customer for the products to be displayed to him.

The product list retrieval module 340 (FIGS. 31, 32 and 33) includes steps 341 to 376. Steps 341 to 343a identify one or more customer data entry sets 22 that best correspond to the customer selected criteria 22a, using a customer data set translator 343 when such selected criteria do not coincide with a customer data entry set. By means of product directories 23 connected to the stored customer data entry sets (step 344) and product lists 24 connected to the directories (step 346), the module retrieves the product codes and priority ratings of the products eligible for display to the customer (step 348). Steps 351 to 354 determine the order in which the products are to be displayed, using a random order, the order of the priority ratings of the products, a combination of both or by employing some other algorithm. Module 356, including steps 357 to 376 (FIGS. 32 and 33), delete from the display those products falling outside the bounds set by the owner/operator preferences stored in the memory units 360 and 362 and obtained from the answers entered on the query screen of FIG. 14B.

Figure 35:
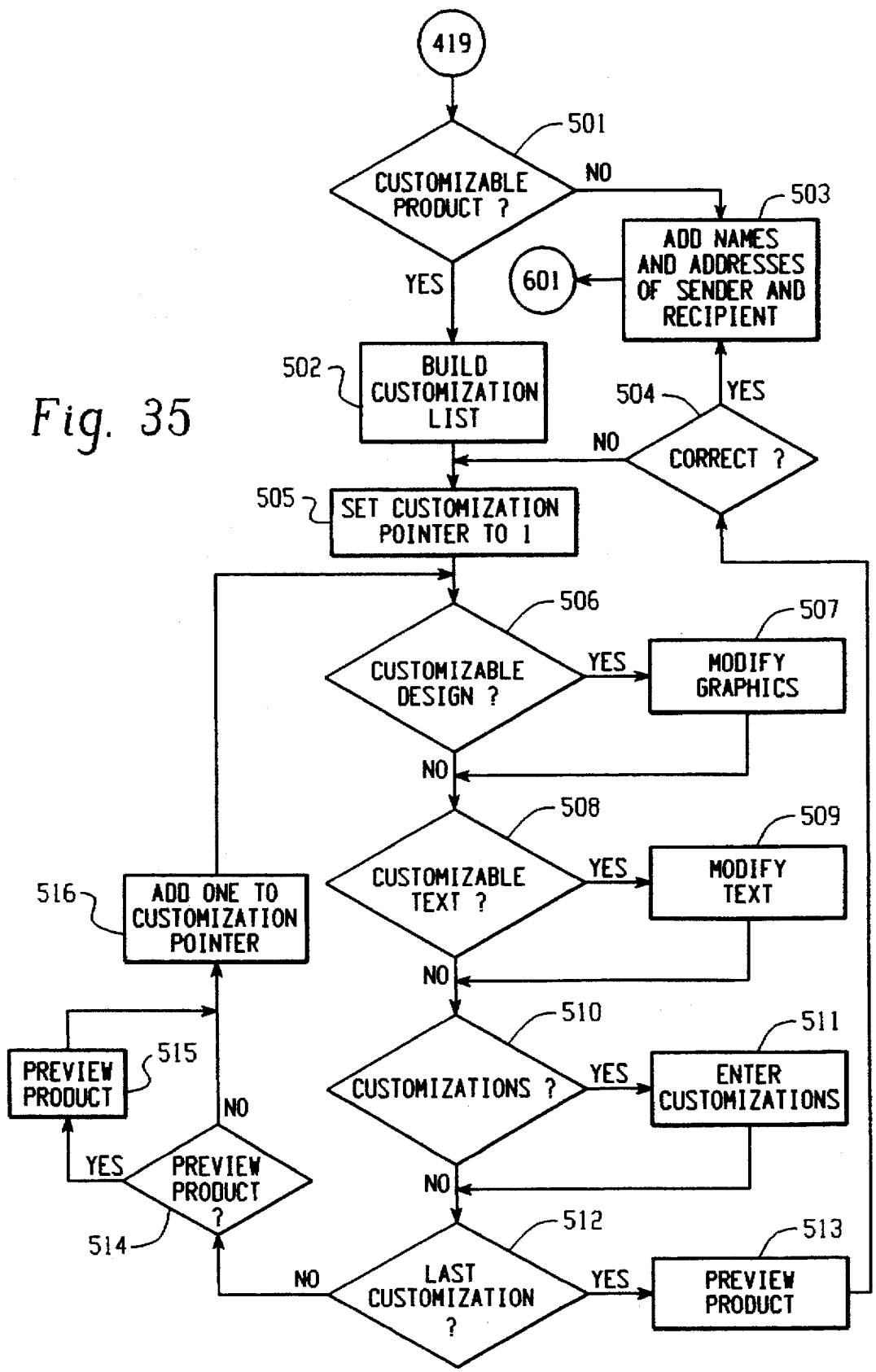
Figure 36:
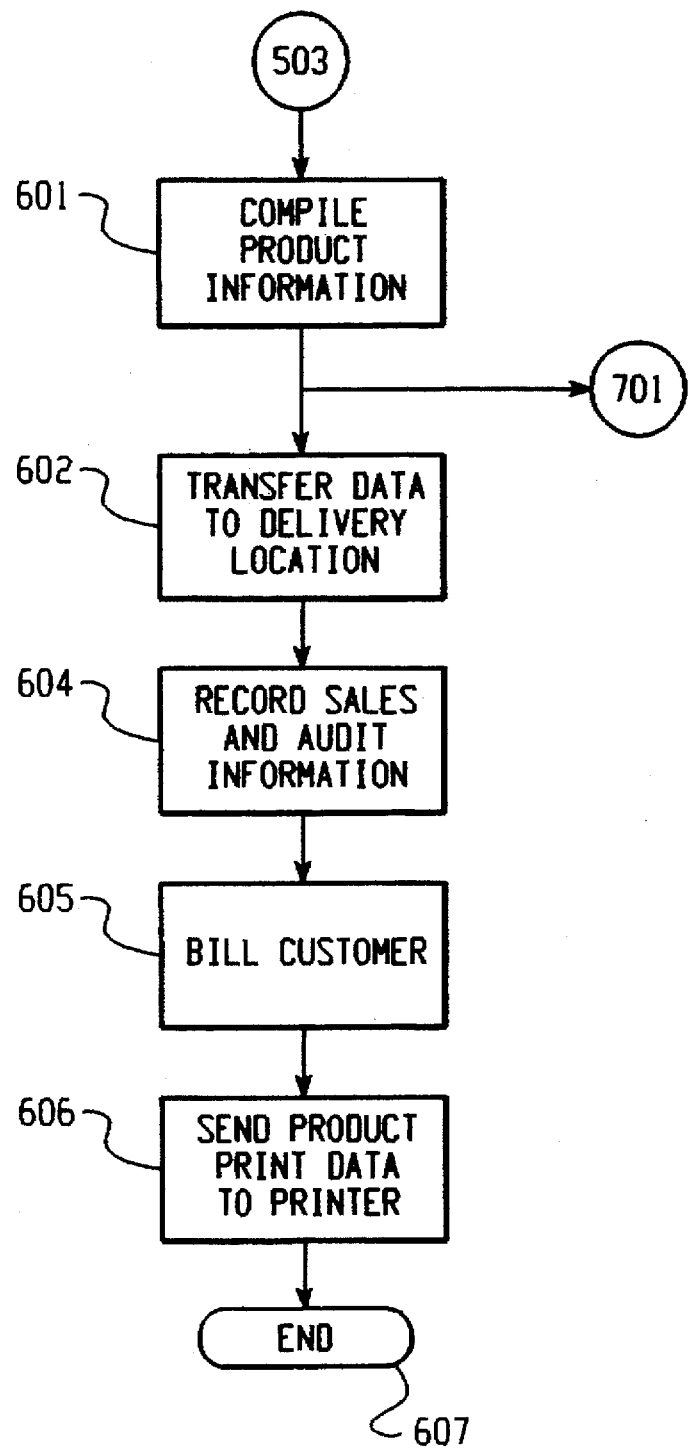

The product retrieval and presentation module 400 includes steps 401 to 419 (FIG. 32) that retrieve the complete products and product components from the files 17 and 18, assemble the components and display the products or assembled components according to a screen format selected by the customer. The questions of steps 401, 405, 406, 411, 412, 413, 415 and 416 preferably appear as buttons in the margins of the screen displays that show the products to the customer. The customer can touch the touchscreen 7 over the button 401 to view the groups of products presented simultaneously on the same screen. Otherwise, the products are presented one by one. If the customer sees a product that he thinks he may want to select, he can touch the save product button 413, which causes the product to be marked as saved for possible later recall when the customer touches the button 416. When the customer finally chooses his desired product by touching the select and customize button 415, the computer 2 executes the product counting and priority rating modifying steps 418 and 419 and then advances to the product customization module 500 (FIG. 35). Step 419 causes the base priority rating of the selected product to be increased, such as by multiplying the rating by a factor of 1.01. Step 419 also causes the base priority ratings of all the products that were displayed but not selected to be decreased, such as by multiplying each rating by a factor of 0.99. Various other algorithms that incorporate cumulative or incremental customer selection and non-selection information may be applied to base priority ratings for the purpose of adjusting the ratings upward or downward to reflect actual customer preferences.

The product customization module 500 includes steps 501 to 516 (FIG. 35) that enable the customer to add and delete various portions of the product, including text or graphics or both.

The product delivery module 600 includes steps 601 to 607 (FIG. 36) that cause the data for the customer's customized product to be delivered to the printer 8 (step 606).

The product re-prioritizing module 700 includes steps 701 to 708 (FIG. 37) that change the modified priority ratings of the products. Steps 701 and 702 of the module 700 run at fixed time intervals, for instance every 10 minutes, checking to determine the passage of a critical date or time relating to time sensitive suitability codes such as those listed under General Factor (C) of the suitability coding system of FIG. 11. Whenever step 702 determines the beginning or end of any of these time periods, the module 700 operates to change all the modified priority ratings affected by the time period change. If only a time period threshold has passed but the date has not changed, then there is preferably a step 704 that allows only the product codes associated with time of day sensitive suitability codes to be retrieved. The changes to the modified priority ratings are made by the previously described process shown in detail in steps 216 to 232 of the recalculate ratings module 214 of FIG. 27.

While one embodiment of the present invention has been shown and described, other embodiments will be apparent to those skilled in the art while remaining within the scope of the appended claims.

We claim:

1. A method of storing and selectively retrieving and delivering product data, comprising the steps of:

(a) storing product data files relating to a plurality of products in a data storage device;

(b) storing a plurality of customer data entry sets in a data storage device, each customer data entry set indicating an allowable combination of criteria for a product desired by a customer;

(c) storing a plurality of product lists in a data storage device and referencing on each product list the product data stored in step (a) above that relates to products having one or more common applications, wherein the storing and referencing steps include the steps of:

(c)(1) identifying each product on the product lists with a priority rating indicative of an expert judgment of the suitability of the product for the one or more common applications;

(c)(2) identifying at least one of the products on the product list with one or more suitability codes indicative of the desirability of retrieving and displaying data relating to the product in a particular circumstance;

(c)(3) converting by an algorithm the one or more suitability codes to a priority rating operator; and (c)(4) applying the priority rating operator to the priority rating of each product to obtain a modified priority rating;

(d) connecting the product lists to the customer data entry sets, at least one product list being connected to a plurality of customer data entry sets and corresponding to the customer data entry sets with different degrees of specificity or applicability;

(e) requesting a customer to indicate criteria relating to a desired product;

(f) receiving the criteria indicated by the customer;

(g) selecting the customer data entry set or sets that best correspond to the criteria received in step (f);

(h) retrieving from the data storage device the product lists connected to the customer data entry set or sets selected in step (g);

(i) retrieving and displaying product data from the product data files relating to the groups of products referenced on the product lists retrieved in step (h), wherein the retrieving and displaying step includes searching through the customer data entry set and product list files, and retrieving the product data based on the product list file references, without having to search through the data files stored in the data storage device in order to determine which ones correspond to the criteria received in step (f);

(j) requesting the customer to select one of the products whose data is displayed in step (i);

(k) receiving the customer's selection of a product; and (l) delivering the product or data relating to the product selected in step (k).

2. The method according to claim 1 wherein the step (d) of connecting the product lists to the customer data entry sets includes the steps of connecting the product lists to product directories and of connecting the product directories to the customer data entry sets, at least one product directory being connected to a plurality of customer data entry sets and to a plurality of product lists, the product directory corresponding to the customer data entry sets with different degrees of specificity.

3. The method according to claim 2 wherein the step (d) of connecting the product lists to the customer data entry sets includes the step of connecting at least one customer data entry set to a plurality of product directories.

4. The method according to claim 2 wherein the step (d) of connecting the product lists to the customer data entry sets includes the step of connecting at least one product list to a plurality of product directories, the product lists corresponding to the product directories with different degrees of specificity.

5. The method according to claim 2 wherein:

the step (e) of requesting the customer to indicate criteria relating to a desired product includes the step of presenting to the customer a list of key words, character strings or symbols from which the customer is asked to pick the key words, character strings or symbols that indicate the criteria that the customer has for a product to be selected by him;

the step (f) of receiving the criteria indicated by the customer includes the step of receiving the customer's selection of key words, character strings or symbols; and the step (g) of selecting the customer data entry set or sets that best correspond to the criteria received in step (f) includes the step of translating the key words, character strings or symbols selected by the customer into one or more customer data entry sets.

6. The method according to claim 5 wherein the step (g) of selecting the customer data entry set or sets that best correspond to the criteria received in step (f) includes the steps of:

(g)(1) storing key words, character strings or symbols or combinations thereof that can be selected by a customer, (g)(2) storing with each key word, character string or symbol or combination thereof the identity of a customer data entry set or sets that best correspond to the key word, character string or symbols or combination thereof and, (g)(3) in response to the reception of a particular key word, character string or symbol or combination thereof selected by a customer, identifying the customer data entry set or sets that are stored with that particular key word, character string or symbol or combination thereof.

7. The method according to claim 2 wherein:

the step (e) of requesting a customer to indicate criteria relating to his desired product includes the step of presenting to the customer a plurality of menu screens, each displaying criterion choices from which the customer is requested to select one criterion; and the step (f) of receiving the criteria indicated by the customer includes the step of receiving the criterion choices indicated by the customer on the menu screen or screens presented to him.

8. The method according to claim 7 wherein the identity of one or more of the menu screens presented in step (e) depends on the identity of one or more of the criteria selected by the customer from the menu screens previously presented.

9. The method according to claim 7 wherein one or more of the menu screens presented in step (e) comprises a continuous scroll of criterion choices that are displayed sequentially.

10. The method according to claim 7 wherein the step (g) of selecting the customer data entry set or sets that best correspond to the criteria received in step (f) includes the steps of:

(g)(1) storing combinations of criteria choices that can be selected by a customer, (g)(2) storing with each combination of criteria choices the identity of the customer data entry set or sets that correspond to that combination and, (g)(3) in response to the reception of a particular combination of criteria choices, identifying the customer data entry set or sets that are stored with that particular combination of criteria choices.

11. The method according to claim 2 further comprising the steps of:

(c)(1) storing on each product list an instruction for modifying the product data of a product in the event that product is selected from that product list for display to a customer; and (i)(1) prior to the display of the product data of a product having an instruction for modification stored on a retrieved product list, modifying the product data in accordance with that instruction.

12. The method according to claim 2 further comprising the steps of:

(k)(1) requesting the customer to input changes to the selected product; and (k)(2) receiving the changes input by the customer and making those changes to the selected product.

13. The method according to claim 2 including the steps of:

(i)(1) requesting an operator to indicate preferences for the proportions of products displayed to the customer having certain characteristics;

(i)(2) receiving the preferences indicated in step (i)(1); and (i)(3) limiting the proportions of products presented to the customer according to the preferences received in step (i)(2).

14. The method according to claim 1 wherein:

the step (e) of requesting a customer to indicate criteria relating to his desired product includes the step of presenting to the customer a plurality of menu screens, each displaying criterion choices from which the customer is requested to select one criterion; and the step (f) of receiving the criteria indicated by the customer includes the step of receiving the criterion choices indicated by the customer on the menu screen or screens presented to him.

15. The method according to claim 14 wherein the identity of one or more of the menu screens presented in step (e) depends on the identity of one or more of the criteria selected by the customer from the menu screens previously presented.

16. The method according to claim 14 wherein one or more of the menu screens presented in step (e) comprises a continuous scroll of criterion choices that are displayed sequentially.

17. The method according to claim 14 wherein the step (g) of selecting the customer data entry set or sets that best correspond to the criteria received in step (f) includes the steps of:

(g)(1) storing combinations of criteria choices that can be selected by a customer, (g)(2) storing with each combination of criteria choices the identity of the customer data entry set or sets that correspond to that combination and, (g)(3) in response to the reception of a particular combination of criteria choices, identifying the customer data entry set or sets that are stored with that particular combination of criteria choices.

18. The method according to claim 1 wherein:

the step (e) of requesting the customer to indicate criteria relating to a desired product includes the step of presenting to the customer a list of key words, character strings or symbols from which the customer is asked to pick the key words, character strings or symbols that indicate the criteria that the customer has for a product to be selected by him;

the step (f) of receiving the criteria indicated by the customer includes the step of receiving the customer's selection of key words, character strings or symbols; and the step (g) of selecting the customer data entry set or sets that best correspond to the criteria received in step (f) includes the step of translating the key words, character strings or symbols selected by the customer into one or more customer data entry sets.

19. The method according to claim 18 wherein the step (g) of selecting the customer data entry set or sets that best correspond to the criteria received in step (f) includes the steps of:

(g)(1) storing key words, character strings or symbols or combinations thereof that can be selected by a customer, (g)(2) storing with each key word, character string or symbol or combination thereof the identity of a customer data entry set or sets that best correspond to the key word, character string or symbols or combination thereof and, (g)(3) in response to the reception of a particular key word, character string or symbol or combination thereof selected by a customer, identifying the customer data entry set or sets that are stored with that particular key word, character string or symbol or combination thereof.

20. The method according to claim 1 further comprising the steps of:

(c)(1) storing on each product list an instruction for modifying the product data of a product in the event that product is selected from that product list for display to a customer; and (i)(1) prior to the display of the product data of a product having an instruction for modification stored on a retrieved product list, modifying the product data in accordance with that instruction.

21. The method according to claim 1 further comprising the steps of:

(k)(1) requesting the customer to input changes to the selected product; and (k)(2) receiving the changes input by the customer and making those changes to the selected product.

22. The method according to claim 1 wherein the step:

(i) of retrieving and displaying data includes the step of:
(i)(1) displaying the data relating to each product in order dependent on the priority ratings stored in step (c)(1).

23. The method according to claim 1 including the additional step of:

(k)(1) increasing the priority rating of a product each time a customer's selection of the product is received and decreasing the priority rating of a product each time the product is retrieved and displayed but not selected.

24. The method according to claim 1 including the step of storing the suitability codes by which products are identified in step (c)(2) on a master suitability code list.

25. The method according to claim 24 including the steps of:

(c)(2)(i) storing on the master suitability code list the identities of the product lists on which the product data relating to each product is referenced.

26. The method according to claim 25 wherein the suitability codes of step (c)(2) contain variable indicia and the method includes the steps of:

(c)(2)(ii) requesting an operator to indicate preferences for the types of products to be displayed;

(c)(2)(iii) receiving the preferences indicated in step (c)(2)(ii); and (c)(2)(iv) changing the variable indicia of the suitability codes in response to the preferences received in step (c)(2)(iii).

27. The method according to claim 25 wherein the suitability codes of step (c)(2) contain variable indicia and the method includes the steps of storing a clock in the data storage device and changing at least some of the suitability codes in response to a time or date registered by the clock.

28. The method according to claim 27 including the steps of:

(c)(2)(ii) requesting an operator to indicate preferences for the types of products to be displayed;

(c)(2)(iii) receiving the preferences indicated in step (c)(2)(ii); and (c)(2)(iv) changing the variable indicia of one or more suitability codes in response to the preferences received in step (c)(2)(iii) and changing the variable indicia of one or more suitability codes in response to time or dates registered by the clock.

29. The method according to claim 1 including the steps of:

(i)(1) requesting an operator to indicate preferences for the proportions of products to be displayed which correspond to the customer data entry set or sets with different degrees of specificity;

(i)(2) receiving the preferences indicated in step (i)(1); and (i)(3) limiting the proportions of products presented to the customer according to the preferences received in step (i)(2).

30. The method according to claim 1 including the steps of:

(i)(1) requesting an operator to indicate preferences for the proportions of products displayed to the customer having certain characteristics;

(i)(2) receiving the preferences indicated in step (i)(1); and (i)(3) limiting the proportions of products presented to the customer according to the preferences received in step (i)(2).

31. The method according to claim 30 wherein the characteristics of the products relate to the capability of the products for modification.

32. The method according to claim 30 wherein the characteristics of the products relate to the capability of the products for modification.

33. A method of storing product data for subsequent retrieval and delivery, comprising the steps of:

(a) storing product data files relating to a plurality of products in a data storage device;

(b) storing a plurality of customer data entry sets in a data storage device, each customer data entry set indicating an allowable combination of criteria for a product desired by a customer;

(c) storing a plurality of product lists in a data storage device and referencing on each product list the product data stored in step (a) above that relates to products having one or more common applications;

(c)(1) identifying with a priority rating each product referenced on a product list, said priority rating indicative of an expert judgment of the suitability of the product for the one or more common applications;

(c)(2) identifying at least one of the products on the product list with one or more suitability codes;

(c)(3) converting the one or more suitability codes into a priority rating operator; and (c)(4) applying the priority rating operator to the priority rating of each product to obtain a modified priority rating; and (d) connecting the product lists to the customer data entry sets, at least one product list being connected to a plurality of customer data entry sets and corresponding to the customer data entry sets with different degrees of specificity or applicability.

34. The method according to claim 33, further comprising the steps of:

(e) requesting a customer to indicate criteria relating to a desired product;

(f) receiving the criteria indicated by the customer;

(g) selecting the customer data entry set or sets that best correspond to the criteria received in step (f);

(h) retrieving from the data storage device the product lists connected to the customer data entry set or sets selected in step (g);

(i) retrieving and displaying product data from the product data files relating to the groups of products referenced on the product lists retrieved in step (h), wherein the retrieving and displaying step includes searching through the customer data entry set and product list files, and retrieving the product data based on the product list file references, without having to search through the data files stored in the data storage device in order to determine which ones correspond to the criteria received in step (f);

(j) requesting the customer to select one of the products whose data is displayed in step (i);

(k) receiving the customer's selection of a product; and (l) delivering the product or data relating to the product selected in step (k).

35. The method according to claim 34 including the additional step of:

(k)(1) increasing the priority rating of a product each time a customer's selection of the product is received and decreasing the priority rating of a product each time the product is retrieved and displayed but not selected.

36. The method according to claim 34 including the steps of:

(i)(1) requesting an operator to indicate preferences for the proportions of products to be displayed which correspond to the product directories with different degrees of specificity;

(i)(2) receiving the preferences indicated in step (i)(1); and (i)(3) limiting the proportions of products presented to the customer according to the preferences received in step (i)(2).

37. The method according to claim 33 including the additional step of:

(k)(1) increasing the priority rating of a product each time a customer's selection of the product is received and decreasing the priority rating of a product each time the product is retrieved and displayed but not selected.

38. The method according to claim 33 including the step of storing the suitability codes by which products are identified in step (c)(2) on a master suitability code list.

39. The method according to claim 38 including the steps of:

(c)(2)(i) storing on the master suitability code list the identities of the product lists on which the product data relating to each product is referenced.

40. The method according to claim 39 wherein the suitability codes of step (c)(2) contain variable indicia and the method includes the steps of:

(c)(2)(ii) requesting an operator to indicate preferences for the types of products to be displayed;

(c)(2)(iii) receiving the preferences indicated in step (c)(2)(ii); and (c)(2)(iv) changing the variable indicia of the suitability codes in response to the preferences received in step (c)(2)(iii).

41. The method according to claim 40 including the steps of:

(c)(2)(ii) requesting an operator to indicate preferences for the types of products to be displayed;

(c)(2)(iii) receiving the preferences indicated in step (c)(2)(ii); and (c)(2)(iv) changing the variable indicia of one or more suitability codes in response to the preferences received in step (c)(2)(iii) and changing the variable indicia of one or more suitability codes in response to a time or date registered by the clock.

42. The method according to claim 39 wherein the suitability codes of step (c)(2) contain variable indicia and the method includes the steps of storing a clock in the data storage device and changing at least some of the suitability codes in response to a time or date registered by the clock.

43. An apparatus that stores and selectively retrieves and displays product data, comprising:

(a) a data storage device in which are stored (1) product data files relating to a plurality of products, (2) product lists referencing the product data of products having anticipated common applications, the product lists include priority ratings indicative of an expert judgment of the suitability of the product and suitability codes indicative of the desirability of retrieving and displaying the product in a particular circumstance, wherein the suitability codes are converted into a priority rating operator that modifies the priority ratings; and (3) customer data entry sets indicating allowable combinations of criteria for products desired by customers, the customer data entry sets being connected to the product lists, at least one product list being connected to a plurality of customer data entry sets;

(b) a display monitor that displays choices of criteria that a customer might desire in a product;

(c) a customer input device connected to the display monitor that receives the criteria selected by the customer;

(d) a computer connected to the customer input device that receives the customer selected criteria from the input device, selects the customer data entry set or sets that best correspond to the criteria received by the customer input device, retrieves from the data storage device the product data referenced by the product lists connected to the selected customer data entry set or sets and displays the product data on the display monitor, wherein the retrieval of the product data occurs using the references on each product list without having to perform a search of the product data files stored in the data storage device in order to determine which products correspond to the customer selected criteria.

44. The apparatus according to claim 43 including product directories stored in the data storage device, the product directories being connected to the product lists and to the customer data entry sets, at least one product directory being connected to a plurality of customer data entry sets and to a plurality of product lists.

45. The apparatus according to claim 44 wherein the product data relating to at least some of the products stored in the data storage device is capable of modification by the customer in response to changes input through the customer input device.

46. The apparatus according to claim 44 wherein a list of key words, character strings or symbols for the customer's selection are stored in the data storage device and a translator is also stored in the data storage device for translating key words, character strings or symbols selected by the customer into one or more customer data entry sets.

47. The apparatus according to claim 44 wherein one or more of the menu screens comprises a continuous scroll of criterion choices.

48. The apparatus according to claim 44 including a plurality of menu screens stored in the data storage device, each menu screen displaying criterion choices for a customer's selection.

49. The apparatus according to claim 44 wherein at least one customer data entry set is connected to a plurality of product directories.

50. The apparatus according to claim 44 including operator preferences stored in the data storage device relating to the proportions of the types of products to be displayed to the customer and also an algorithm stored in the data storage device that limits the proportions of types of products whose data is displayed to the stored operator preferences.

51. The apparatus according to claim 44 wherein at least one product list is connected to a plurality of product directories.

52. The apparatus according to claim 43 including a plurality of menu screens stored in the data storage device, each menu screen displaying criterion choices for a customer's selection.

53. The apparatus according to claim 43 wherein one or more of the menu screens comprises a continuous scroll of criterion choices.

54. The apparatus according to claim 43 wherein a list of key words, character strings or symbols for the customer's selection are stored in the data storage device and a translator is also stored in the data storage device for translating key words, character strings or symbols selected by the customer into one or more customer data entry sets.

55. The apparatus according to claim 43 wherein the product data relating to at least some of the products stored in the data storage device is capable of modification by the customer in response to changes input through the customer input device.

56. The apparatus according to claim 43 including an algorithm stored in the data storage device for converting the suitability codes to priority rating operators.

57. The apparatus according to claim 43 including a master suitability code list stored in the data storage device that references the products whose data is stored in the data storage device with the suitability codes.

58. The apparatus according to claim 57 wherein the master suitability code list includes the identities of the product lists on which the product data relating to each product is referenced.

59. The apparatus according to claim 43 wherein the suitability codes contain variable indicia that indicate an operator preference for the types of products to be displayed.

60. The apparatus according to claim 43 including a clock stored in the data storage device and wherein at least some of the suitability codes are time sensitive and contain variable indicia that are changed in response to a time or date registered by the clock.

61. The apparatus according to claim 43 including operator preferences stored in the data storage device relating to the proportions of the types of products to be displayed to the customer and also an algorithm stored in the data storage device that limits the proportions of types of products whose data is displayed to the stored operator preferences.

* * * * *